(12) United States Patent
Lee et al.

(10) Patent No.: US 11,506,896 B2
(45) Date of Patent: Nov. 22, 2022

(54) OPTICAL DEVICE AND METHOD FOR DRIVING THE SAME

(71) Applicant: Samsung Display Co., LTD., Yongin-si (KR)

(72) Inventors: Hyun Sup Lee, Seoul (KR); Jin Oh Kwag, Suwon-si (KR); Jae Joong Kwon, Suwon-si (KR); Ju Hwa Ha, Seoul (KR)

(73) Assignee: Samsung Display Co., LTD., Yongin-si (KR)

( * ) Notice: Subject to any disclaimer, the term of this patent is extended or adjusted under 35 U.S.C. 154(b) by 328 days.

(21) Appl. No.: 16/815,230

(22) Filed: Mar. 11, 2020

(65) Prior Publication Data

US 2020/0292824 A1 Sep. 17, 2020

(30) Foreign Application Priority Data

Mar. 14, 2019 (KR) .................. 10-2019-0029382

(51) Int. Cl.
*G02B 27/01* (2006.01)
*G02B 26/08* (2006.01)

(52) U.S. Cl.
CPC ..... *G02B 27/0172* (2013.01); *G02B 26/0841* (2013.01); *G02B 27/0176* (2013.01); *G02B 2027/0123* (2013.01); *G02B 2027/0154* (2013.01)

(58) Field of Classification Search
CPC ............ G02B 27/0172; G02B 27/0176; G02B 27/017; G02B 27/01; G02B 26/0841; G02B 26/0833; G02B 26/0816; G02B 26/08; G02B 2027/0123; G02B 2027/0154
USPC ..................................................... 359/200.6
See application file for complete search history.

(56) References Cited

U.S. PATENT DOCUMENTS

| | | | |
|---|---|---|---|
| 8,537,075 B2 | 9/2013 | Crocco et al. | |
| 9,261,959 B1* | 2/2016 | D'Amico | G06F 3/013 |
| 9,761,051 B2 | 9/2017 | Bromer | |
| 10,275,024 B1* | 4/2019 | Simmons | G06F 3/013 |
| 10,684,684 B1* | 6/2020 | Simmons | G06F 3/013 |
| 2007/0024550 A1* | 2/2007 | Chui | G02B 26/001 |
| | | | 345/84 |
| 2013/0328748 A1* | 12/2013 | Mukawa | G02B 27/0172 |
| | | | 345/8 |
| 2013/0342914 A1* | 12/2013 | Mukawa | G02B 27/0172 |
| | | | 359/630 |
| 2014/0104618 A1* | 4/2014 | Potsaid | G02B 26/08 |
| | | | 356/497 |
| 2014/0198368 A1* | 7/2014 | Urey | G02B 27/0101 |
| | | | 359/627 |
| 2014/0285429 A1* | 9/2014 | Simmons | G02B 27/0179 |
| | | | 359/259 |
| 2015/0205134 A1* | 7/2015 | Bailey | G02B 26/0816 |
| | | | 359/291 |

(Continued)

*Primary Examiner* — William R Alexander
(74) *Attorney, Agent, or Firm* — H.C. Park & Associates, PLC

(57) ABSTRACT

An optical device is disclosed. The optical device includes a first lens having a first surface and a plurality of side surfaces; a first display device disposed on a first side surface of the side surfaces of the first lens; and a first active mirror disposed in the first lens. The first active mirror is tilted at a first angle during a first period and is tilted at a second angle during a second period.

28 Claims, 40 Drawing Sheets

(56) References Cited

U.S. PATENT DOCUMENTS

| | | | |
|---|---|---|---|
| 2015/0277117 A1* | 10/2015 | Yamada | G02B 27/0172 385/37 |
| 2015/0286056 A1* | 10/2015 | Takashima | G02C 11/10 359/633 |
| 2015/0378161 A1* | 12/2015 | Bailey | G02B 27/0176 359/214.1 |
| 2016/0139412 A1* | 5/2016 | Sawada | G02B 27/0172 359/630 |
| 2016/0154243 A1* | 6/2016 | Aiki | G02B 27/0172 359/633 |
| 2016/0316195 A1* | 10/2016 | Simmons | G02B 26/0816 |
| 2017/0174823 A1* | 6/2017 | Weippert | C08G 59/4021 |
| 2017/0192504 A1* | 7/2017 | Simmons | G09G 5/10 |
| 2018/0215864 A1* | 8/2018 | Weippert | G01N 1/36 |
| 2018/0292652 A1* | 10/2018 | Ha | G06T 19/00 |
| 2020/0026087 A1* | 1/2020 | Cai | G02B 27/0172 |
| 2020/0183169 A1* | 6/2020 | Peng | G02B 6/0055 |
| 2021/0033774 A1* | 2/2021 | Tanaka | G02B 27/0172 |
| 2021/0271084 A1* | 9/2021 | Tanaka | G02B 27/0172 |

* cited by examiner

FIG. 12
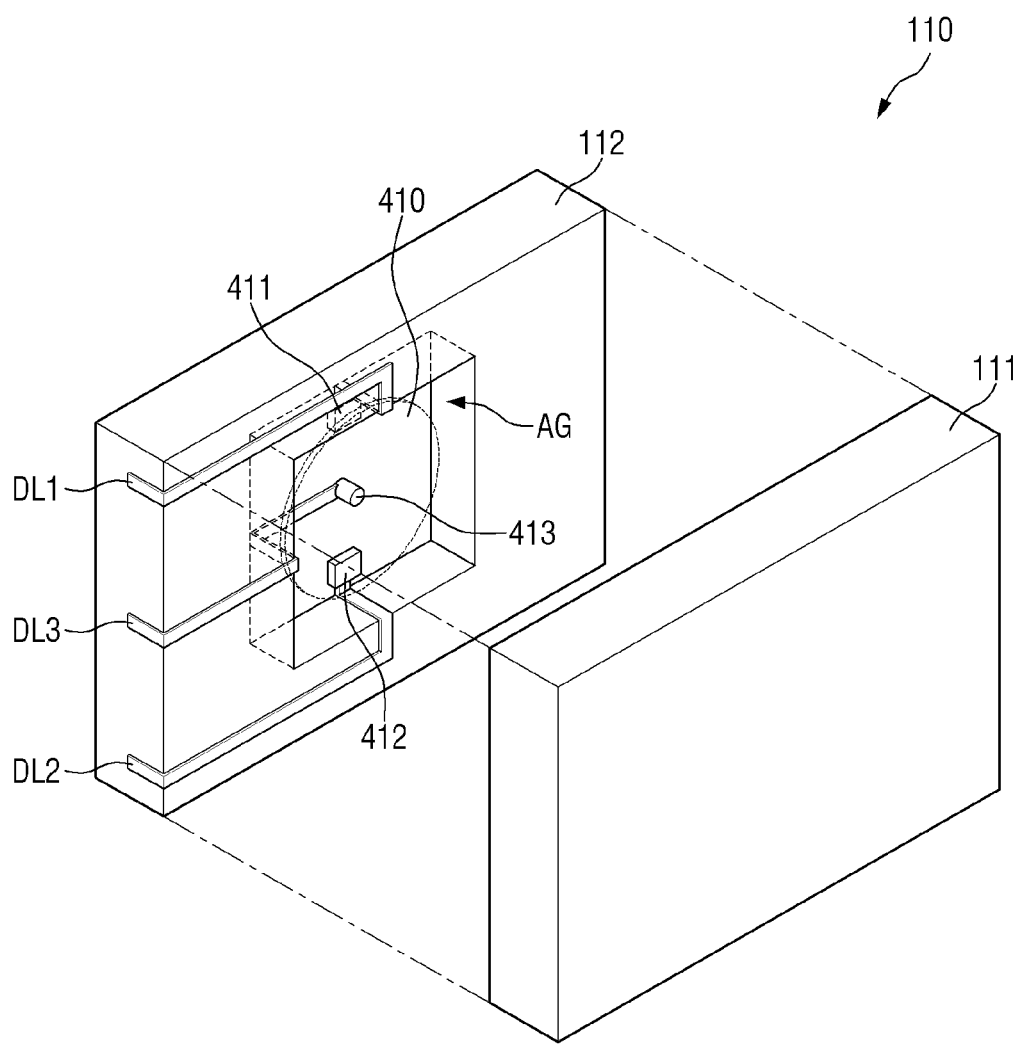
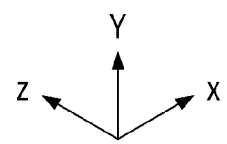

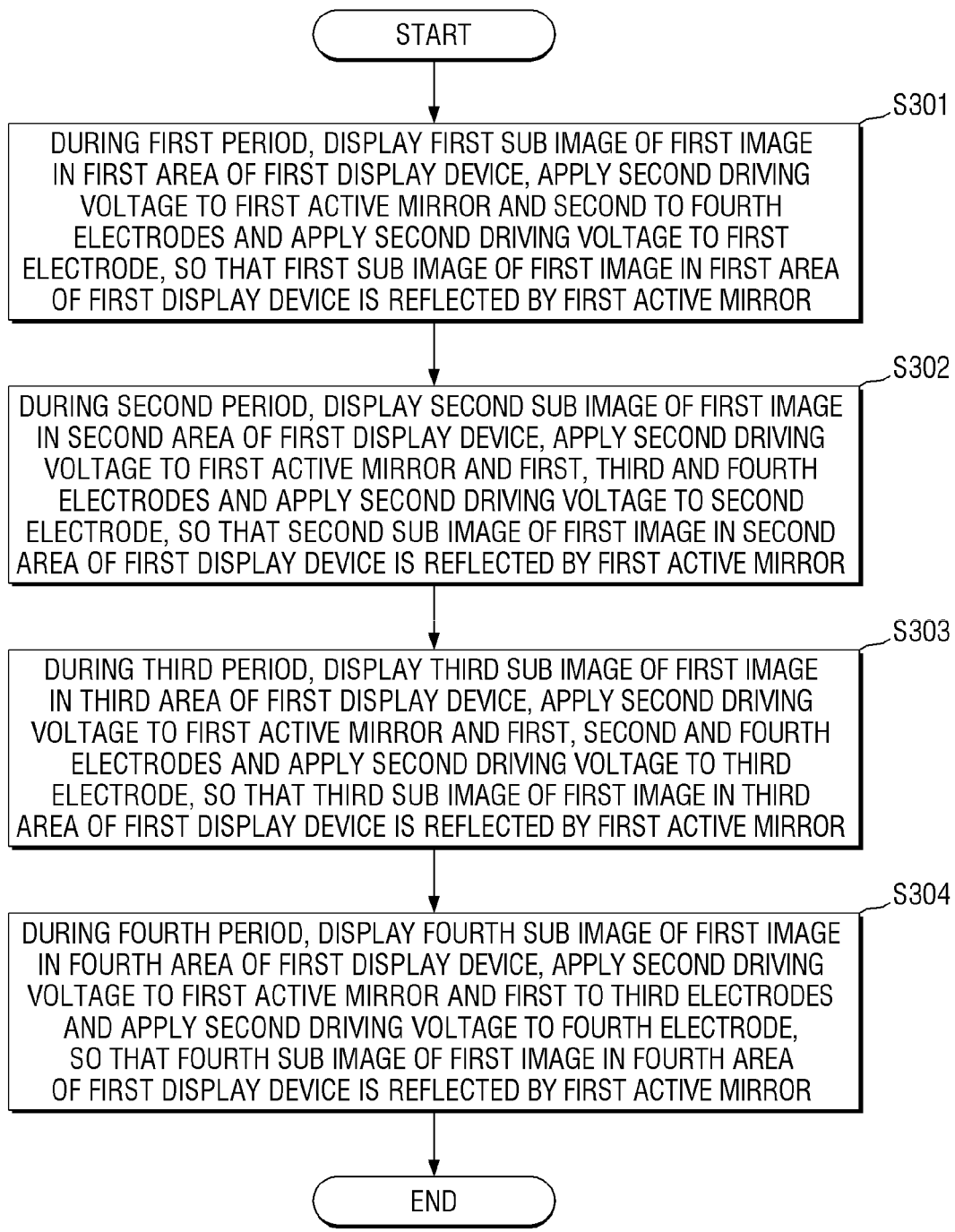

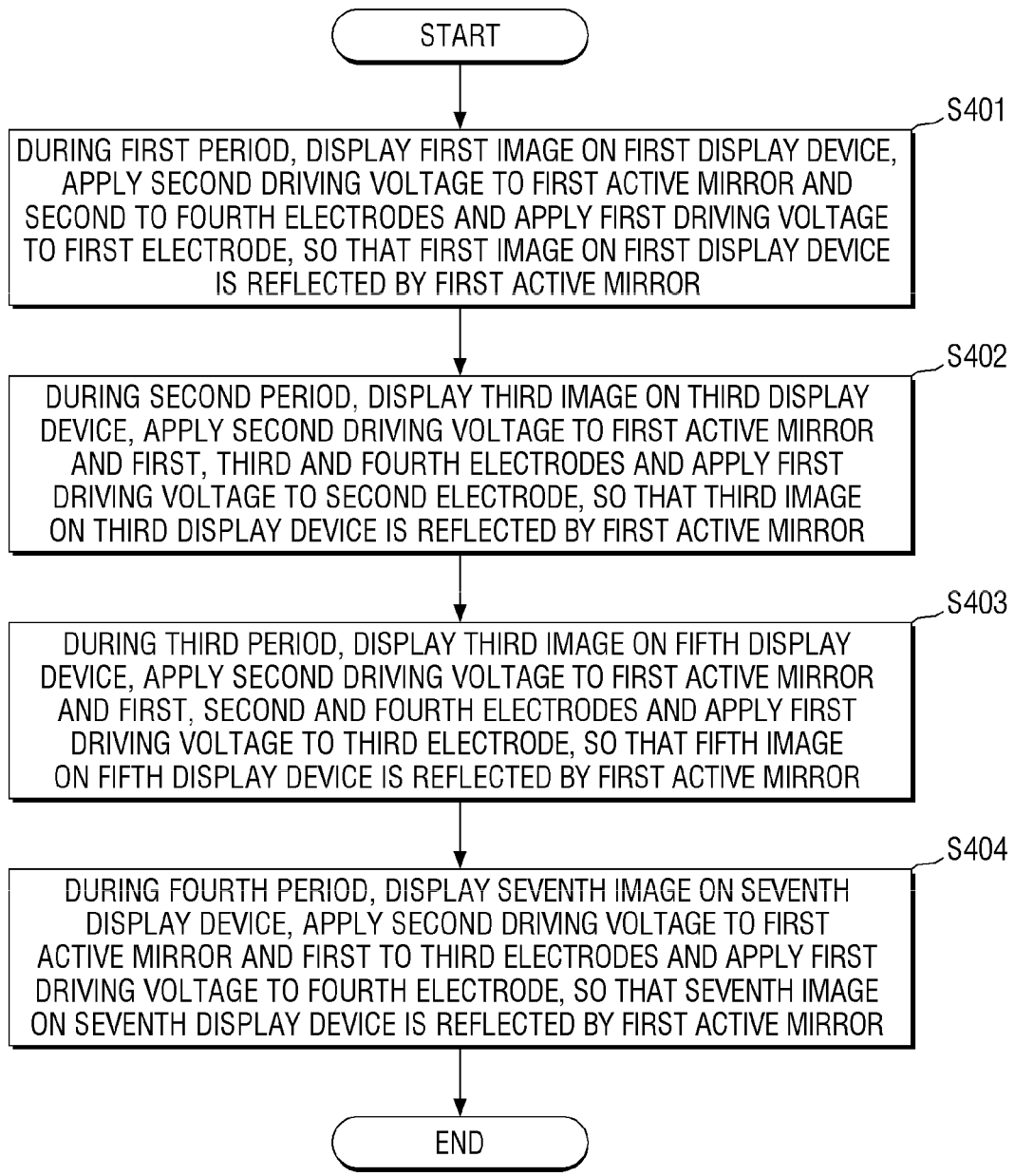

OPTICAL DEVICE AND METHOD FOR DRIVING THE SAME

CROSS REFERENCE TO RELATED APPLICATION

This application claims priority from and the benefit of Korean Patent Application No. 10-2019-0029382, filed on Mar. 14, 2019, which is hereby incorporated by reference for all purposes as if fully set forth herein.

BACKGROUND

Field

Exemplary embodiments of the invention relate generally to an optical device and a method for driving the same.

Discussion of the Background

Augmented reality is an emerging technology that provides a user with a real-world image by adding layers of virtual images onto it. Virtual images may be in the form of texts or graphics, and real-world images may be information on a real object captured by the device.

An optical device may include a display device for displaying virtual images, and optical members for providing a user's eyes with the virtual images. The optical device can be implemented in the form of a pair of glasses so that a user can easily carry it and easily put on or remove the device.

In order to provide a more realistic augmented reality, an increase in the size or the number of virtual images a user sees is desirable. In order to increase the size or the number of the virtual images, the area of the display device seen by a user's eyes, i.e., the user's field-of-view (FOV) needs to be widened.

The above information disclosed in this Background section is only for understanding of the background of the inventive concepts, and, therefore, it may contain information that does not constitute prior art.

SUMMARY

Exemplary embodiments of the present invention provide an optical device that can expand the part of a display device that is viewed by a user's eyes, i.e., a user's field-of-view (FOV).

Exemplary embodiments of the present invention also provide a method of driving an optical device that can expand the part of a display device that is viewed by a user's eyes, i.e., a user's field-of-view (FOV).

Additional features of the inventive concepts will be set forth in the description which follows, and in part will be apparent from the description, or may be learned by practice of the inventive concepts.

An exemplary embodiment of the invention provides an optical device including: a first lens having a first surface and a plurality of side surfaces; a first display device disposed on a first side surface of the side surfaces of the first lens; and a first active mirror disposed in the first lens. The first active mirror is tilted at a first angle during a first period and is tilted at a second angle during a second period.

Each of the first angle and the second angle may be measured from a thickness direction of the first lens toward a height direction of the first lens.

The first lens may include a first lens part; and a second lens part having a groove formed in a side surface thereof that faces a side surface of the first lens part, where the first active mirror may be accommodated in the groove.

The groove may be filled with a fluid.

The optical device may further include: a first electrode and a second electrode disposed on a floor of the groove; and a mirror support disposed on the floor of the groove to support the first active mirror.

The floor of the groove may be inclined by a third angle, where the third angle may be measured from a thickness direction of the first lens toward a height direction of the first lens.

The first electrode, the second electrode, and the mirror support may be made of a transparent conductive material.

A first driving voltage may be applied to the first electrode and a second driving voltage may be applied to the second electrode and the first active mirror during the first period, such that the first active mirror is tilted toward the first electrode.

The first driving voltage may be applied to the second electrode and the second driving voltage may be applied to the first electrode and the first active mirror during the second period, such that the first active mirror is tilted toward the second electrode.

The first display device may display a first image during the first period and displays a second image during the second period.

The first active mirror may reflect an image displayed on a first area of the first display device toward the first surface during the first period and may reflect an image displayed on a second area of the first display device toward the first surface during the second period.

The first active mirror may reflect an image displayed on a third area of the first display device toward the first surface during a third period and may reflect an image displayed on a fourth area of the first display device toward the first surface during a fourth period.

The first lens may include a first lens part; and a second lens part having a groove formed in a side surface thereof that faces a side surface of the first lens part, where the first active mirror may be accommodated in the groove.

The optical device may further include: a first electrode, a second electrode, a third electrode, and a fourth electrode disposed on a floor of the groove; and a mirror support disposed on the floor of the groove to support the first active mirror.

A first driving voltage may be applied to the first electrode and a second driving voltage may be applied to the second electrode, the third electrode, the fourth electrode, and the first active mirror during the first period, such that the first active mirror is tilted toward the first electrode.

The first driving voltage may be applied to the second electrode and the second driving voltage may be applied to the first electrode, the third electrode, the fourth electrode, and the first active mirror during the second period, such that the first active mirror is tilted toward the second electrode.

The first driving voltage may be applied to the third electrode and the second driving voltage may be applied to the first electrode, the second electrode, the fourth electrode, and the first active mirror during a third period, such that the first active mirror is tilted toward the third electrode.

The first driving voltage may be applied to the fourth electrode and the second driving voltage may be applied to the first electrode, the second electrode, the third electrode, and the first active mirror during a fourth period, such that the first active mirror is tilted toward the fourth electrode.

Another exemplary embodiment of the present invention provides an optical device including: a first lens having a first surface and a plurality of side surfaces; a first display device disposed on a first side surface of the side surfaces of the first lens; a second display device disposed on a second side surface of the side surfaces of the first lens; and a first active mirror disposed in the first lens. The first active mirror is configured to reflect a first image displayed by the first display device toward the first surface during a first period and to reflect a second image displayed by the second display device toward the first surface during a second period.

The first side surface and the second side surface of the first lens may face each other.

The first active mirror may be tilted at a first angle during the first period and tilted at a second angle during the second period, and each of the first and second angles may be measured from a height direction of the first lens toward a thickness direction of the first lens.

The first active mirror may be tilted at a first angle during the first period and may be tilted at a second angle during the second period, and each of the first and second angles may be measured from a width direction of the first lens toward a height direction of the first lens.

The optical device may further include: a third display device disposed on a third side surface of the plurality of side surfaces of the first lens; and a fourth display device disposed on a fourth side surface of the plurality of side surfaces of the first lens.

The first active mirror may reflect a third image displayed by the third display device toward the first surface during the third period and may reflect a fourth image displayed by the fourth display device toward the first surface during the fourth period.

The third side surface and the fourth side surface of the first lens may face each other.

Another exemplary embodiment of the present invention provides a method of driving an optical device, including: displaying a first image on a first display device during a first period; applying a first driving voltage to a first electrode and applying a second driving voltage to a second electrode and to the first active mirror so that a first active mirror is tilted at a first angle during the first period; displaying a second image on the first display device during a second period; and applying the first driving voltage to the second electrode and applying the second driving voltage to the first electrode and the first active mirror so that the first active mirror is tilted at a second angle during a second period.

Another exemplary embodiment of the present invention provides a method of driving an optical device, the method including: displaying a first image on a first display device disposed on a first side surface of a first lens during a first period; reflecting the first image on the first display device by a first active mirror so that it exits through a first surface during the first period; displaying a second image on a second display device disposed on a second side surface of the first lens during a second period; and reflecting the second image of the second display device by the first active mirror during the second period so that it exits through the first surface of the first lens.

Another exemplary embodiment of the present invention provides a method of driving an optical device, the method including: displaying a third image on a third display device disposed on a third side surface of a first lens during a third period; reflecting the third image on the third display device by the first active mirror so that it exits through the first surface during the third period; displaying a fourth image on a fourth display device disposed on a fourth side surface of the first lens during a fourth period; and reflecting the fourth image on the fourth display device by the first active mirror during the fourth period so that it exits through the first surface of the first lens.

Another exemplary embodiment of the present invention provides a method of driving an optical device, the method including: reflecting a first image displayed in a first area of a first display device disposed on a first side surface of a first lens by a first active mirror during a first period so that it exits through a first surface; reflecting a second image displayed in a second area of the first display device by the first active mirror during a second period so that it exits through the first surface of the first lens; reflecting a third image displayed in a third area of the first display device by the first active mirror during a third period so that it exits through the first surface of the first lens; and reflecting a fourth image displayed in a fourth area of the first display device by the first active mirror during a fourth period so that it exits through the first surface of the first lens.

According to the aforementioned and other exemplary embodiments of the present invention, a display device is disposed on one of the side surfaces of a lens, and an active mirror is tilted at a first angle during a first period so that an image on the display device can be provided to a user's eyes while the active mirror is tilted at a second angle during a second period so that an image on the display device can be provided to the user's eyes. By doing so, the user can see the first image displayed on the display device during the first period as a virtual image, and the second image displayed on the display device during the second period as a virtual image. Therefore, the part of the display device that is viewed by a user, i.e., the user's field-of-view (FOV), can be expanded without increasing the number of mirrors or even without increasing the area of the display device.

According to the aforementioned and other exemplary embodiments of the present invention, an active mirror is tilted at a first angle during a first period so that an image on a display device disposed on one side surface of a lens can be provided to a user's eyes, and the active mirror is tilted at a second angle during a second period so that an image from a display device disposed on another side surface of the lens can be provided to the user's eyes. That is to say, the user can see the first image displayed on the display device disposed on one side surface of the lens during the first period as a virtual image, and the second image displayed on the display device disposed on another side surface of the lens during the second period as a virtual image. Therefore, the part of the display device that is seen by a user, i.e., the user's field-of-view (FOV), can be expanded without increasing the number of mirrors.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 12 is an exploded perspective view showing an example of the first lens of FIG. 11.

FIG. 21 is a flowchart illustrating a method of providing an augmented reality by an optical device according to an exemplary embodiment of the present invention.

FIG. 26 is a flowchart illustrating a method of providing an augmented reality by an optical device according to an exemplary embodiment of the present invention.

DETAILED DESCRIPTION

Figure 1:
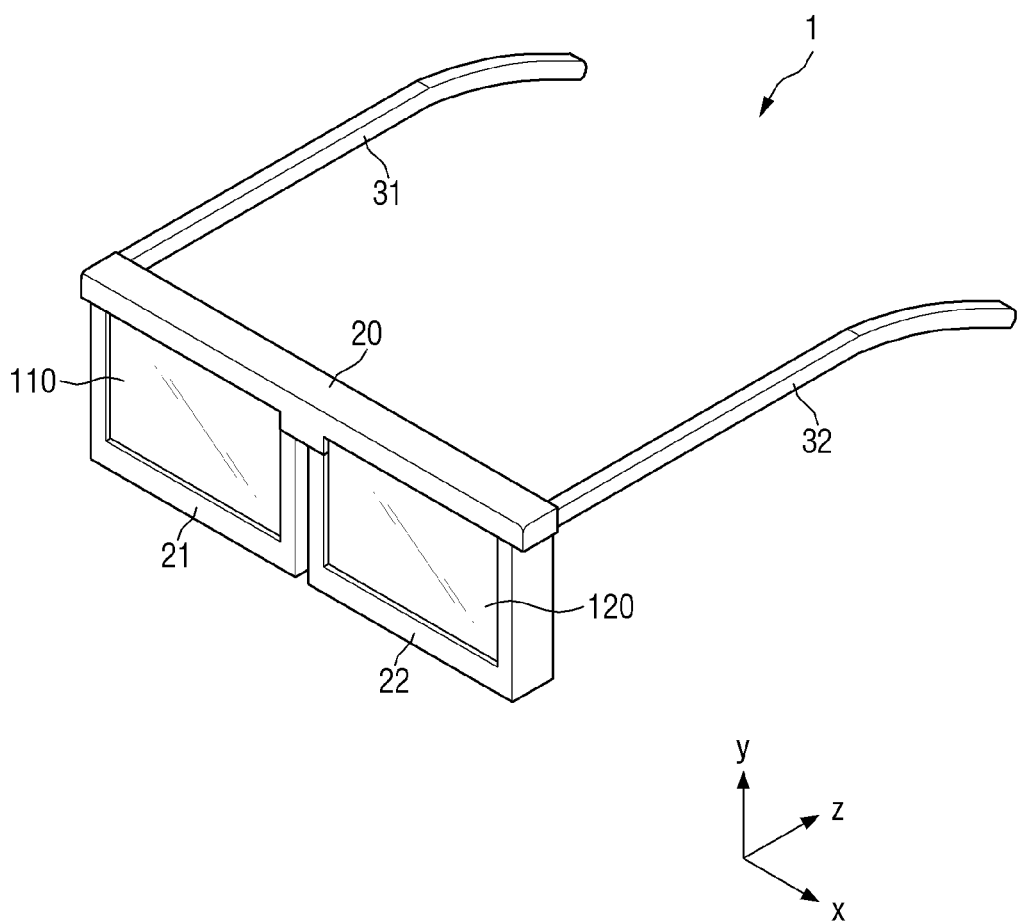
FIG. 1 is a perspective view showing an optical device according to an exemplary embodiment of the present invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
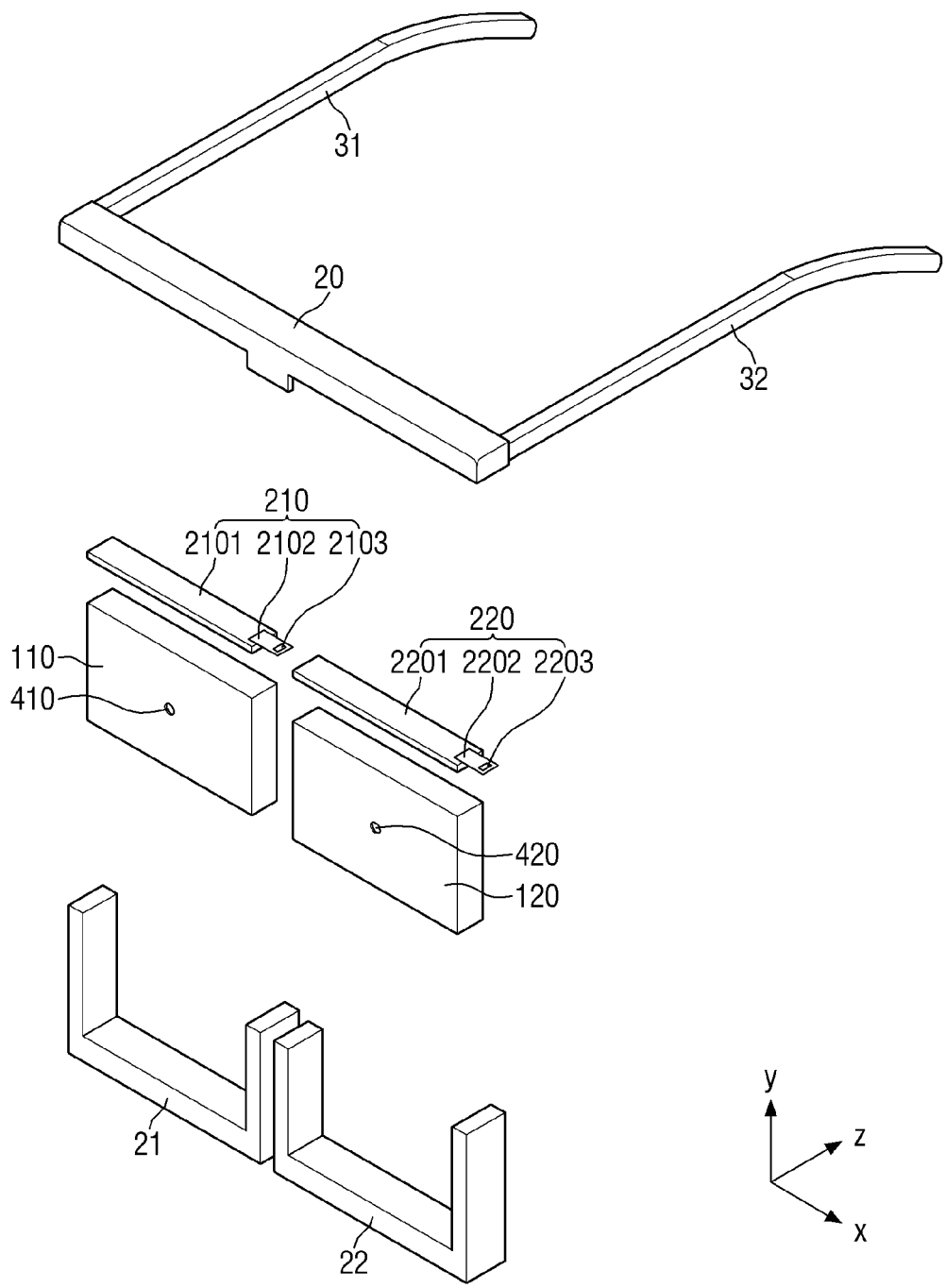
FIG. 2 is an exploded perspective view showing an optical device according to an exemplary embodiment of the present invention.
Figure 3:
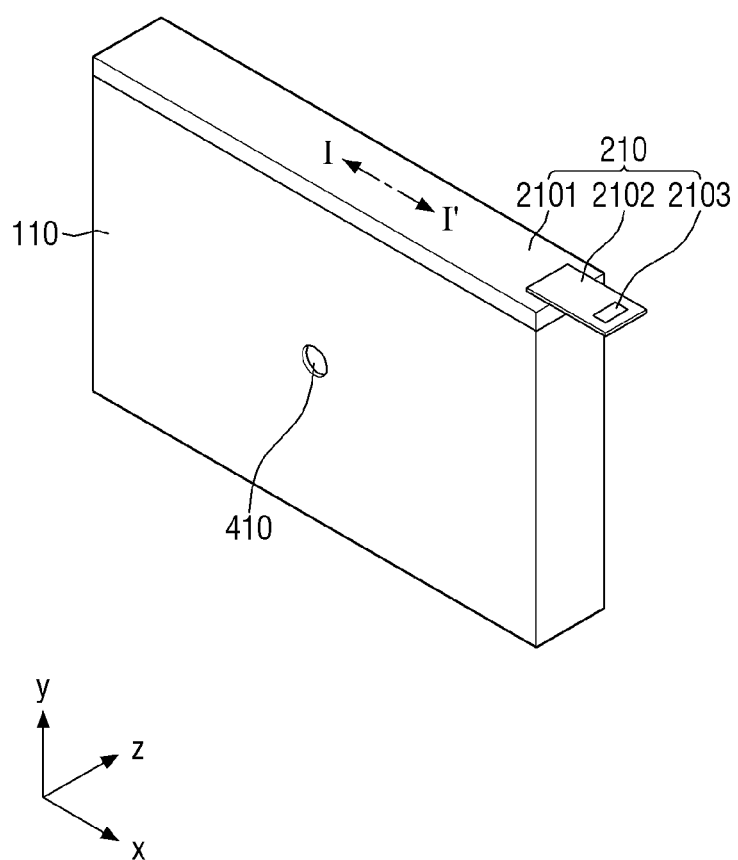
FIG. 3 is a perspective view showing an example of the first lens and the first display device of FIG. 2.
Figure 4:
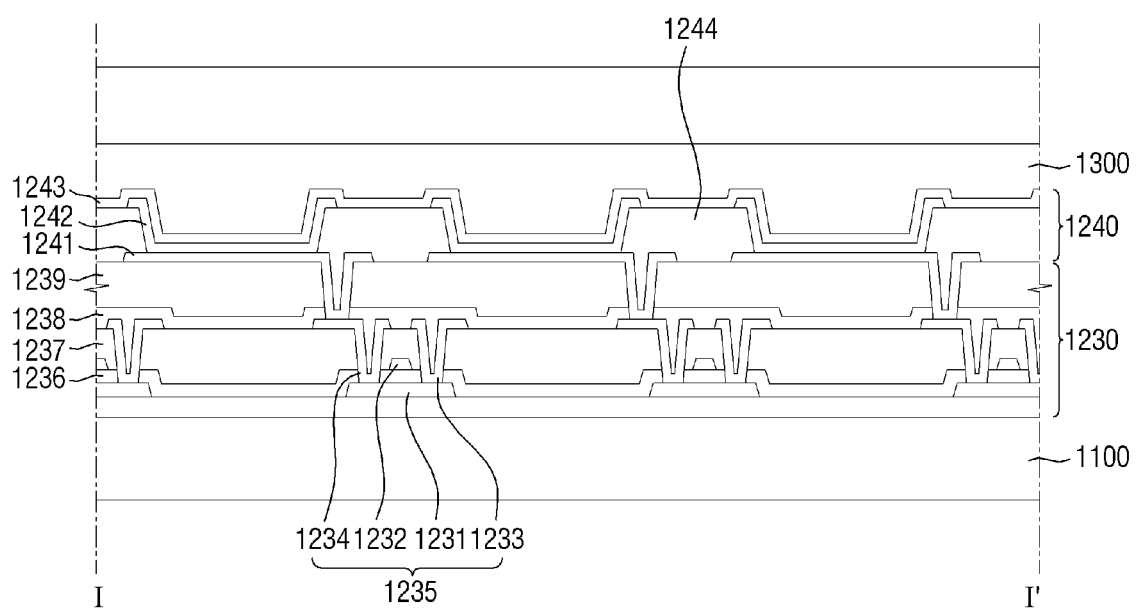
FIG. 4 is a cross-sectional view showing the first display device of FIG. 3 in detail.

FIG. 1 is a perspective view showing an optical device according to an exemplary embodiment of the present invention. FIG. 2 is an exploded perspective view showing an optical device according to an exemplary embodiment of the present invention. FIG. 3 is a perspective view showing an example of a first lens and a first display device of FIG. 2. FIG. 4 is a cross-sectional view showing the display device of FIG. 2 in detail.

Referring to FIGS. 1 to 4, an optical device 1 according to an exemplary embodiment of the present invention includes a top bar 20, a first lens frame 21, a second lens frame 22, a first temple 31, a second temple 32, a first lens 110, a second lens 120, a first display device 210, a second display device 220, a first active mirror 410, and a second active mirror 420. The optical device 1 may be a device for implementing an augmented reality or displaying a virtual image.

As used herein, the terms "above," "top" and "upper surface" refer to the side indicated by the arrow in the z-axis direction, whereas the terms "below," "bottom" and "lower surface" refer to the opposite side in the z-axis direction. In addition, the "left side" refers to the opposite direction indicated by the arrow of the x-axis, the "right side" refers to the direction indicated by the arrow of the x-axis, the "upper side" refers to the direction indicated by the arrow of the y-axis, and the "lower side" refers to the opposite direction indicated by the arrow of the y-axis.

The top bar 20 serves to support the first lens 110 and the second lens 120 together with the first lens frame 21 and the second lens frame 22. The first lens 110 may be surrounded by the top bar 20 and the first lens frame 21. The second lens 120 may be surrounded by the top bar 20 and the second lens frame 22.

The top bar 20 may be disposed on the upper side of the first lens 110 and on the upper side of the second lens 120. The top bar 20 may be elongated in the first direction (x-axis direction).

The first lens frame 21 may be disposed on the left side, the lower side, and the right side of the first lens 110. The first lens frame 21 may be coupled to the top bar 20. The second lens frame 22 may be disposed on the left side, the lower side and the right side of the second lens 120. The second lens frame 22 may be coupled to the top bar 20. Each of the first lens frame 21 and the second lens frame 22 may include a nose pad.

Although the top bar 20, the first lens frame 21 and the second lens frame 22 are separately formed and coupled to one another in the example shown in FIG. 2, this is merely illustrative. The top bar 20, the first lens frame 21 and the second lens frame 22 may be formed as a single piece.

The first temple 31 may be fixed to the left end of the lower side of the top bar 20. The second temple 32 may be fixed to the right end of the lower side of the top bar 20. Each of the first temple 31 and the second temple 32 may be fixed to the top bar 20 by a fixing member, such as a screw.

Each of the top bar 20, the first lens frame 21, the second lens frame 22, the first temple 31, and the second temple 32 may be made of plastic, metal or a combination of plastic and metal. The first lens frame 21 and the second lens frame 22 may be omitted.

Each of the first lens 110 and the second lens 120 may be formed of glass or plastic to be transparent or translucent. Accordingly, a user can see a real-world image through the first lens 110 and the second lens 120. The first lens 110 and the second lens 120 may have refractive power taking into account the user's eyesight.

Each of the first lens 110 and the second lens 120 may have a hexahedron shape with a quadrangular upper face, a quadrangular lower face, and quadrangular first to fourth side faces. The top surface of the first lens 110 may be located toward a user's right eye RE. Light from the first display device 210 is reflected by the first active mirror 410 and may exit through the top surface. The bottom surface of the first lens 110 may be located on the outer side of the first lens 110. The top surface of the second lens 120 may be located toward a user's left eye LE. Light from the second display device 220 is reflected by the second active mirror 420 and may exit through the top surface. The bottom surface of the second lens 120 may be located on the outer side of the second lens 120.

Each of the first lens 110 and the second lens 120 is not limited to that shown in FIGS. 1 and 2, and may be formed as a polyhedron having a first face, a second face, and side faces in polygonal shapes. In addition, each of the first lens 110 and the second lens 120 may be formed in other shapes, such as a cylindrical shape, an elliptical column shape, a semi-cylindrical shape, a semi-elliptical column shape, a distorted cylindrical shape and a distorted semi-cylindrical shape, in addition to the polyhedron shape. Distorted cylindrical and semi-cylindrical shapes refer to cylindrical and semi-cylindrical shapes having irregular diameters.

The first active mirror 410 is disposed in the first lens 110. The second active mirror 420 is disposed in the second lens 120. Each of the first active mirror 410 and the second active mirror 420 may be a small mirror, such as a pin mirror. Although the first active mirror 410 and the second active mirror 420 each have a circular cross-section in the example shown in FIGS. 1 and 2, this is merely illustrative. The first active mirror 410 and the second active mirror 420 may alternatively have an elliptical or polygonal cross-section.

The first active mirror 410 may reflect first image displayed on the first display device 210 to provide the reflected first image to the user's right eye RE. The second active mirror 420 may reflect second image displayed on the second display device 220 to provide the reflected second image to the user's left eye LE.

The first active mirror 410 and the second active mirror 420 may be formed to be smaller than the size of the pupils of the right eye RE and the left eye LE, respectively. For example, the diameter of the first active mirror 410 and the diameter of the second active mirror 420 may range from 500 μm to 4 mm. In such case, since the user focuses on the real-world image, the user is not likely to recognize the first active mirror 410 and the second active mirror 420. However, if the sizes of the first active mirror 410 and second active mirror 420 become smaller, the brightness of the first image of the first display device 210 provided to the user's right eye RE and the brightness of the second image of the second display device 220 provided to the user's left eye LE may decrease. Therefore, the size of the first active mirror 410 and the size of the second active mirror 420 may be determined so that the mirrors are not recognizable without decreasing the brightness.

Each of the first active mirror 410 and the second active mirror 420 may have a cylindrical shape, as shown in FIGS. 1 and 2. Each of the first active mirror 410 and the second active mirror 420 may include two bottom surfaces. One of the two bottom surfaces may be reflective while the other of the two bottom surfaces and the side surfaces may not be reflective.

Figure 9A:
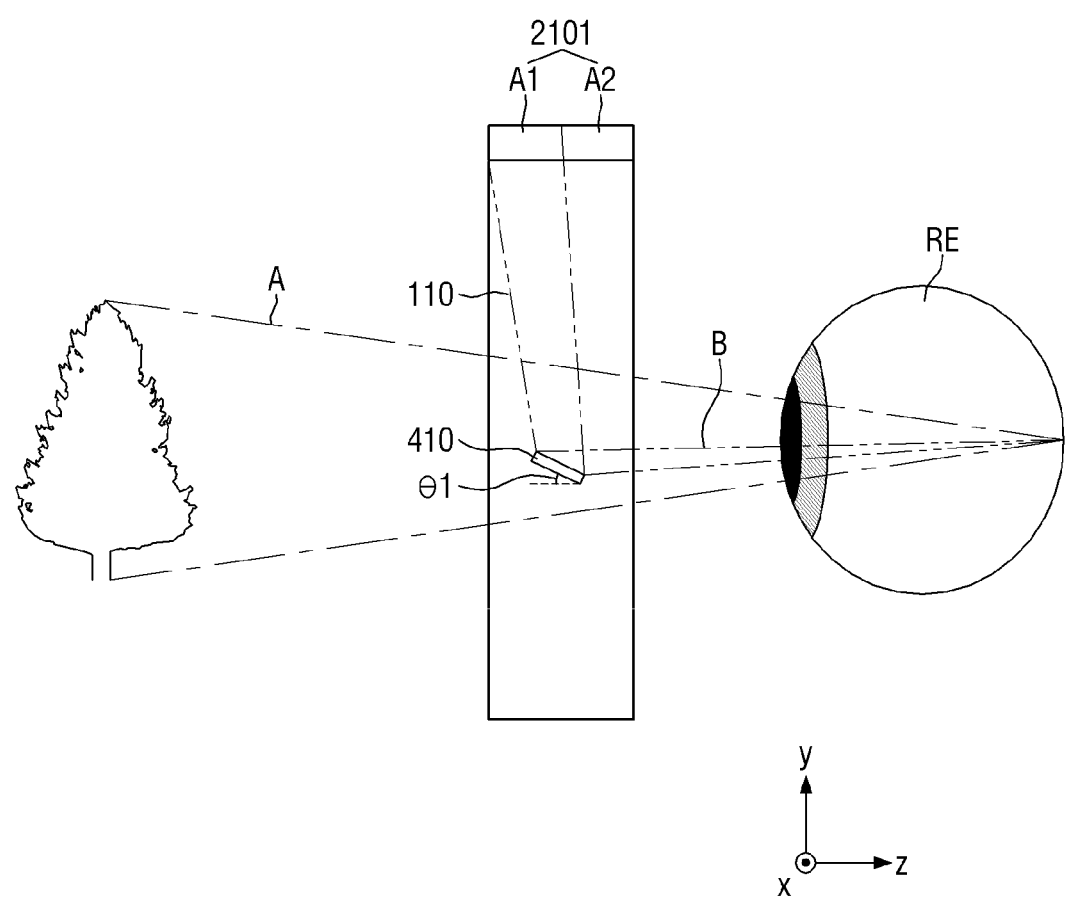
FIGS. 9A and 9B are views illustrating an example of a method of providing an augmented reality by an optical device according to an exemplary embodiment of the present invention.
Figure 9B:
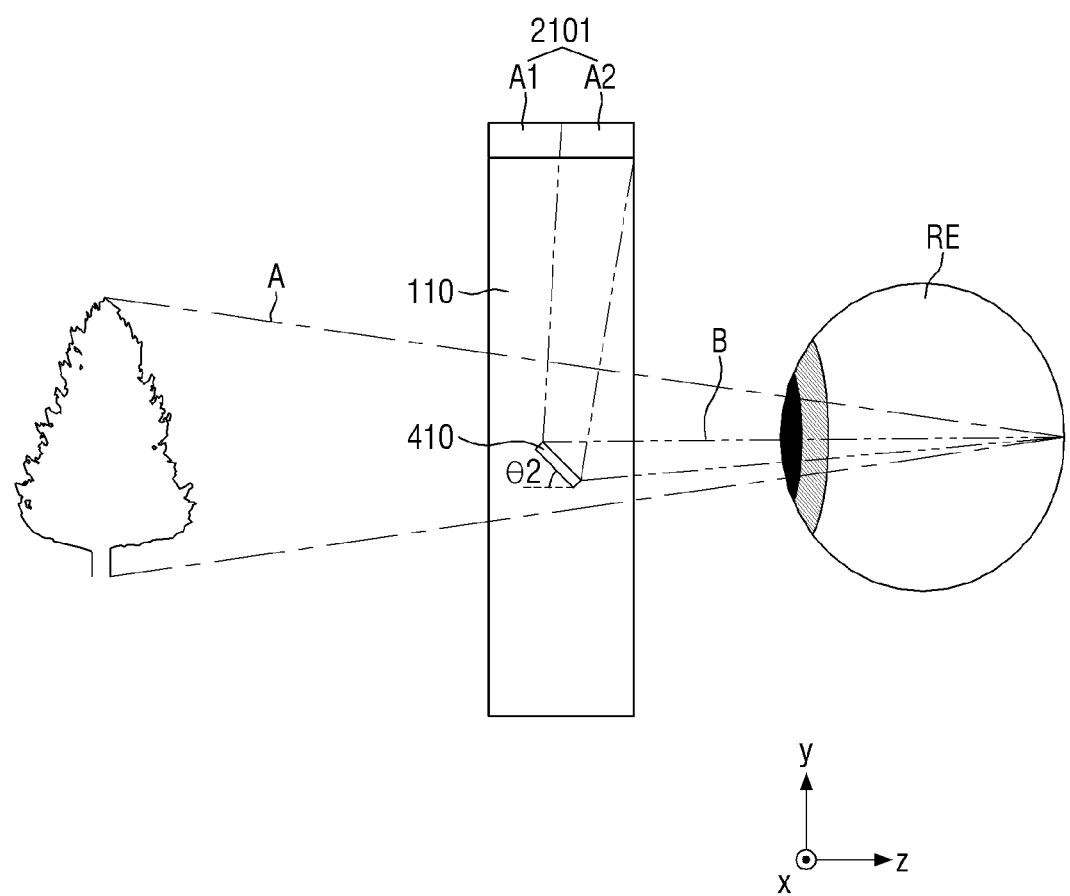

Each of the first active mirror 410 and the second active mirror 420 may be disposed to overlap a first electrode and a second electrode. The tilt angle may be adjusted according to the driving voltages applied to the first active mirror 410, the second active mirror 420, the first electrode, and the second electrode. For example, the first active mirror 410 may be tilted at a first angle during a first period and at a second angle during a second period. By doing so, the first display device 210 may display the first image during the first period and the second display device 220 may display the second image during the second period. Accordingly, the first image displayed by the first display device 210 during the first period may be focused on the retina of the user's right eye RE. As shown in FIGS. 9A and 9B, an object A is focused on the retina of the user's right eye RE and the first image B displayed by the first display device 210 may be focused on the retina of the user's right eye RE. Accordingly, the user can clearly see the object A and the first image B even without focusing on the first image B with her/his right eye RE.

In addition, the second image displayed by the second display device 220 during the second period may be focused on the retina of the user's left eye LE. Similar to FIGS. 9A and 9B, the object is focused on the retina of the user's left eye LE and the second image displayed by the second display device 220 may be focused on the retina of the user's left eye LE. Accordingly, the user can clearly see the object and the second image even without focusing on the second image with her/his left eye LE.

Figure 6:
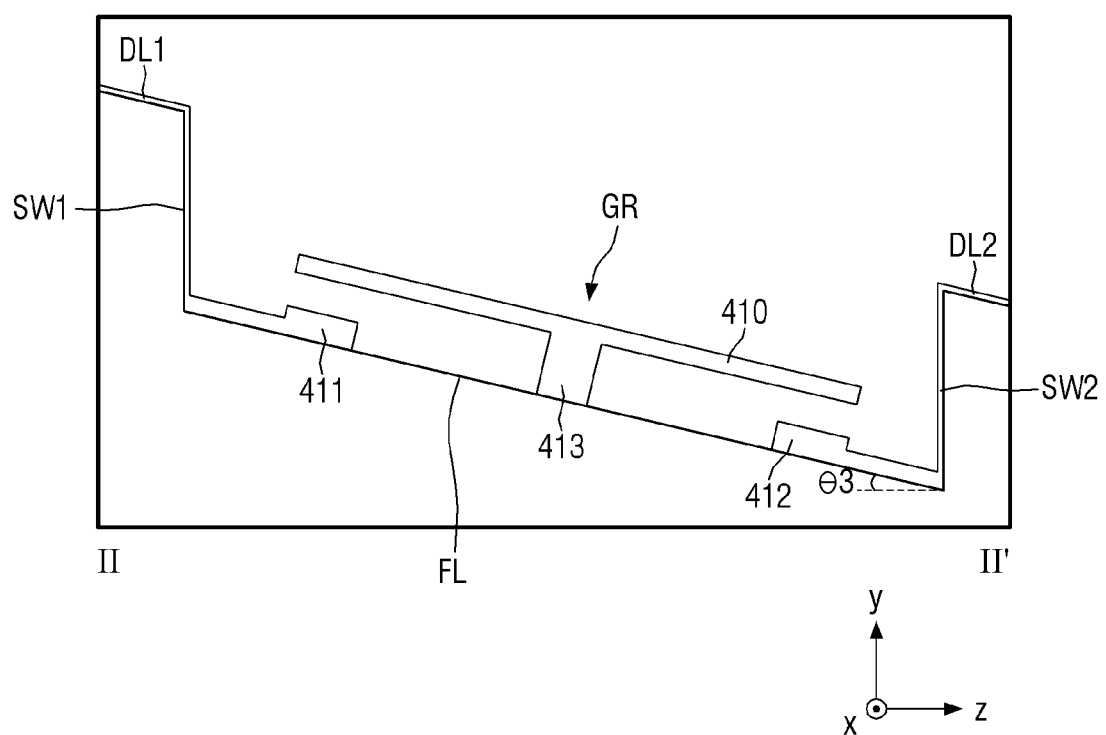
FIG. 6 is a cross-sectional view showing in detail an example of the first electrode, the second electrode, the mirror support and the first active mirror disposed in the groove of FIG. 5A.
Figure 7A:
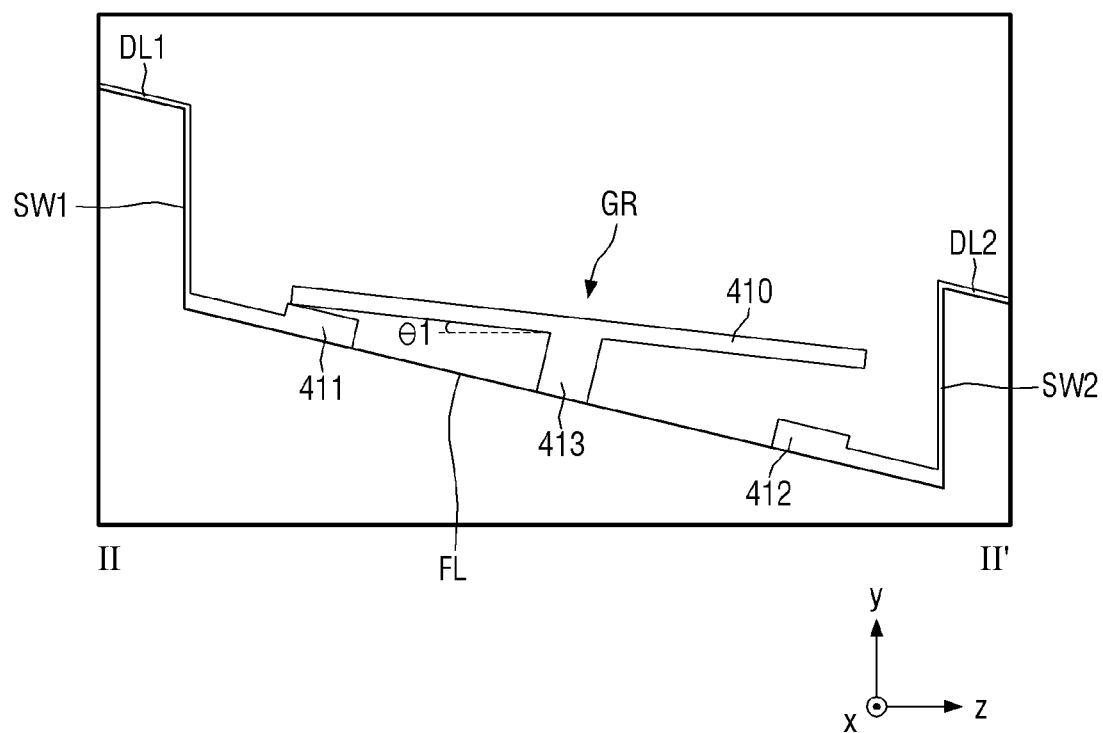
FIGS. 7A and 7B are views showing how the tilt angle of the first active mirror changes according to the driving voltages applied to the first electrode, the second electrode and the first active mirror.
Figure 7B:
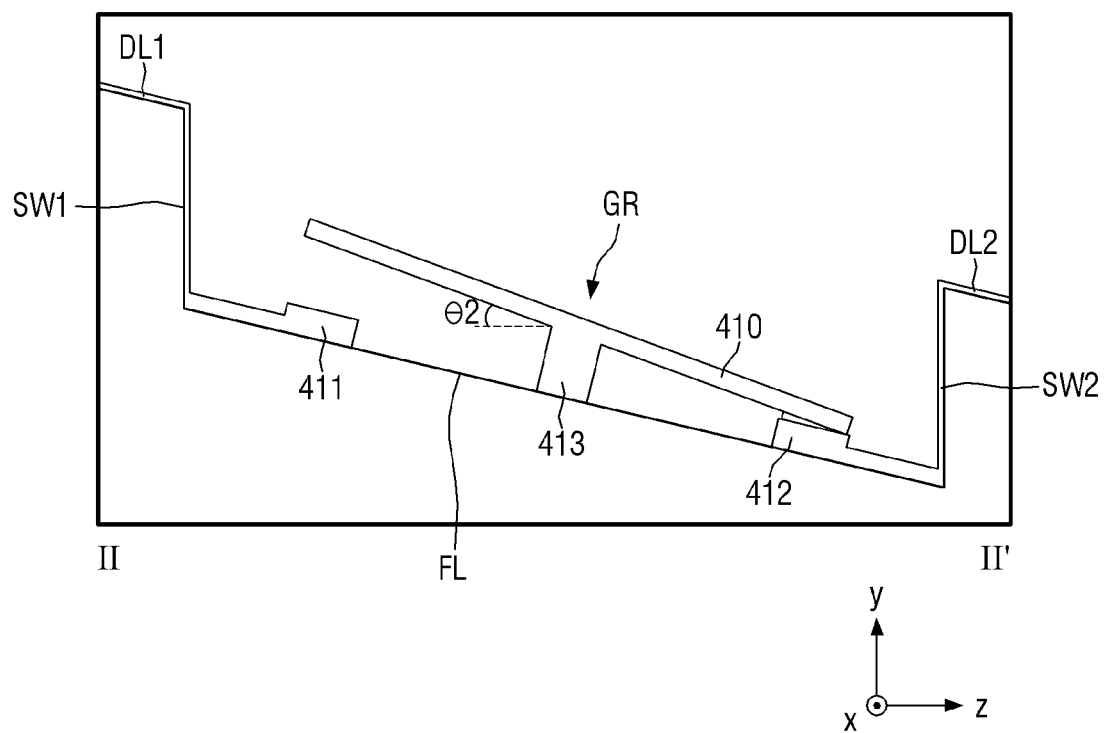

Each of the first and second active mirrors 410 and 420 may be implemented as an electrostatic mirror, a micro mirror used in a digital micro mirror device (DMD) or a piezoelectric mirror. In the following description, each of the first active mirror 410 and the second active mirror 420 is implemented as an electrostatic mirror as shown in FIGS. 6, 7A and 7B for convenience of illustration.

Each of the first display device 210 and the second display device 220 displays a virtual image for realizing an augmented reality. The first display device 210 may display the first image as a virtual image, and the second display device 220 may display the second image as a virtual image.

The first display device 210 may include a first display panel 2101, a first circuit board 2102, and a first driving circuit 2103. The second display device 220 may include a second display panel 2201, a second circuit board 2202, and a second driving circuit 2203.

The first display panel 2101 may be disposed on one of the side surfaces of the first lens 110. The second display panel 2201 may be disposed on one of the side surfaces of the second lens 120. The first display panel 2101 and the second display panel 2201 may be covered by the top bar 20, the first lens frame 21, and/or the second lens frame 22.

For example, as shown in FIGS. 2 and 3, the first display panel 2101 may be disposed on the upper side of the first lens 110, and the second display panel 2201 may be disposed on the upper side of the second lens 120. Since the first display panel 2101 and the second display panel 2201 can be covered by the top bar 20, the first lens frame 21 and the second lens frame 22 may be eliminated depending on design choice.

It is, however, to be understood that the position of the first display panel 2101 and the position of the second display panel 2201 are not limited to those shown in FIGS. 2 and 3. The first display panel 2101 may be disposed at any one of the side surfaces of the first lens 110 as long as the first image can be reflected by the first active mirror 410 toward an exit surface of the first lens 110. The exit surface of the first lens 110 refers to a first surface of the first lens 110 opposing the user's right eye RE. The second display panel 2201 may be disposed at any one of the side surfaces of the second lens 120 as long as the second image can be reflected by the second active mirror 420 toward the exit surface of the second lens 120. The exit surface of the second lens 120 refers to a first surface of the second lens 120 opposing the user's left eye LE.

Each of the first display panel 2101 and the second display panel 2201 may be a flexible display panel, which can be curved, rolled or bent. For example, each of the first display panel 2101 and the second display panel 2201 may be an organic light-emitting display panel or an organic light-emitting display panel including quantum dots. In the following description, the first display panel 2101 and the second display panel 2201 are implemented as organic light-emitting display panels, as shown in FIG. 4.

The first display panel 2101 may include a substrate 1100, a thin-film transistor layer 1230, a light-emitting element layer 1240, and a thin-film encapsulation layer 1300, as shown in FIG. 4.

The thin-film transistor layer 1230 is formed on the substrate 1100. The thin-film transistor layer 1230 includes thin-film transistors 1235, a gate insulating layer 1236, an interlayer dielectric layer 1237, a protective layer 1238, and a planarization layer 1239.

A buffer layer may be formed on the substrate 1100. The buffer layer may be formed on the substrate 1100 to protect the thin-film transistors 1235 and the light-emitting elements from moisture permeating through the substrate 1100 that is susceptible to moisture permeation. The buffer layer may be formed of a plurality of inorganic layers stacked on one another alternately. For example, the buffer layer may be made up of multiple layers in which one or more inorganic layer of a silicon oxide layer ($SiO_x$), a silicon nitride layer ($SiN_x$) and SiON are stacked on one another alternately. The buffer layer may be eliminated.

The thin-film transistors 1235 are disposed on the buffer layer. Each of the thin-film transistors 1235 includes an active layer 1231, a gate electrode 1232, a source electrode 1233, and a drain electrode 1234. In FIG. 4, each of the thin-film transistors 1235 is implemented as a top-gate transistor in which the gate electrode 1232 is located above the active layer 1231. It is, however, to be understood that the inventive concepts are not limited thereto. That is to say, each of the thin-film transistors 1235 may be implemented as a bottom-gate transistor in which the gate electrode 1232 is located below the active layer 1231, or as a double-gate transistor in which the gate electrodes 1232 are disposed above and below the active layer 1231.

The active layer 1231 is formed on the buffer layer. The active layer 1231 may be formed of a silicon-based semiconductor material or an oxide-based semiconductor material. A light-blocking layer for blocking external light incident on the active layer 1231 may be formed between the buffer layer and the active layer 1231.

The gate insulating layer 1236 may be formed on the active layer 1231. The gate insulating layer 1236 may be formed of an inorganic layer, for example, a silicon oxide layer ($SiO_x$), a silicon nitride layer ($SiN_x$), or a multilayer thereof.

The gate electrode 1232 and a gate line may be formed on the gate insulating layer 1236. The gate electrode 1232 and the gate line may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

The interlayer dielectric layer 1237 may be formed over the gate electrode 1232 and the gate line. The interlayer dielectric layer 1237 may be formed of an inorganic layer, for example, a silicon oxide layer ($SiO_x$), a silicon nitride layer ($SiN_x$), or a multilayer thereof.

The source electrode 1233, the drain electrode 1234, and a data line may be formed on the interlayer dielectric layer 1237. Each of the source electrode 1233 and the drain electrode 1234 may be connected to the active layer 1231 through a contact hole penetrating the gate insulating layer 1236 and the interlayer dielectric layer 1237. The source electrode 1233, the drain electrode 1234, and the data line may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

The protective layer 1238 may be formed on the source electrode 1233, the drain electrode 1234, and the data line in order to insulate the thin-film transistors 1235. The protective layer 1238 may be formed of an inorganic layer, e.g., a silicon oxide layer ($SiO_x$), a silicon nitride layer ($SiN_x$), or a multilayer thereof.

The planarization layer 1239 may be formed on the protective layer 1238 to provide a flat surface over the step differences of the thin-film transistors 1235. The planarization layer 1239 may be formed of an organic layer, such as an acryl resin, an epoxy resin, a phenolic resin, a polyamide resin, or a polyimide resin.

The light-emitting element layer 1240 is formed above the thin-film transistors 1230. The light-emitting element layer 1240 includes the light-emitting elements and banks 1244.

The light-emitting elements and the banks 1244 are formed on the planarization layer 1239. The light-emitting element may be an organic light-emitting device. In such a case, the light-emitting element may include an anode electrode 1241, an emissive layer 1242 and a cathode electrode 1243.

The anode electrode 1241 may be formed on the planarization layer 1239. The anode electrode 1241 may be connected to the drain electrode 1234 of the respective thin-film transistor 1235 through a contact hole penetrating the protective layer 1238 and the planarization layer 1239.

The banks 1244 may cover the edge of the anode electrode 1241 on the planarization layer 1239 in order to separate the pixels from one another. That is to say, the banks 1244 serve to define the pixels. In each of the pixels, the anode electrode 1241, the emissive layer 1242, and the cathode electrode 1243 are sequentially stacked on one another so that holes from the anode electrode 1241 and electrons from the cathode electrode 1243 combine in the emissive layer 1242 to emit light.

The emissive layers 1242 are formed on the anode electrode 1241 and the banks 1244. The emissive layer 1242 may be an organic emissive layer. The emissive layer 1242 may emit one of red light, green light, and blue light. The peak wavelength range of red light may range from approximately 620 to 750 nm, and the peak wavelength range of green light may range from approximately 495 to 570 nm. In addition, the wavelength range of the blue light may range from approximately 450 to 495 nm. Alternatively, the emissive layer 1242 may be a white emissive layer that emits white light. In such case, the red emissive layer, the green emissive layer and the blue emissive layer may be stacked on one another or may be formed commonly across the pixels as a common layer. In such case, the first display device 210 may further include additional color filters for representing red, green and blue colors.

The emissive layer 1242 may include a hole transporting layer, a light-emitting layer, and an electron transporting layer. In addition, the emissive layer 1242 may be formed in a tandem structure of two or more stacks, in which case a charge generating layer may be formed between the stacks.

The cathode electrode 1243 is formed on the emissive layer 1242. The cathode electrode 1243 may be formed to cover the emissive layer 1242. The cathode electrode 1243 may be a common layer formed across the pixels.

When the light-emitting element layer 1240 is of a top-emission type in which light exits toward the upper side, the anode electrode 1241 may be made of a metal material having a high reflectivity such as a stack structure of aluminum and titanium (Ti/Al/Ti), a stack structure of aluminum and ITO (ITO/Al/ITO), an APC alloy, and a stack structure of APC alloy and ITO (ITO/APC/ITO). The APC alloy is an alloy of silver (Ag), palladium (Pd), and copper (Cu). The cathode electrode 1243 may be formed of a transparent conductive material (TCP) such as ITO and IZO that can transmit light, or a semi-transmissive conductive material such as magnesium (Mg), silver (Ag) and an alloy of magnesium (Mg) and silver (Ag). When the cathode electrode 1243 is formed of a semi-transmissive conductive material, the light extraction efficiency can be increased by using microcavities.

When the light-emitting element layer 1240 is of a bottom-emission type in which is light exits toward the lower side, the anode electrode 1241 may be formed of a transparent conductive material (TCP) such as ITO and IZO that can transmit light, or a semi-transmissive conductive material such as magnesium (Mg), silver (Ag) and an alloy of magnesium (Mg) and silver (Ag). The cathode electrode 1243 may be made of a metal material having a high reflectivity, such as a stack structure of aluminum and titanium (Ti/Al/Ti), a stack structure of aluminum and ITO (ITO/Al/ITO), an APC alloy and a stack structure of APC alloy and ITO (ITO/APC/ITO). When the anode electrode 1241 is formed of a semi-transmissive conductive material, the light extraction efficiency can be increased by using microcavities.

The thin-film encapsulation layer 1300 is formed on the light-emitting element layer 1240. The thin-film encapsulation layer 1300 serves to prevent permeation of oxygen or moisture into the emissive layer 1242 and the cathode electrode 1243. To this end, the thin-film encapsulation layer 1300 may include at least one inorganic layer. The inorganic layer may be formed of silicon nitride, aluminum nitride, zirconium nitride, titanium nitride, hafnium nitride, tantalum nitride, silicon oxide, aluminum oxide, or titanium oxide. Further, the thin-film encapsulation layer 1300 may further include at least one organic layer. The organic layer may have a sufficient thickness to prevent particles from permeating into the thin-film encapsulation layer 1300 to enter the emissive layer 1242 and the cathode electrode 1243. The organic layer may include one of epoxy, acrylate, and urethane acrylate. An encapsulation substrate may be disposed on the light-emitting element layer 1240 instead of the thin-film encapsulation layer 1300.

The second display panel 2201 may be substantially identical to the first display panel 2101 shown in FIG. 4. Therefore, redundant descriptions will be omitted.

The first circuit board 2102 may be attached to one end of the first display panel 2101. Alternatively, when there are many signal lines and voltage lines for driving the first display panel 2101, two first circuit boards 2102 may be attached to one end and the other end of the first display panel 2101, respectively.

The second circuit board 2202 may be attached to one end of the second display panel 2201. Alternatively, when there are many signal lines and voltage lines for driving the second display panel 2201, two second circuit boards 2202 may be attached to one end and the other end of the second display panel 2201, respectively.

The first circuit board 2102 and the second circuit board 2202 may be flexible printed circuit boards.

The first driving circuit 2103 may be implemented as an integrated circuit (IC) and may be mounted on the first circuit board 2102. The first driving circuit 2103 may supply data voltages, a supply voltage, etc., for driving the first display panel 2101 to the first display panel 2101.

The second circuit board 2202 may be implemented as an integrated circuit (IC) and may be mounted on the second circuit board 2202. The second circuit board 2202 may supply data voltages, a supply voltage, etc. for driving the second display panel 2201 to the second display panel 2201.

A power source for supplying power to the first and second display devices 210 and 220 may be incorporated into the first temple 31 or the second temple 32. The power source may be connected to the first circuit board 2102 via a first cable and may be connected to the second circuit board 2202 via a second cable.

A light path conversion layer may be disposed between the first display device 210 and one side surface of the first lens 110. The light path conversion layer can change the path of light of the first display device 210 so that the light of the first display device 210 proceeds to the first active mirror 410. The light path conversion layer may be a prism sheet including prism mountains.

A polarizing film may be disposed between the first display device 210 and one side surface of the first lens 110. The polarizing film may include a phase retardation film, such as a linear polarizer and a λ/4 (quarter-wave) plate. In such case, a linear polarizer may be disposed on one side surface of the first lens 110, and a phase retardation film may be disposed between the linear polarizer and the first display device 210. Accordingly, the polarizing film can provide the light from the first display device 210 to one side surface of the first lens 110 while blocking the light incident on the first display device 210 from one side surface of the first lens 110 from being reflected by the first display device 210 to exit through the side surface of the first lens 110.

Although FIGS. 2 and 3 show that the single first active mirror 410 is disposed in the first lens 110 and the single second active mirror 420 is disposed in the second lens 120, the number of the first active mirrors 410 disposed in the first lens 110 and the number of the second active mirrors 420 disposed in the second lens 120 are not limited thereto. That is to say, more than one first active mirrors 410 may be disposed in the first lens 110, and more than one second active mirrors 420 may be disposed in the second lens 120.

According to the exemplary embodiment shown in FIGS. 1 to 4, the display device is disposed on one of the side surfaces of the lens, and the active mirror is tilted at a first angle during a first period so that the image from the display device can be provided to the user's eyes, and the active mirror is tilted at a second angle during a second period so that the image from the display device can be provided to the user's eyes. That is to say, the user can see the first image displayed on the display device during the first period as a virtual image, and the second image displayed on the display device during the second period as a virtual image. Therefore, the part of the display device that is viewed by a user, i.e., the user's field-of-view (FOV), can be expanded without increasing the number of mirrors or even without increasing the area of the display device.

Figure 5A:
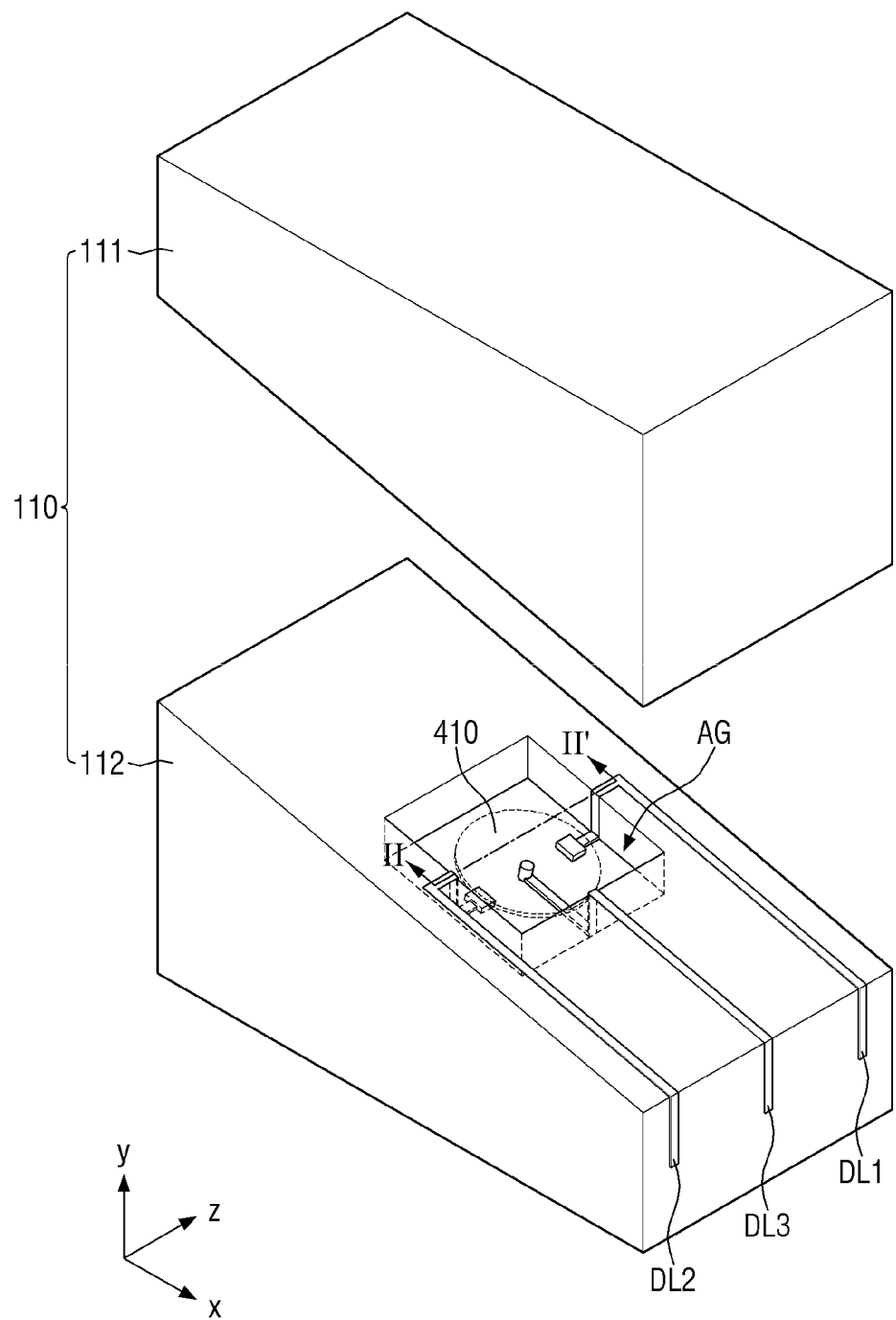
FIGS. 5A, 5B, 5C, and 5D are exploded perspective views showing examples of the first lens of FIG. 3.

FIG. 5A is an exploded perspective view showing an example of the first lens of FIG. 3.

Referring to FIG. 5A, the first lens 110 may include a first lens part 111 and a second lens part 112. The first lens part 111 may be an upper lens part disposed on the second lens part 112, and the second lens part 112 may be a lower lens part disposed under the first lens part 111.

Each of the first lens part 111 and the second lens part 112 may have a hexahedron shape with a trapezoid top face, a trapezoid bottom face, and trapezoid first to fourth side faces. The top surface of each of the first lens part 111 and the second lens part 112 may face the user's right eye RE while the bottom surface thereof may be opposite to it.

The lower surface of the first lens part 111 and the upper surface of the second lens part 112 may face each other. The lower surface of the first lens part 111 may be attached to the upper surface of the second lens part 112 by a transparent adhesive material. The upper surface of the first lens part 111 and the lower surface of the second lens part 112 may be extended in the first direction (x-axis direction) and may not be inclined at a predetermined angle. On the other hand, the lower surface of the first lens part 111 and the upper surface of the second lens part 112 may be inclined surfaces by a predetermined angle. The predetermined angle is measured from the third direction (z-axis direction), i.e., the thickness direction of the first lens 110 toward the second direction (y-axis direction), i.e., the height direction of the first lens 110.

The length of the left surface of the first lens part 111 in the second direction (y-axis direction) may be less than the length of the right surface thereof in the second direction (y-axis direction). The length of the left surface of the second lens part 112 in the second direction (y-axis direction) may be greater than the length of the right surface thereof in the second direction (y-axis direction).

A groove AG for accommodating the first active mirror 410 may be formed in the upper surface of the second lens part 112. Although the groove AG is formed as a quadrangular groove in the upper surface of the second lens part 112 in the example shown in FIG. 5A, it is to be understood that the groove AG may be formed in a polygonal shape other than a quadrangular shape, a circular shape, or an elliptical shape.

The floor of the groove AG may be inclined at a third predetermined angle θ3. The third predetermined angle θ3 is measured from the third direction (z-axis direction), i.e., the thickness direction of the first lens 110 toward the second direction (y-axis direction), i.e., the height direction of the first lens 110.

A mirror support connected to the first active mirror 410 for supporting it, a first electrode, and a second electrode for driving the first active mirror 410 may be formed on the floor of the groove AG.

The first electrode, the second electrode, and the mirror support may be arranged in parallel in the third direction (z-axis direction), i.e., the thickness direction of the first lens 110. The mirror support may be disposed between the first electrode and the second electrode in the third direction (z-axis direction).

A first driving line DL1 connected to the first electrode, a second driving line DL2 connected to the second electrode, and a third driving line DL3 connected to the mirror support may be formed on the second lens part 112. A driving voltage may be applied to each of the first driving line DL1, the second driving line DL2, and the third driving line DL3.

The first driving line DL1 may be connected to the first electrode on the floor of the groove AG and may be disposed on at least one of the sidewalls of the groove AG, the upper surface of the second lens part 112, and the right surface of the second lens part 112. The second driving line DL2 may be connected to the second electrode on the floor of the groove AG and may be disposed on at least one of the sidewalls of the groove AG, the upper surface of the second lens part 112, and the right surface of the second lens part 112. The third driving line DL3 may be connected to the mirror support on the floor of the groove AG and may be disposed on at least one of the sidewalls of the groove AG, the upper surface of the second lens part 112, and the right surface of the second lens part 112. Alternatively, the first driving line DL1, the second driving line DL2, and the third driving line DL3 may be disposed on the left surface of the second lens part 112, instead of the right surface of the second lens part 112.

The first driving line DL1, the second driving line DL2, and the third driving line DL3 may be connected to a third cable or sheathed lines. The third cable or the sheathed lines may be connected to the power source incorporated in the first temple 31 or the second temple 32 to apply power to the first display device 210 and the second display device 220. Alternatively, the third cable or the sheathed lines may be connected to the first circuit board 2102. The third cable or the sheathed lines may be covered by the top bar 20 and the first lens frame 21.

The first electrode, the second electrode, the mirror support, the first driving line DL1, the second driving line DL2, and the third driving line DL3 may be made of a transparent conductive material, such as a transparent conductive oxide. Accordingly, it is possible to prevent the light from the first display device 210 from being reflected or interfered by the first electrode, the second electrode, the mirror support, the first driving line DL1, the second driving line DL2, and the third driving line DL3. One of the bottom surfaces of the first active mirror 410 may be connected to the mirror support to receive a driving voltage via the mirror support and the third driving line DL3. Another one of the bottom surfaces of the first active mirror 410 may be formed of a metal having a high reflectance, such as silver (Ag).

The groove AG may be filled with a fluid, such as a liquid or a gas, in order to reduce a difference in the refractive index between the groove AG and the first lens part 111 and between the groove AG and the second lens part 112 or in order to match the refractive indices. For example, the difference in the refractive index between the fluid in the groove AG and the first lens part 111 and the difference in refractive index between the fluid and the second lens part 112 is preferably 0.5 or less.

Figure 5B:
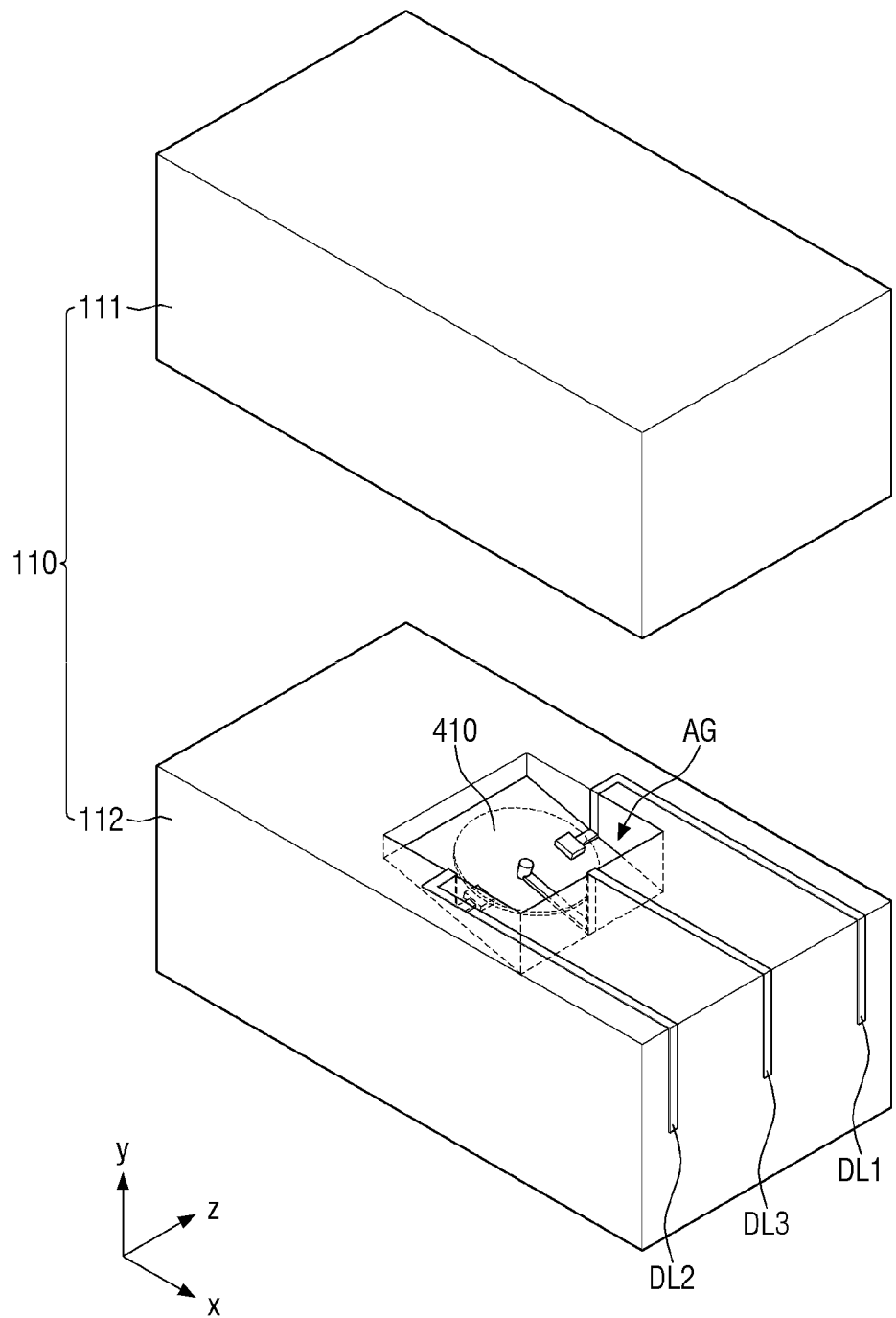

FIG. 5B is an exploded perspective view showing an example of the first lens of FIG. 3.

The first lens part 111 and the second lens part 112 shown in FIG. 5B are substantially identical to those shown in FIG. 5A except that they have a hexahedron shape with rectangular top, bottom and first to fourth side surfaces; and, therefore, any redundant descriptions will be omitted.

Referring to FIG. 5B, each of the first lens part 111 and the second lens part 112 may be formed as a hexahedron having a rectangular top surface, a rectangular bottom surface, and rectangular first to fourth side surfaces. In such case, the upper surface and the lower surface of the first lens part 111 and the upper surface and the lower surface of the second lens part 112 may be extended in the first direction (x-axis direction) and may not be inclined at a predetermined angle. The length of the left surface of the first lens part 111 in the second direction (y-axis direction) may be substantially equal to the length of the right surface thereof in the second direction (y-axis direction). The length of the left surface of the second lens part 112 in the second direction (y-axis direction) may be substantially equal to the length of the right surface thereof in the second direction (y-axis direction).

The lower surface of the first lens part 111 and the upper surface of the second lens part 112 are not inclined, while the floor of the groove AG may be inclined at the third predetermined angle θ3. The third predetermined angle θ3 is measured from the third direction (z-axis direction), i.e., the thickness direction of the first lens 110 toward the second direction (y-axis direction), i.e., the height direction of the first lens 110.

Figure 5C:
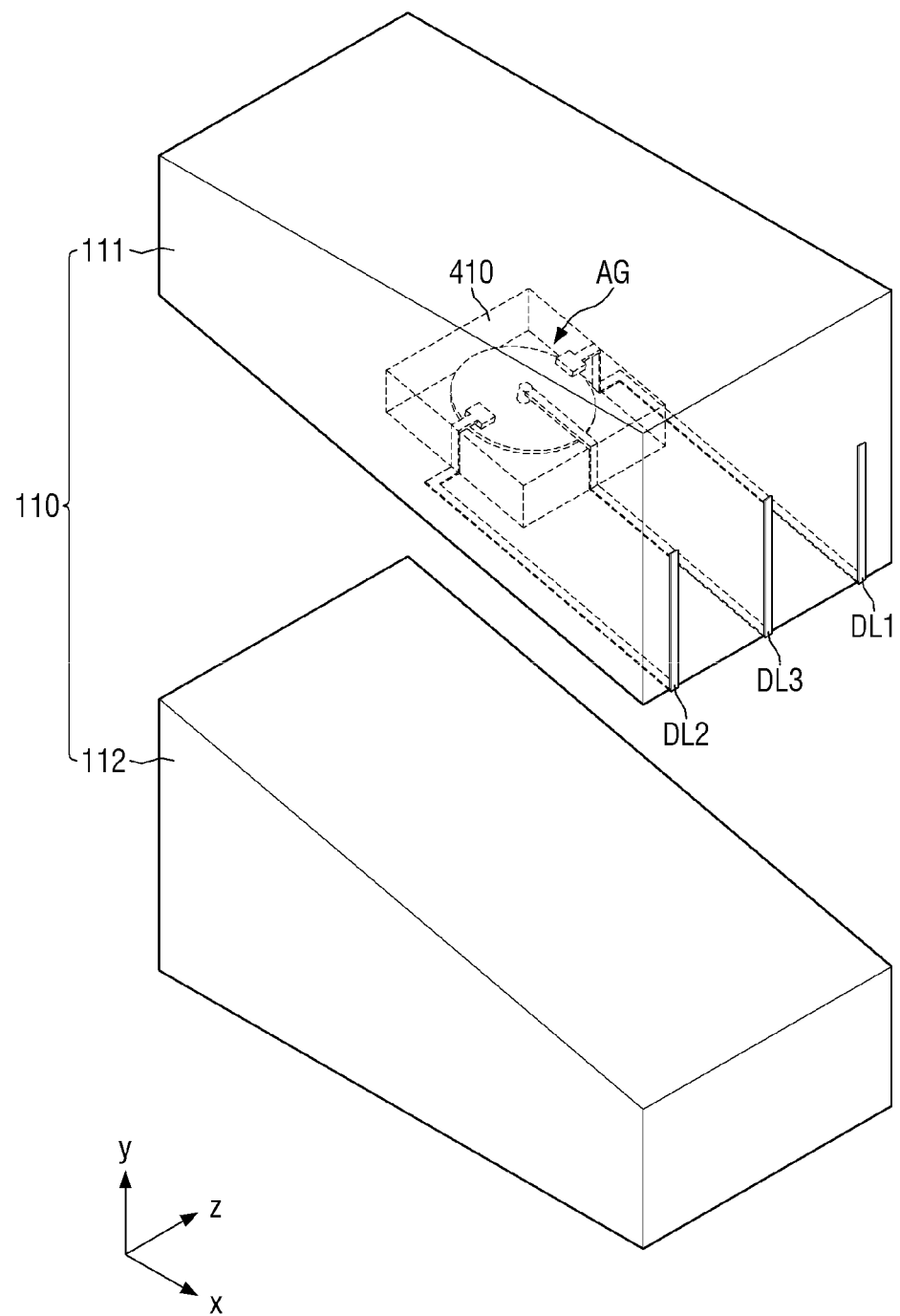

FIG. 5C is an exploded perspective view showing an example of the first lens of FIG. 3.

The exemplary embodiment of FIG. 5C is different from the exemplary embodiment shown in FIG. 5A in that the first lens part 111 is disposed under the second lens part 112, and that a groove AG is formed in the lower surface of the second lens part 112. Description will focus on differences and any redundant descriptions will be omitted.

Referring to FIG. 5C, a groove AG for accommodating the first active mirror 410 may be formed in the lower surface of the second lens part 112. Although the groove AG is formed as a quadrangular groove in the lower surface of the second lens part 112 in the example shown in FIG. 5C, it is to be understood that the groove AG may be formed in a polygonal shape other than a quadrangular shape, a circular shape, or an elliptical shape.

The floor of the groove AG may be inclined at a third predetermined angle θ3. The third predetermined angle θ3 is measured from the third direction (z-axis direction), i.e., the thickness direction of the first lens 110 toward the second direction (y-axis direction), i.e., the height direction of the first lens 110.

A mirror support connected to the first active mirror 410 for supporting it, a first electrode and a second electrode may be formed on the floor of the groove AG. A first driving line DL1 connected to the first electrode, a second driving line DL2 connected to the second electrode, and a third driving line DL3 connected to the mirror support may be formed on the second lens part 112. A driving voltage may be applied to each of the first driving line DL1, the second driving line DL2 and the third driving line DL3.

The first driving line DL1 may be connected to the first electrode on the floor of the groove AG and may be disposed on at least one of the sidewalls of the groove AG, the lower surface of the second lens part 112, and the right surface of the second lens part 112. The second driving line DL2 may be connected to the second electrode on the floor of the groove AG and may be disposed on at least one of the sidewalls of the groove AG, the lower surface of the second lens part 112, and the right surface of the second lens part 112. The third driving line DL3 may be connected to the mirror support on the floor of the groove AG and may be disposed on at least one of the sidewalls of the groove AG, the lower surface of the second lens part 112, and the right surface of the second lens part 112. Alternatively, the first driving line DL1, the second driving line DL2, and the third driving line DL3 may be disposed on the left surface of the second lens part 112, instead of the right surface of the second lens part 112.

The first driving line DL1, the second driving line DL2, and the third driving line DL3 may be connected to a third cable or sheathed lines.

One of the bottom surfaces of the first active mirror 410 may be connected to the mirror support. Since the first active mirror 410 is disposed in the lower surface of the second lens part 112, the metal having a high reflectance, such as silver (Ag) may be formed on the bottom surface of the first active mirror 410 connected to the mirror support.

Figure 5D:
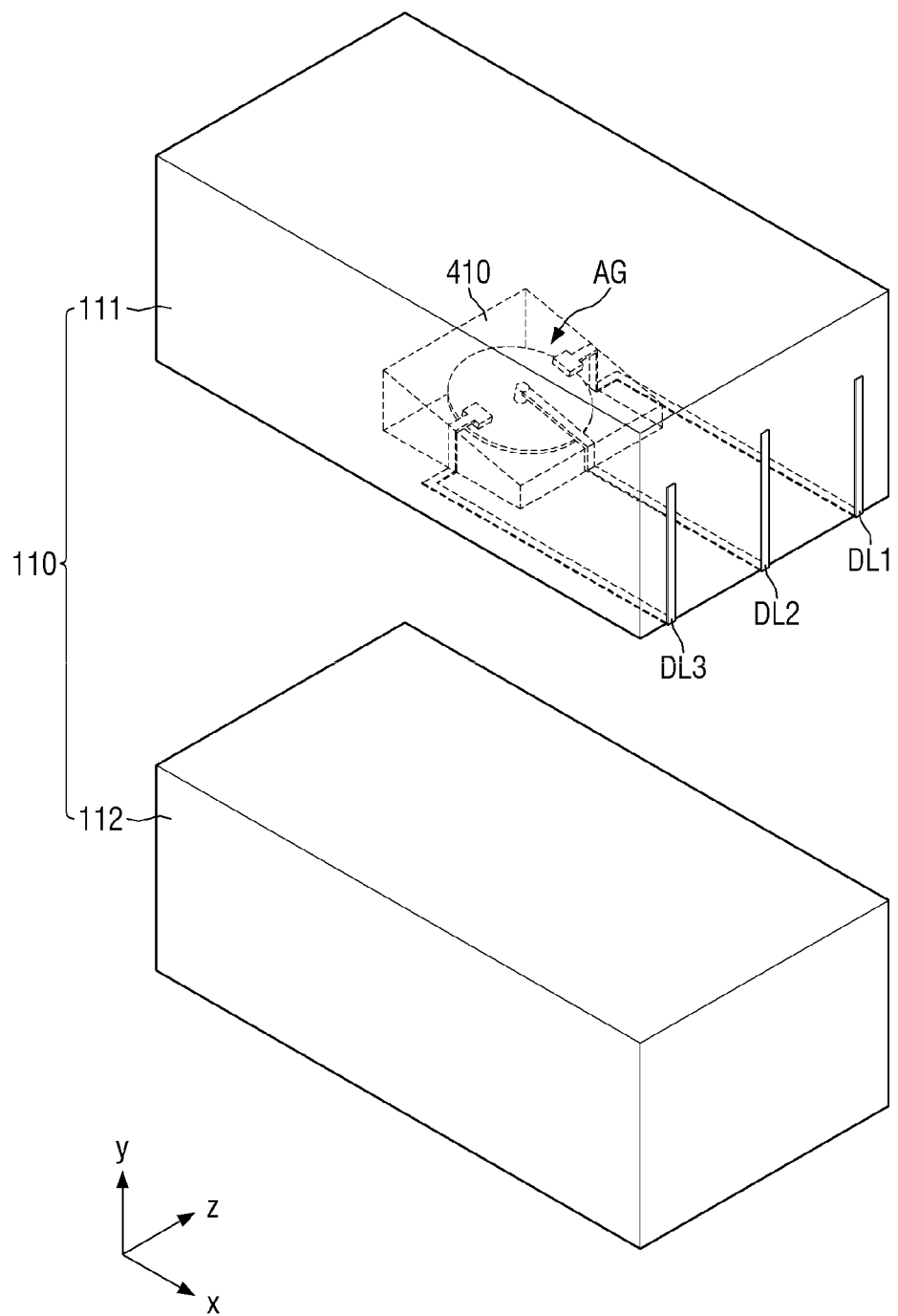

FIG. 5D is an exploded perspective view showing an example of the first lens of FIG. 3.

The first lens part 111 and the second lens part 112 shown in FIG. 5D are substantially identical to those shown in FIG. 5C except that they have a hexahedron shape with rectangular top, bottom and first to fourth side surfaces; and, therefore, any redundant descriptions will be omitted.

Referring to FIG. 5D, each of the first lens part 111 and the second lens part 112 may be formed as a hexahedron having a rectangular top surface, a rectangular bottom surface, and rectangular first to fourth side surfaces. In such a case, the upper surface and the lower surface of the first lens part 111 and the upper surface and the lower surface of the second lens part 112 may be extended in the first direction (x-axis direction) and may not be inclined at a predetermined angle. The length of the left surface of the first lens part 111 in the second direction (y-axis direction) may be substantially equal to the length of the right surface thereof in the second direction (y-axis direction). The length of the left surface of the second lens part 112 in the second direction (y-axis direction) may be substantially equal to the length of the right surface thereof in the second direction (y-axis direction).

The lower surface of the first lens part 111 and the upper surface of the second lens part 112 are not inclined while the floor of the groove AG may be inclined at the third predetermined angle θ3. The third predetermined angle θ3 is measured from the third direction (z-axis direction), i.e., the thickness direction of the first lens 110 toward the second direction (y-axis direction), i.e., the height direction of the first lens 110.

The second lens 120 may be formed in substantially the same manner as the first lens 110 shown in FIGS. 5A to 5D. Therefore, any redundant descriptions will be omitted.

FIG. 6 is a cross-sectional view showing in detail an example of the first electrode, the second electrode, the mirror support and the first active mirror disposed in the groove of FIG. 5A. FIGS. 7A and 7B are views for showing how the tilt angle of the first active mirror changes according to the driving voltages applied to the first electrode, the second electrode and the first active mirror.

Referring to FIG. 6, a first electrode 411 and a second electrode 412 for driving the first active mirror 410, and a mirror support connected to the first active mirror 410 for supporting the first active mirror 410 may be formed on the floor of the groove AG.

The first electrode 411 may be connected to the first driving line DL1. The first electrode 411 may receive a driving voltage through the first driving line DL1. The first driving line DL1 may be disposed on the floor and a first sidewall of the groove AG.

The second electrode 412 may be connected to the second driving line DL2. The second electrode 412 may receive a driving voltage via the second driving line DL2. The second driving line DL2 may be disposed on the floor and a second sidewall of the groove AG.

A first end of the mirror support 413 may be connected to the third driving line DL3. The mirror support 413 may receive a driving voltage through the third driving line DL3. The third driving line DL3 may be disposed on the floor of the groove AG and a third sidewall (not shown).

A second end of the mirror support 413 may be connected to the center or in the vicinity of the center of the lower surface of the first active mirror 410. The mirror support 413 can support the first active mirror 410.

The first electrode 411, the second electrode 412, and the mirror support 413 may be arranged in parallel in the same direction. The mirror support 413 may be disposed between the first electrode 411 and the second electrode 412 in the same direction. For example, the first electrode 411, the second electrode 412 and the mirror support 413 may be arranged in parallel in the third direction (z-axis direction), i.e., the thickness direction of the first lens 110. The mirror support 413 may be disposed between the first electrode 411 and the second electrode 412 in the third direction (z-axis direction).

The first electrode 411, the second electrode 412, and the mirror support 413 may be made of a transparent conductive material, such as a transparent conductive oxide.

A first bottom surface of the first active mirror 410 may be connected to the mirror support 413 and may be formed of a transparent conductive material. A second bottom surface of the first active mirror 410 may be formed of a metal having a high reflectance such as silver (Ag). The first active mirror 410 and the mirror support 413 may be formed as a single piece.

As shown in FIG. 7A, when the first driving voltage is applied to the first electrode 411 and the second driving voltage is applied to the second electrode 412 and the first active mirror 410, an attracting force may work between the first electrode 411 and the first active mirror 410, while a repulsive force may work between the second electrode 412 and the first active mirror 410. The first driving voltage may be a positive polarity voltage while the second driving voltage may be a negative polarity voltage. The positive polarity voltage refers to a voltage higher than 0 V, while the negative polarity voltage refers to a voltage lower than 0 V. Accordingly, the first active mirror 410 can be tilted toward the first electrode 411. That is to say, the first active mirror 410 may be tilted at a first angle θ1. When this happens, the first active mirror 410 becomes closer to the first electrode 411 and more distant from the second electrode 412. The first active mirror 410 may be in contact with the first electrode 411.

As shown in FIG. 7B, when the first driving voltage is applied to the second electrode 412 and the second driving voltage is applied to the first electrode 411 and the first active mirror 410, an attracting force may work between the second electrode 412 and the first active mirror 410 while a repulsive force may work between the first electrode 411 and the first active mirror 410. Accordingly, the first active mirror 410 can be tilted toward the second electrode 412. That is to say, the first active mirror 410 can be tilted at a second angle θ2. When this happens, the first active mirror 410 becomes closer to the second electrode 412 and more distant from the first electrode 411. The first active mirror 410 may be in contact with the second electrode 412.

Each of the first angle θ1 and the second angle θ2 is measured from the third direction (z-axis direction), i.e., the thickness direction of the first lens 110 toward the second direction (y-axis direction), i.e., the height direction of the first lens 110.

According to the exemplary embodiment shown in FIGS. 6, 7A and 7B, the first active mirror 410 may be tilted toward the first electrode 411 or the second electrode 412 depending on the voltage applied to the first electrode 411, the second electrode 412 and the first active mirror 410. That is to say, the angle by which the first active mirror 410 is tilted can be adjusted by the driving voltage applied to the first electrode 411, the second electrode 412, and the first active mirror 410.

The second active mirror 420 can be implemented substantially in the same manner as that shown in FIGS. 6, 7A and 7B; and, therefore, the second active mirror 420 will not be described.

Figure 8:
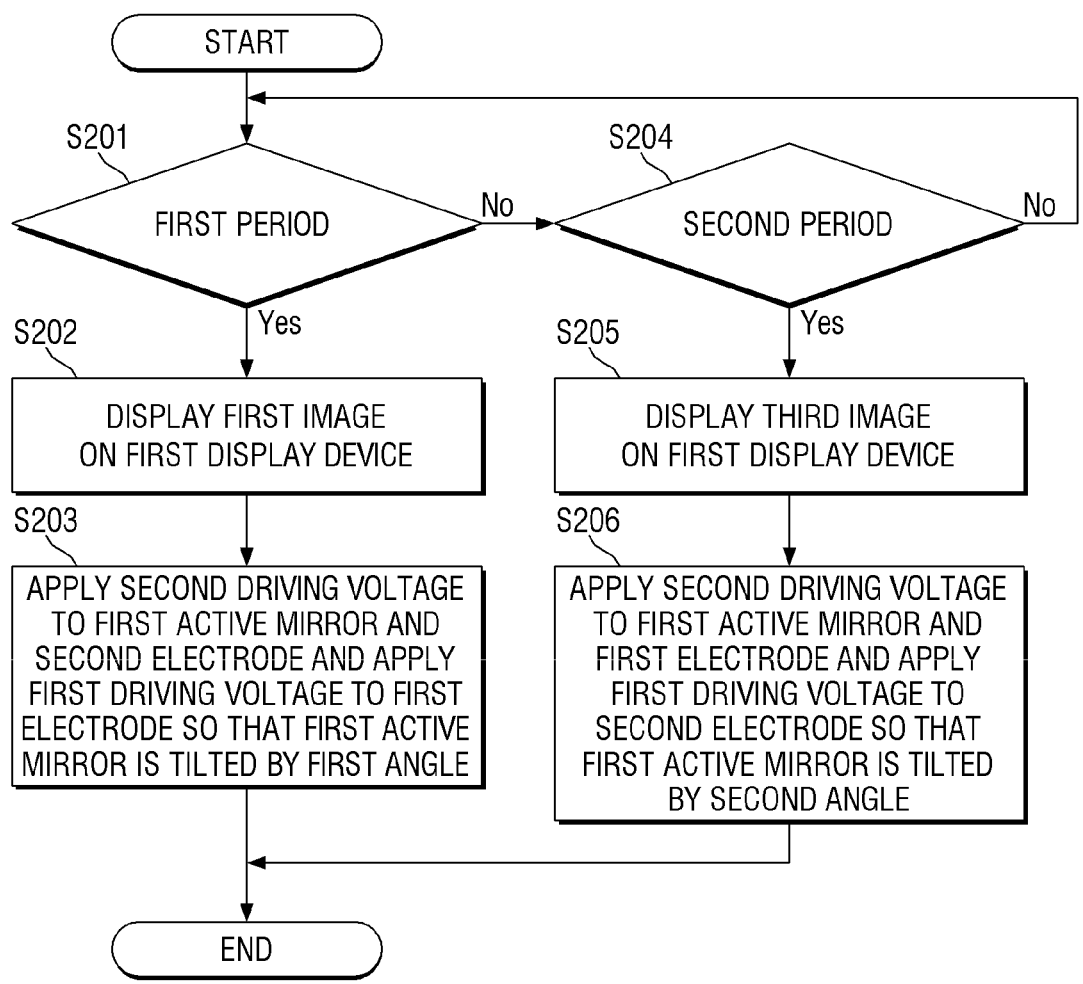
FIG. 8 is a flowchart illustrating a method of providing an augmented reality by an optical device according to an exemplary embodiment of the present invention.

FIG. 8 is a flowchart for illustrating a method of providing an augmented reality by an optical device according to an exemplary embodiment of the present invention. FIGS. 9A and 9B are views for illustrating an example of a method of providing an augmented reality by an optical device according to an exemplary embodiment of the present invention.

First, during a first period, a first display device 210 displays a first image, and a second display device 220 displays a second image. The first image is provided to a user's right eye RE during the first period, and the second image is provided to the user's left eye LE during the first period. The first image may be substantially identical to the second image. (steps S101 and S102 in FIG. 8)

Second, by applying a first driving voltage to the first electrode 411 and applying a second driving voltage to the second electrode 412 and the first active mirror 410 during the first period, the first active mirror 410 is tilted at a first angle θ1 as shown in FIG. 9A. The first angle θ1 is measured from the third direction (z-axis direction), i.e., the thickness direction of the first lens 110 toward the second direction (y-axis direction), i.e., the height direction of the first lens 110 as shown in FIG. 9A. As a result, during the first period, the first image displayed on a first area A1 of the first display device 210 may be reflected by the first active mirror 410 and may exit through the exit surface of the first lens 110, to be provided to the user's right eye RE. (step S103 of FIG. 8)

During the first period, the second active mirror 420 may also be tilted by the first angle θ1, like the first active mirror 410. As a result, during the first period, the second image displayed on a first area of the second display device 220 may be reflected by the second active mirror 420 and may exit through the exit surface of the second lens 120, to be provided to the user's left eye LE.

Third, during a second period, a first display device 210 displays a third image, and a second display device 220 displays a fourth image. The third image is provided to a user's right eye RE during the second period, and the fourth image is provided to the user's left eye LE during the second period. The third image may be substantially identical to the fourth image. (steps S104 and S105 of FIG. 8)

Fourth, by applying the first driving voltage to the second electrode 412 and applying the second driving voltage to the first electrode 411 and the first active mirror 410 during the second period, the first active mirror 410 is tilted at a second angle θ2, as shown in FIG. 9B. The second angle θ2 is measured from the third direction (z-axis direction), i.e., the thickness direction of the first lens 110 toward the second direction (y-axis direction), i.e., the height direction of the first lens 110 as shown in FIG. 9B. As a result, during the second period, the third image displayed on a second area A2 of the first display device 210 may be reflected by the first active mirror 410 and may exit through the exit surface of the first lens 110, to be provided to the user's right eye RE. (step S106 of FIG. 8)

During the second period, the second active mirror 420 may also be tilted by the second angle θ2, like the first active mirror 410. As a result, during the second period, the fourth image displayed on a second area of the second display device 220 may be reflected by the second active mirror 420 and may exit through the exit surface of the second lens 120, to be provided to the user's left eye LE.

According to the exemplary embodiment shown in FIGS. 8, 9A, and 9B, the active mirror is tilted by the first angle during the first period so that the image from the display device can be provided to the user's eyes, and the active mirror is tilted by the second angle during the second period so that the image from the display device can be provided to the user's eyes. That is to say, the user can see the image displayed on the display device during the first period as a virtual image, and the image displayed on the display device during the second period as a virtual image. Therefore, the part of the display device that is viewed by a user, i.e., the user's field-of-view (FOV), can be expanded without increasing the number of mirrors or even without increasing the area of the display device.

Also, since the first display device 210 displays the first image during the first period and displays the third image during the second period, it is desired that the first image is displayed during the odd frames and the third image is displayed during the even frames, at the frame frequency of 120 Hz. In such case, the first active mirror 410 is synchronized to the first display device 210 so that it may be tilted by the first angle θ1 during the odd frame periods and at the second angle θ2 during the even frame periods.

Figure 10:
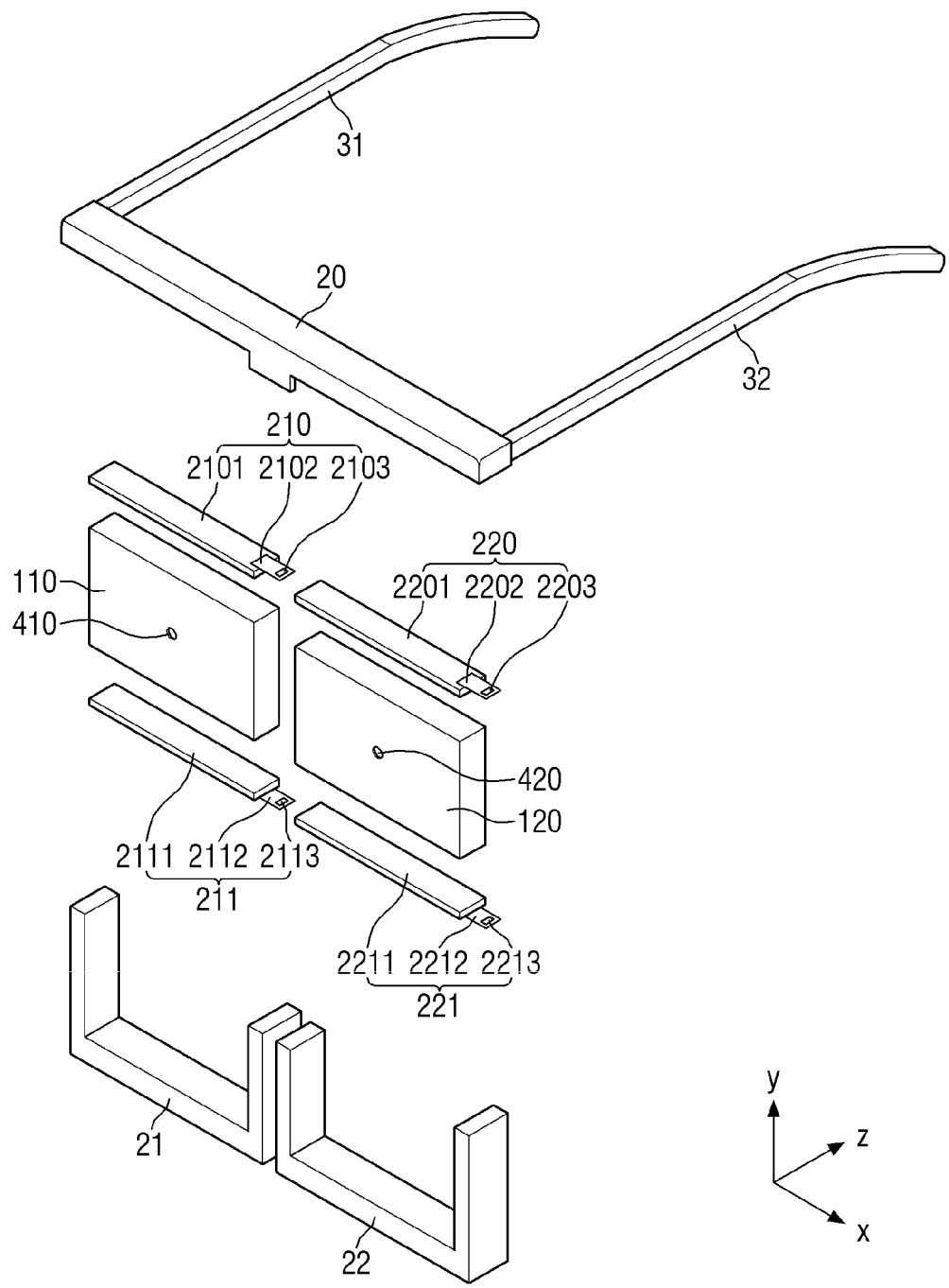
FIG. 10 is an exploded, perspective view showing an optical device according to an exemplary embodiment of the present invention.
Figure 11:
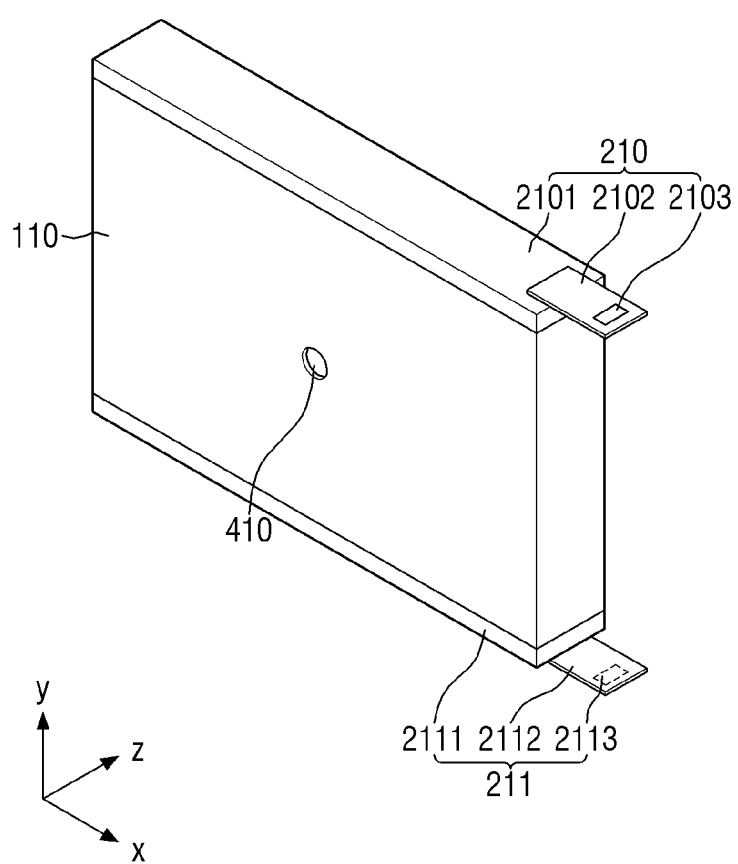
FIG. 11 is a perspective view showing an example of a first lens, a first display device and a third display device of FIG. 10.

FIG. 10 is an exploded, perspective view showing an optical device according to an exemplary embodiment of the present invention. FIG. 11 is a perspective view showing an example of a first lens, a first display device and a third display device of FIG. 10.

The exemplary embodiment shown in FIGS. 10 and 11 is different from the exemplary embodiment shown in FIGS. 2 and 3 in that a third display device 211 is disposed on one of the side surfaces of a first lens 110 and a fourth display device 221 is disposed on one of the side surfaces of a second lens 120. Description will focus on differences between the exemplary embodiments and any redundant descriptions will be omitted.

Referring to FIGS. 10 and 11, each of the third display device 211 and the fourth display device 221 displays a virtual image for realizing an augmented reality. The third display device 211 may display a third image as a virtual image, and the fourth display device 221 may display a fourth image as a virtual image.

The third display device 211 may include a third display panel 2111, a third circuit board 2112, and a third driving circuit 2113. The fourth display device 221 may include a fourth display panel 2211, a fourth circuit board 2212, and a fourth driving circuit 2213.

The third display panel 2111 may be disposed on one of the side surfaces of the first lens 110. For example, the first display panel 2101 may be disposed on the upper side of the first lens 110, and the third display panel 2111 may be disposed on the lower side of the first lens 110. That is to say, the first display panel 2101 and the third display panel 2111 may face each other. The first display panel 2101 and the third display panel 2111 may be covered by the top bar 20 and the first lens frame 21.

The fourth display panel 2211 may be disposed on one of the side surfaces of the second lens 120. For example, the second display panel 2201 may be disposed on the upper surface of the second lens 120, and the fourth display panel 2211 may be disposed on the lower surface of the second lens 120. That is to say, the second display panel 2201 and the fourth display panel 2211 may face each other. The second display panel 2201 and the fourth display panel 2211 may be covered by the top bar 20 and the second lens frame 22.

Each of the third display panel 2111 and the fourth display panel 2211 may be a flexible display panel, which can be curved, rolled, or bent. For example, each of the third display panel 2111 and the fourth display panel 2211 may be an organic light-emitting display panel or an organic light-emitting display panel including quantum dots. The third display panel 2111 and the fourth display panel 2211 may be substantially identical to the first display panel 2101 shown in FIG. 4. Therefore, the third display panel 2111 and the fourth display panel 2211 will not be described.

FIG. 12 is an exploded perspective view showing an example of the first lens of FIG. 11.

Referring to FIG. 12, the first lens 110 may include a first lens part 111 and a second lens part 112. The first lens part 111 may be an upper lens part disposed on the second lens part 112, and the second lens part 112 may be a lower lens part disposed under the first lens part 111.

Each of the first lens part 111 and the second lens part 112 may have a hexahedron shape with a rectangular top face, a rectangular bottom face and rectangular first to fourth side faces. The top surface of the first lens part 111 may face the user's right eye RE while the bottom surface thereof may be opposite to the upper surface. The top surface of the second lens part 112 may face the lower surface of the first lens part 111 while the bottom surface thereof may be opposite to the upper surface.

A groove AG for accommodating the first active mirror 410 may be formed in the top surface of the second lens part 112. Although the groove AG is formed as a quadrangular groove in the top surface of the second lens part 112 in the example shown in FIG. 12, it is to be understood that the groove AG may be formed in a polygonal shape other than a quadrangular shape, a circular shape, or an elliptical shape.

A mirror support 413 connected to the first active mirror 410 for supporting it, a first electrode 411 and a second electrode 412 for driving the first active mirror 410 may be formed on the floor of the groove AG. A first driving line DL1 connected to the first electrode 411, a second driving line DL2 connected to the second electrode 412, and a third driving line DL3 connected to the mirror support 413 may be formed on the second lens part 112. A driving voltage may be applied to each of the first driving line DL1, the second driving line DL2, and the third driving line DL3.

The first driving line DL1 may be connected to the first electrode 411 on the floor of the groove AG and may be disposed on at least one of the sidewalls of the groove AG, the top surface of the second lens part 112 and the left surface of the second lens part 112. The second driving line DL2 may be connected to the second electrode 412 on the floor of the groove AG and may be disposed on at least one of the sidewalls of the groove AG, the top surface of the second lens part 112 and the left surface of the second lens part 112. The third driving line DL3 may be connected to the mirror support 413 on the floor of the groove AG and may be disposed on at least one of the sidewalls of the groove AG, the top surface of the second lens part 112 and the left surface of the second lens part 112. Alternatively, the first driving line DL1, the second driving line DL2, and the third driving line DL3 may be disposed on the right surface of the second lens part 112, instead of the left surface of the second lens part 112.

The first driving line DL1, the second driving line DL2, and the third driving line DL3 may be connected to a third cable or sheathed lines. The third cable or the sheathed lines may be connected to the power source incorporated in the first temple 31 or the second temple 32 to apply power to the first display device 210 and the second display device 220. Alternatively, the third cable or sheathed line may be connected to the first circuit board 2102 or the third circuit board 2112. The third cable or the sheathed lines may be covered by the top bar 20 and the first lens frame 21.

The first electrode 411, the second electrode 412, the mirror support 413, the first driving line DL1, the second driving line DL2, and the third driving line DL3 may be made of a transparent conductive material, such as a transparent conductive oxide. Accordingly, it is possible that the light from the first display device 210 is prevented from being reflected or interfered by the first electrode 411, the second electrode 412, the mirror support 413, the first driving line DL1, the second driving line DL2 and the third driving line DL3. One of the bottom surfaces of the first active mirror 410 may be connected to the mirror support 413, and a metal having a high reflectance, such as silver (Ag), may be formed on another one of the bottom surfaces of the first active mirror 410.

The floor of the groove AG may be extended in the second direction (y-axis direction), i.e., the height direction of the first lens 110. In such case, the first electrode 411, the second electrode 412, and the mirror support 413 may be arranged in parallel in the second direction (y-axis direction). The mirror support 413 may be disposed between the first electrode 411 and the second electrode 412 in the second direction (y-axis direction).

Each of the first and second active mirrors 410 and 420 may be implemented as an electrostatic mirror, a micro mirror used in a digital micro mirror device (DMD), or a piezoelectric mirror. In the following description, each of the first active mirror 410 and the second active mirror 420 is implemented as an electrostatic mirror as shown in FIGS. 6, 7A and 7B for convenience of illustration.

Figure 13:
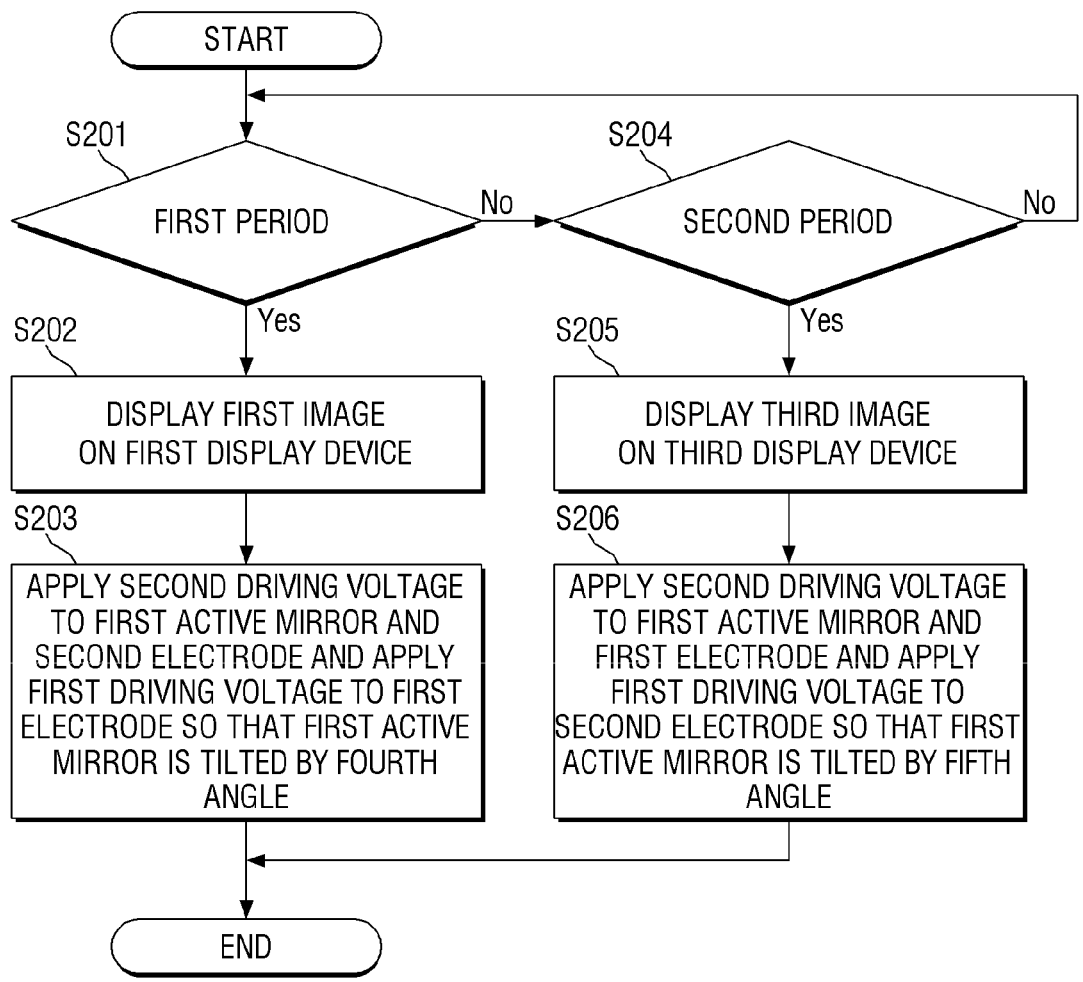
FIG. 13 is a flowchart illustrating a method of providing an augmented reality by an optical device according to an exemplary embodiment of the present invention.
Figure 14A:
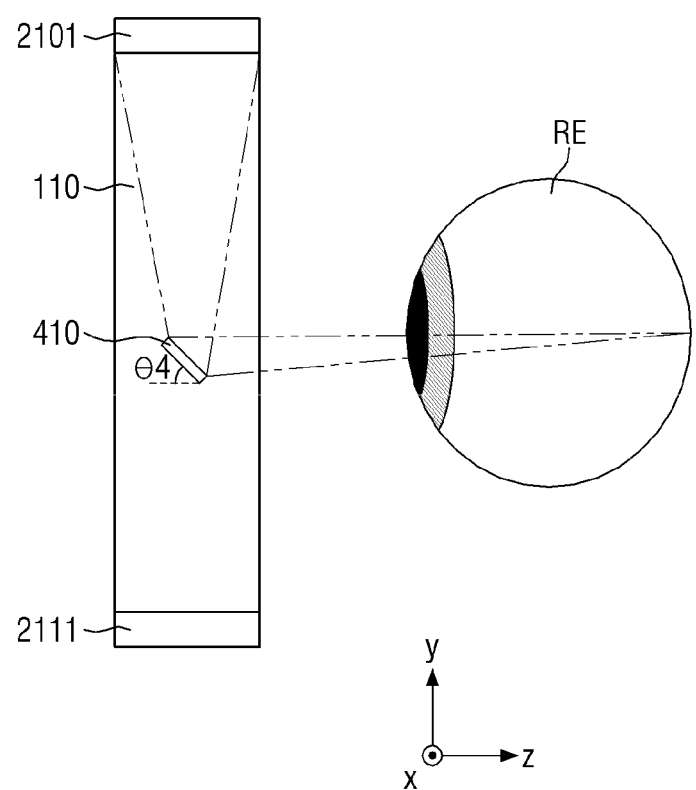
FIGS. 14A and 14B are views illustrating examples for illustrating a method of providing an augmented reality by an optical device according to an exemplary embodiment of the present invention.
Figure 14B:
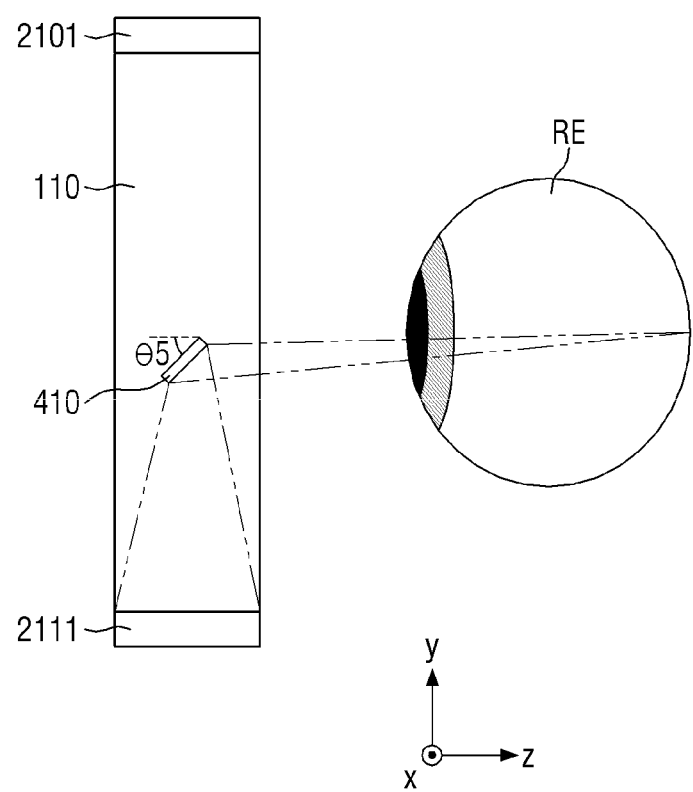

FIG. 13 is a flowchart for illustrating a method of providing an augmented reality by an optical device according to an exemplary embodiment of the present invention. FIGS. 14A and 14B are views for illustrating examples for illustrating a method of providing an augmented reality by an optical device according to an exemplary embodiment of the present invention.

First, during a first period, a first display device 210 displays a first image, and a second display device 220 displays a second image. The first image is provided to a user's right eye RE during the first period, and the second image is provided to the user's left eye LE during the first period. The first image may be substantially identical to the second image. (steps S201 and S202 of FIG. 13)

Second, by applying a first driving voltage to the first electrode 411 and applying a second driving voltage to the second electrode 412 and the first active mirror 410 during the first period, the first active mirror 410 is tilted at a fourth angle θ4, as shown in FIG. 14A. The fourth angle θ4 is measured from the second direction (y-axis direction), i.e., the height direction of the first lens 110 toward the third direction (z-axis direction), i.e., the thickness direction of the first lens 110 as shown in FIG. 14A. As a result, during the first period, the first image of the first display device 210 disposed on the upper surface of the first lens 110 may be reflected by the first active mirror 410 and may exit through the exit surface of the first lens 110, to be provided to the user's right eye RE. (step S203 of FIG. 13)

During the first period, the second active mirror 420 may also be tilted by the fourth angle θ4, as with the first active mirror 410. As a result, during the first period, the second image of the second display device 220 disposed on the upper surface of the second lens 120 may be reflected by the second active mirror 420 and may exit through the exit surface of the second lens 120, to be provided to the user's left eye LE.

Third, during a second period, a third display device 211 displays a third image, and a fourth display device 221 displays a fourth image. The third image is provided to a user's right eye RE during the second period, and the fourth image is provided to the user's left eye LE during the second period. The third image may be substantially identical to the fourth image.

Fourth, by applying the first driving voltage to the second electrode 412 and applying the second driving voltage to the first electrode 411 and the first active mirror 410 during the second period, the first active mirror 410 is tilted at a fifth angle θ5, as shown in FIG. 14B. The fifth angle θ5 is measured from the second direction (y-axis direction), i.e., the height direction of the first lens 110 toward the third direction (z-axis direction), i.e., the thickness direction of the first lens 110, as shown in FIG. 14B. As a result, during the second period, the third image of the third display device 211 disposed on the lower surface of the first lens 110 may be reflected by the first active mirror 410 and may exit through the exit surface of the first lens 110, to be provided to the user's right eye RE. (step S206 of FIG. 13)

During the second period, the second active mirror 420 may also be tilted by the fifth angle θ5, like the first active mirror 410. As a result, during the second period, the fourth image of the fourth display device 221 disposed on the lower surface of the second lens 120 may be reflected by the second active mirror 420 and may exit through the exit surface of the second lens 120, to be provided to the user's left eye LE.

According to the exemplary embodiment shown in FIGS. 13, 14A, and 14B, the active mirror is tilted by the third angle during the first period so that the image from the display device disposed on one side surface of the lens can be provided to the user's eyes, and the active mirror is tilted by the fifth angle during the second period so that the image from the display device disposed on another side surface of the lens can be provided to the user's eyes. That is to say, the user can see the image displayed on the display device disposed on one side surface of the lens during the first period as a virtual image, and the image displayed on the display device disposed on another side surface of the lens during the second period as a virtual image. Therefore, the part of the display device that is viewed by a user, i.e., the user's field-of-view (FOV), can be expanded without increasing the number of mirrors.

In addition, since the first active mirror 410 is controlled so that it is tilted by the fourth angle θ4 during the odd frame periods and tilted by the fifth angle θ5 during the even frame periods, the first display device 210 may display the first image during the first and second periods while the third display device 211 may display the third image during the first and second periods. That is to say, the first active mirror 410 may be controlled so that it is tilted by the fourth angle θ4 and the fifth angle θ5 at the frame frequency of 120 Hz while the first display device 210 and the third display device 211 may be driven at the frame frequency of 60 Hz.

Figure 15:
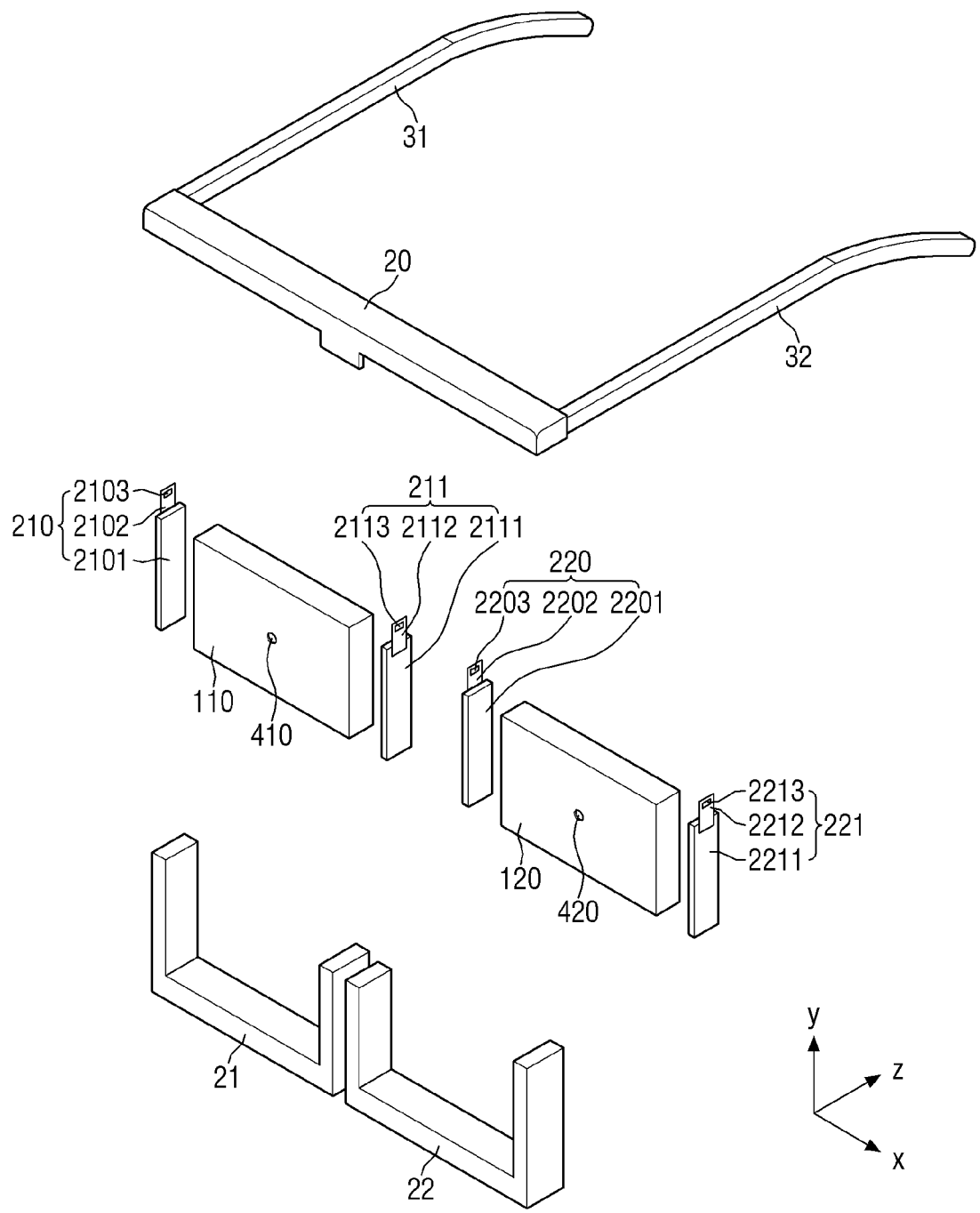
FIG. 15 is an exploded, perspective view showing an optical device according to an exemplary embodiment of the present invention.
Figure 16:
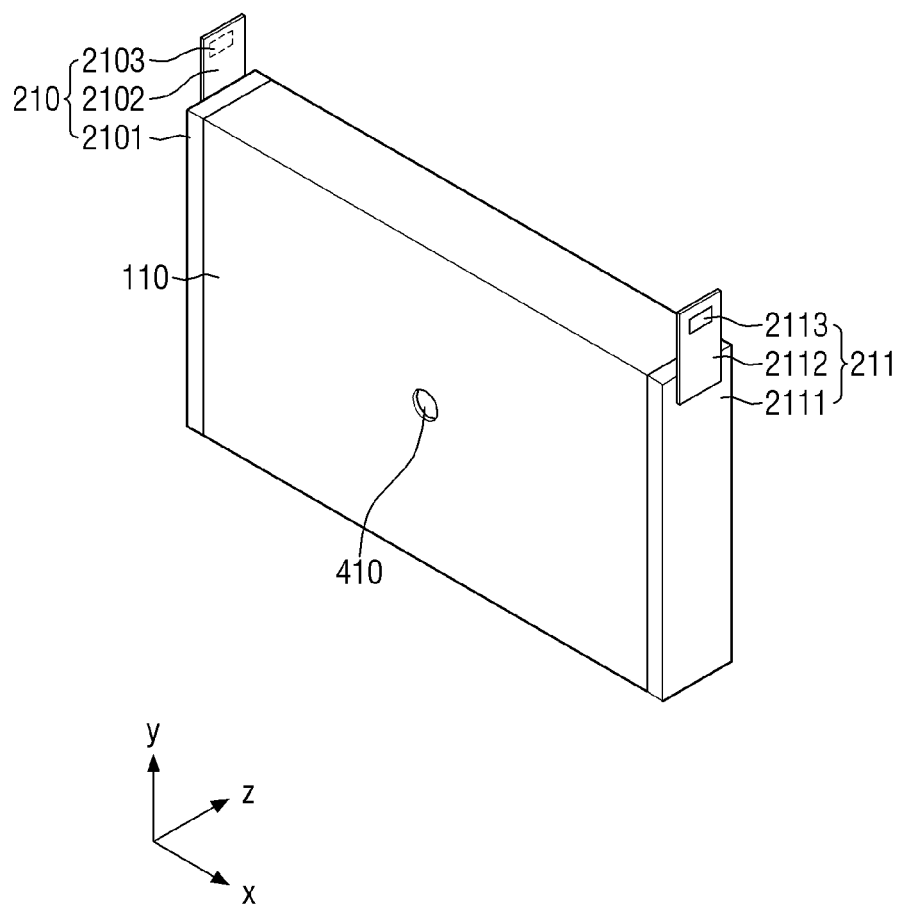
FIG. 16 is a perspective view showing an example of a first lens, a first display device and a third display device of FIG. 15.

FIG. 15 is an exploded, perspective view showing an optical device according to an exemplary embodiment of the present invention, and FIG. 16 is a perspective view showing an example of a first lens, a first display device and a third display device of FIG. 15.

The exemplary embodiment shown in FIGS. 15 and 16 is different the exemplary embodiment shown in FIGS. 10 and 11 in that a first display device 210 is disposed on the left surface of a first lens 110, while a third display device 211 is disposed on the right surface of the first lens 110 and that a second display device 220 is disposed on the left surface of a second lens 120, while a fourth display device 221 is disposed on the right surface of the second lens 120. Therefore, the elements of FIGS. 15 and 16 identical to those of FIGS. 10 and 11 will not be described to avoid redundancy.

Figure 17:
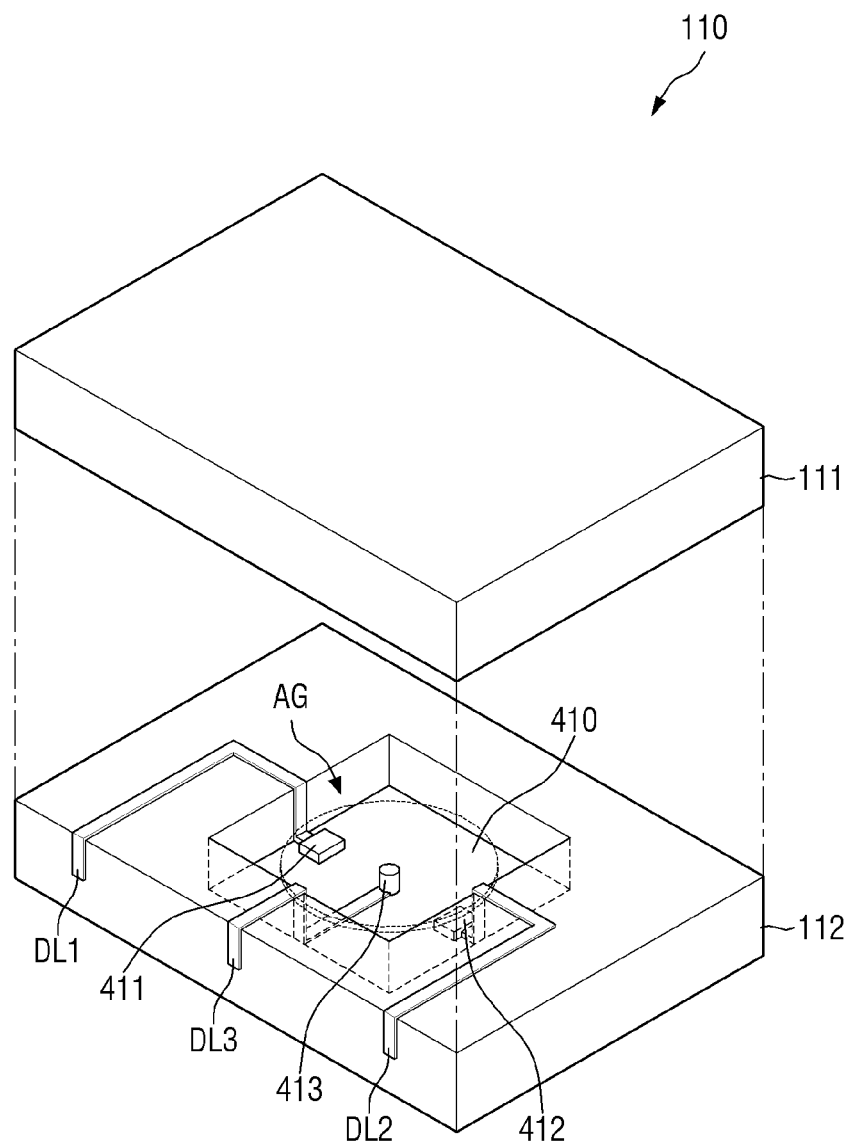
FIG. 17 is an exploded perspective view showing an example of the first lens of FIG. 16.

FIG. 17 is an exploded perspective view showing an example of the first lens of FIG. 16.

The exemplary embodiment shown in FIG. 17 is substantially identical to the exemplary embodiment shown in FIG. 12 except that a first electrode 411, a second electrode 412, and a mirror support 413 in a groove AG are arranged in parallel in the first direction (x-axis direction), i.e., the width direction of a first lens 110 and that the mirror support 413 is disposed between the first electrode 411 and the second electrode 412 in the first direction (x-axis direction). Description will focus on differences and the redundant description will be omitted.

Referring to FIG. 17, the floor of the groove AG may be extended in the first direction (x-axis direction), i.e., the width direction of the first lens 110. In such case, the first electrode 411, the second electrode 412, and the mirror support 413 may be arranged in parallel in the first direction (x-axis direction). The mirror support 413 may be disposed between the first electrode 411 and the second electrode 412 in the first direction (x-axis direction).

The first driving line DL1 may be connected to the first electrode 411 on the floor of the groove AG and may be disposed on at least one of the sidewalls of the groove AG, the top surface of the second lens part 112, and the upper surface of the second lens part 112. The second driving line DL2 may be connected to the second electrode 412 on the floor of the groove AG and may be disposed on at least one of the sidewalls of the groove AG, the top surface of the second lens part 112, and the upper surface of the second lens part 112. The third driving line DL3 may be connected to the mirror support 413 on the floor of the groove AG and may be disposed on at least one of the sidewalls of the groove AG, the top surface of the second lens part 112, and the upper surface of the second lens part 112. Alternatively, the first driving line DL1, the second driving line DL2, and the third driving line DL3 may be disposed on the lower surface of the second lens part 112, instead of the upper surface of the second lens part 112.

Figure 18A:
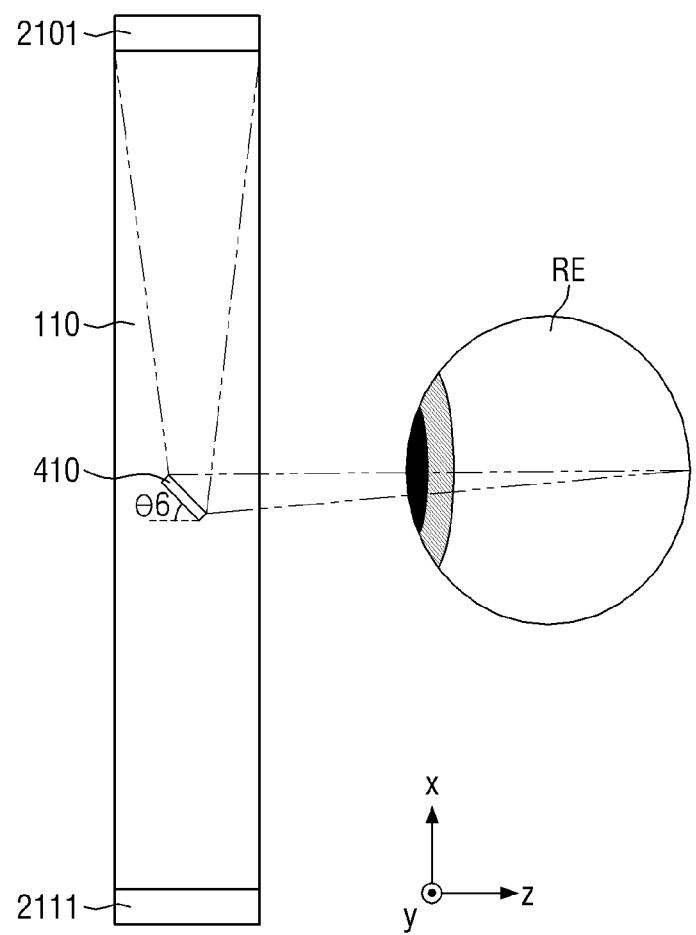
FIGS. 18A and 18B are views illustrating examples for illustrating a method of providing an augmented reality by an optical device according to an exemplary embodiment of the present invention.
Figure 18B:
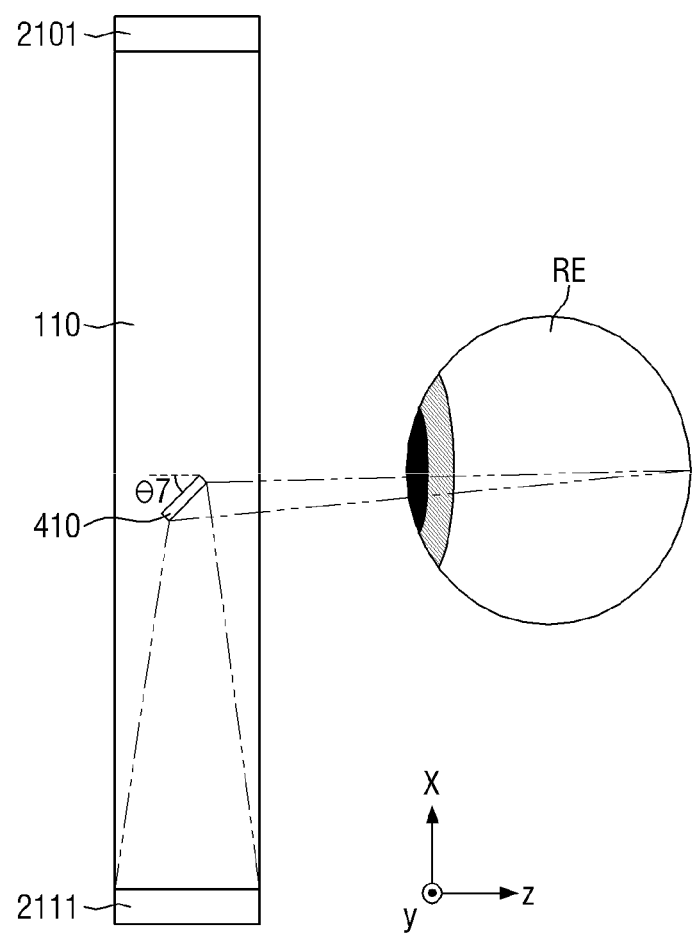

FIGS. 18A and 18B are views for illustrating examples for illustrating a method of providing an augmented reality by an optical device according to an exemplary embodiment of the present invention.

The exemplary embodiment shown in FIGS. 18A and 18B is different the exemplary embodiment shown in FIGS. 13, 14A, and 14B in that a first display device 210 is disposed on the left surface of a first lens 110 while a third display device 211 is disposed on the right surface of the first lens 110 so that a first active mirror 410 is tilted at a sixth angle θ6 during a first period and tilted by seventh angle θ7 during second period. Each of the sixth angle θ6 and the seventh angle θ7 is measured from the first direction (x-axis direction), i.e., the width direction of the first lens 110 toward the third direction (z-axis direction), i.e., the thickness direction of the first lens 110 as shown in FIGS. 18A and 18B.

Figure 19:
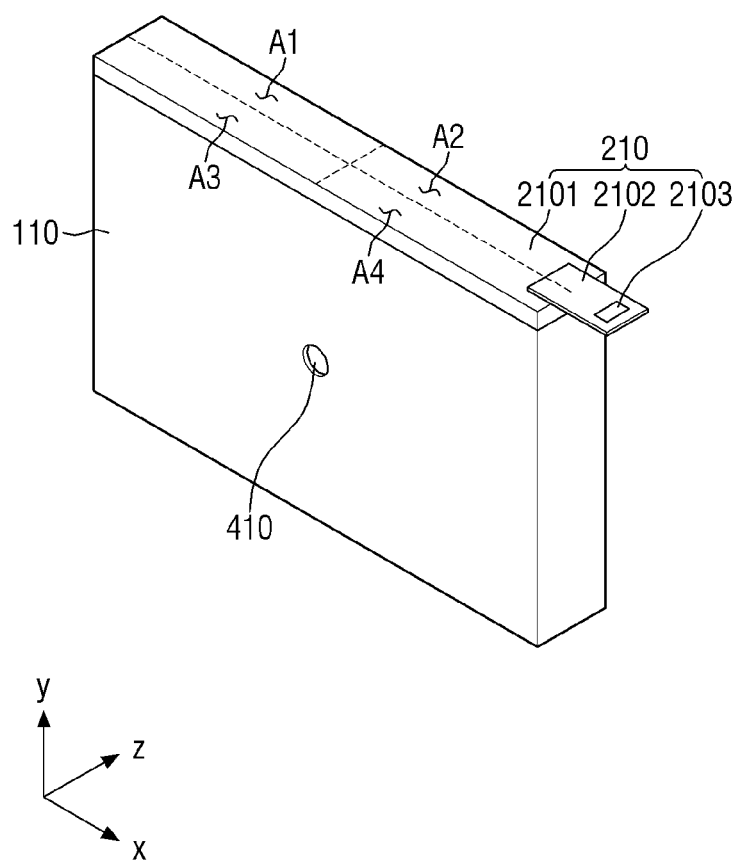
FIG. 19 is a perspective view showing an example of the first lens and the first display device of FIG. 2.

FIG. 19 is a perspective view showing an example of the first lens and the first display device of FIG. 2.

The exemplary embodiment shown in FIG. 19 is different from the exemplary embodiment shown in FIG. 3 in that a first display panel 2101 of a first display device 210 is divided into four areas. Description will focus on differences and any redundant descriptions will be omitted.

Referring to FIG. 19, the first display panel 2101 of the first display device 210 may be divided into a first area A1, a second area A2, a third area A3, and a fourth area A4. As shown in FIG. 19, the first area A1 may be an upper left area, the second area A2 may be an upper right area, the third area A3 may be a lower left area, and the fourth area A4 may be a lower right area.

During the first to fourth periods, the first display device 210 may display a first sub image in the first area A1, a second sub image in the second area A2, a third sub image in the third area A3, and a fourth sub image in the fourth area A4. In such case, the first display device 210 may be driven at the frame frequency of 60 Hz, but a user may see images mixed with one another during the first to fourth periods.

Alternatively, the first display device 210 may display the first sub image in the first area A1 and a black image in the other areas during the first period, may display the second sub image in the second area A2 and a black image in the other areas during the second period, may display the third sub image in the third area A3 and a black image in the other areas during the third period, and may display the fourth sub image in the fourth area A4 and a black image in the other areas during the fourth period. In such case, although the first display device 210 is required to be driven at the frame frequency of 240 Hz, it is possible to prevent that a user sees images mixed with one another during the first to fourth periods.

Alternatively, the first display device 210 may display the first sub image in the first area A1, the fourth sub image in the fourth area A4 and the black image in the other areas during the first period and the second period. In addition, the first display device 210 may display the second sub image in the second area A2, the third sub image in the third area A3, and the black image in the other areas during the third period and the fourth period. In such case, although the first display device 210 is required to be driven at the frame frequency of 120 Hz, it is possible to suppress a user from seeing images mixed with one another during the first to fourth periods.

Figure 20:
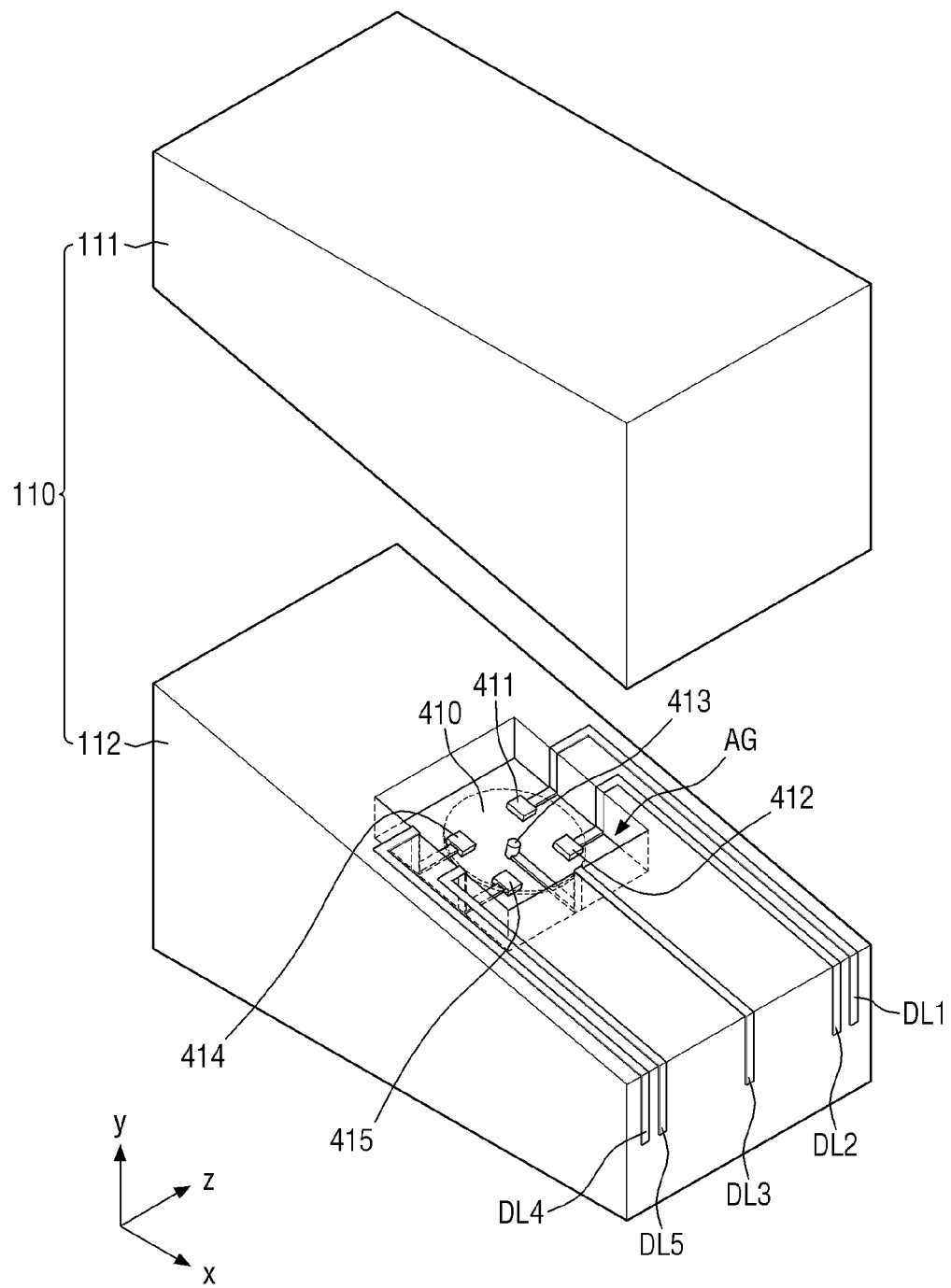
FIG. 20 is an exploded perspective view showing an example of the first lens of FIG. 19.

FIG. 20 is an exploded perspective view showing an example of the first lens of FIG. 19.

The exemplary embodiment shown in FIG. 20 is different from the exemplary embodiment shown in FIG. 5A in that a fourth driving line DL4 and a fifth driving line DL5 are additionally disposed on a second lens part 112. Description will focus on differences and any redundant descriptions will be omitted.

Referring to FIG. 20, a mirror support 413 connected to a first active mirror 410 for supporting it, a first electrode 411, a second electrode 412, a third electrode 414, and a fourth electrode 415 for driving the first active mirror 410 may be formed on the floor of a groove AG.

The first electrode 411, the fourth electrode 415, and the mirror support 413 may be arranged in parallel in a direction DR1. The mirror support 413 may be disposed between the first electrode 411 and the fourth electrode 415 in the direction DR1. The direction DR1 may be defined as a direction between the opposite first direction (negative x-axis direction), i.e., the width direction of the first lens 110, and the third direction (z-axis direction), i.e., the thickness direction of the first lens 110.

The third electrode 414, the second electrode 412, and the mirror support 413 may be arranged in parallel in another direction DR2 intersecting the direction DR1. The mirror support 413 may be disposed between the third electrode 414 and the second electrode 412 in the other direction DR2. The other direction DR2 may be defined as a direction between the first direction (x-axis direction), i.e., the width direction of the first lens 110, and the third direction (z-axis direction), i.e., the thickness direction of the first lens 110.

A first driving line DL1 connected to the first electrode 411, a second driving line DL2 connected to the second electrode 412, a third driving line DL3 connected to the mirror support 413, a fourth driving line DL4 connected to the third electrode 414, and a fifth driving line DL5 connected to the fourth electrode 415 may be formed on the second lens part 112. A driving voltage may be applied to each of the first driving line DL1, the second driving line DL2, the third driving line DL3, the fourth driving line DL4, and the fifth driving line DL5.

The first driving line DL1 may be connected to the first electrode 411 on the floor of the groove AG and may be disposed on at least one of the sidewalls of the groove AG, the upper surface of the second lens part 112, and the right surface of the second lens part 112. The second driving line DL2 may be connected to the second electrode 412 on the floor of the groove AG and may be disposed on at least one of the sidewalls of the groove AG, the upper surface of the second lens part 112, and the right surface of the second lens part 112. The third driving line DL3 may be connected to the mirror support 413 on the floor of the groove AG and may be disposed on at least one of the sidewalls of the groove AG, the upper surface of the second lens part 112, and the right surface of the second lens part 112. The fourth driving line DL4 may be connected to the third electrode 414 on the floor of the groove AG and may be disposed on at least one of the sidewalls of the groove AG, the upper surface of the second lens part 112, and the right surface of the second lens part 112. The fifth driving line DL5 may be connected to the fourth electrode 415 on the floor of the groove AG and may be disposed on at least one of the sidewalls of the groove AG, the upper surface of the second lens part 112, and the right surface of the second lens part 112. Alternatively, the first driving line DL1, the second driving line DL2, the third driving line DL3, the fourth driving line DL4, and the fifth driving line DL5 may be disposed on the left surface of the second lens part 112, instead of the right surface of the second lens part 112.

Each of the first driving line DL1, the second driving line DL2, the third driving line DL3, the fourth driving line DL4, and the fifth driving line DL5 may be connected to a third cable or sheathed lines. The third cable or the sheathed lines may be connected to the power source incorporated in the first temple 31 or the second temple 32 to apply power to the first display device 210 and the second display device 220. Alternatively, the third cable or the sheathed lines may be connected to the first circuit board 2102. The third cable or the sheathed lines may be covered by the top bar 20 and the first lens frame 21.

The first electrode 411, the second electrode 412, the third electrode 414, the fourth electrode 415, the mirror support 413, the first driving line DL1, the second driving line DL2, the third driving line DL3, the fourth driving line DL4, and the fifth driving line DL5 may be made of a transparent conductive material, such as a transparent conductive oxide. Accordingly, it is possible to prevent the light from the first display device 210 from being reflected or interfered by the first electrode 411, the second electrode 412, the third electrode 414, the fourth electrode 415, the mirror support 413, the first driving line DL1, the second driving line DL2, the third driving line DL3, the fourth driving line DL4, and the fifth driving line DL5. One of the bottom surfaces of the first active mirror 410 may be connected to the mirror support 413, and a metal having a high reflectance, such as silver (Ag), may be formed on another one of the bottom surfaces of the first active mirror 410.

As shown in FIG. 20, the first electrode 411, the second electrode 412, the third electrode 414, and the fourth electrode 415 for driving the first active mirror 410, and the mirror support 413 connected to the first active mirror 410 for supporting the first active mirror 410 may be formed on the floor of the groove AG.

The third electrode 414 may be connected to the fourth driving line DL4. The third electrode 414 may receive a driving voltage via the fourth driving line DL4. The fourth driving line DL4 may be disposed on the floor and a second sidewall of the groove AG.

The fourth electrode 415 may be connected to the fifth driving line DL5. The fourth electrode 415 may receive a driving voltage via the fifth driving line DL5. The fifth driving line DL5 may be disposed on the floor and the second sidewall of the groove AG.

The first electrode 411, the second electrode 412, and the mirror support 413 may be arranged in parallel in the direction DR1. The mirror support 413 may be disposed between the first electrode 411 and the second electrode 412 in the direction DR1. The direction DR1 may be defined as a direction between the first direction (x-axis direction), i.e., the width direction of the first lens 110, and the third direction (z-axis direction), i.e., the thickness direction of the first lens 110.

The third electrode 414, the fourth electrode 415, and the mirror support 413 may be arranged in parallel in another direction DR2 intersecting the direction DR1, and the mirror support 413 may be disposed between the third electrode 414 and the fourth electrode 415 in the other direction DR2. The other direction DR2 may be defined as a direction between the first direction (x-axis direction), i.e., the width direction of the first lens 110, and the third direction (z-axis direction), i.e., the thickness direction of the first lens 110.

The first electrode 411, the second electrode 412, the third electrode 414, the fourth electrode 415 and the mirror support 413 may be made of a transparent conductive material such as a transparent conductive oxide.

When a first driving voltage is applied to the first electrode 411 and a second driving voltage is applied to the second electrode 412, the third electrode 414, the fourth electrode 415 and the first active mirror 410, an attracting force may work between the first electrode 411 and the first active mirror 410, while a repulsive force may work between the second electrode 412 and the first active mirror 410, between the third electrode 414 and the first active mirror 410, and between the fourth electrode 415 and the first active mirror 410. Accordingly, the first active mirror 410 can be tilted toward the first electrode 411. When this happens, the first active mirror 410 becomes closest to the first electrode 411. The first active mirror 410 may be in contact with the first electrode 411. Alternatively, when the second driving voltage is applied to the second electrode 412 and the third electrode 414, they may obstruct the first active mirror 410 from being tilted toward the first electrode 411. Accordingly, no driving voltage may be applied to the second electrode 412 and the third electrode 414. That is to say, the second electrode 412 and the third electrode 414 may be floating.

When a first driving voltage is applied to the second electrode 412 and a second driving voltage is applied to the first electrode 411, the third electrode 414, the fourth electrode 415 and the first active mirror 410, an attracting force may work between the second electrode 412 and the first active mirror 410, while a repulsive force may work between the first electrode 411 and the first active mirror 410, between the third electrode 414 and the first active mirror 410, and between the fourth electrode 415 and the first active mirror 410. Accordingly, the first active mirror 410 can be tilted toward the second electrode 412. When this happens, the first active mirror 410 becomes closest to the second electrode 412. The first active mirror 410 may be in contact with the second electrode 412. Alternatively, when the second driving voltage is applied to the first electrode 411 and the fourth electrode 415, they may obstruct the first active mirror 410 from being tilted toward the second electrode 412. Accordingly, no driving voltage may be applied to the first electrode 411 and the fourth electrode 415. That is to say, the first electrode 411 and the fourth electrode 415 may be floating.

When the first driving voltage is applied to the third electrode 414 and the second driving voltage is applied to the first electrode 411, the second electrode 412, the fourth electrode 415 and the first active mirror 410, an attracting force may work between the third electrode 414 and the first active mirror 410, while a repulsive force may work between the first electrode 411 and the first active mirror 410, between the second electrode 412 and the first active mirror 410, and between the fourth electrode 415 and the first active mirror 410. Accordingly, the first active mirror 410 can be tilted toward the third electrode 414. When this happens, the first active mirror 410 becomes closest to the third electrode 414. The first active mirror 410 may be in contact with the third electrode 414. Alternatively, when the second driving voltage is applied to the first electrode 411 and the fourth electrode 415, they may obstruct the first active mirror 410 from being tilted toward the third electrode 414. Accordingly, no driving voltage may be applied to the first electrode 411 and the fourth electrode 415. That is to say, the first electrode 411 and the fourth electrode 415 may be floating.

When the first driving voltage is applied to the fourth electrode 415 and the second driving voltage is applied to the first electrode 411, the second electrode 412, the third electrode 414 and the first active mirror 410, an attracting force may work between the fourth electrode 415 and the first active mirror 410, while a repulsive force may work between the first electrode 411 and the first active mirror 410, between the second electrode 412 and the first active mirror 410, and between the third electrode 414 and the first active mirror 410. Accordingly, the first active mirror 410 can be tilted toward the fourth electrode 415. When this happens, the first active mirror 410 may become closest to the fourth electrode 415. The first active mirror 410 may be in contact with the fourth electrode 415. Alternatively, when the second driving voltage is applied to the second electrode 412 and the third electrode 414, they may obstruct the first active mirror 410 from being tilted toward the fourth electrode 415. Accordingly, no driving voltage may be applied to the second electrode 412 and the third electrode 414. That is to say, the second electrode 412 and the third electrode 414 may be floating.

Although four electrodes are illustrated in the exemplary embodiment shown in FIG. 20, the number of the electrodes for driving the first active mirror 410 is not limited thereto. As the number of the electrodes for driving the first active mirror 410 increases, the first active mirror 410 can be more precisely tilted according to voltages applied to the electrodes. Therefore, the number of the electrodes for driving the first active mirror 410 can be appropriately determined as desired.

According to the exemplary embodiment shown in FIG. 20, the first active mirror 410 may be tilted toward one of the first electrode 411, the second electrode 412, the third electrode 414, and the fourth electrode 415, depending on the voltages applied to the first electrode 411, the second electrode 412, the third electrode 414, the fourth electrode 415, and the first active mirror 410. That is to say, it is possible to adjust the angle by which the first active mirror 410 is tilted by the driving voltages applied to the first electrode 411, the second electrode 412, the third electrode 414, the fourth electrode 415, and the first active mirror 410.

It is to be noted that the positions of the first lens part 111, the second lens part 112, and the groove AG may be modified as shown in FIGS. 5B, 5C and 5D in the exemplary embodiment shown in FIG. 20.

The second active mirror 420 can be implemented substantially in the same manner as that shown in FIG. 20; and, therefore, the second active mirror 420 will not be described.

FIG. 21 is a flowchart for illustrating a method of providing an augmented reality by an optical device according to an exemplary embodiment of the present invention. FIGS. 22A to 22D are views for illustrating examples for illustrating a method of providing an augmented reality by an optical device according to an exemplary embodiment of the present invention.

First, during a first period, a first sub image of the first image is displayed in a first area A1 of a first display device 210 while a first sub image of the second image is displayed in a first area of a second display device 220. The first sub image of the first image is provided to a user's right eye RE during the first period, and the first sub image of the second image is provided to the user's left eye LE during the first period. The first sub image of the first image may be substantially identical to the first sub image of the second image.

Figure 22A:
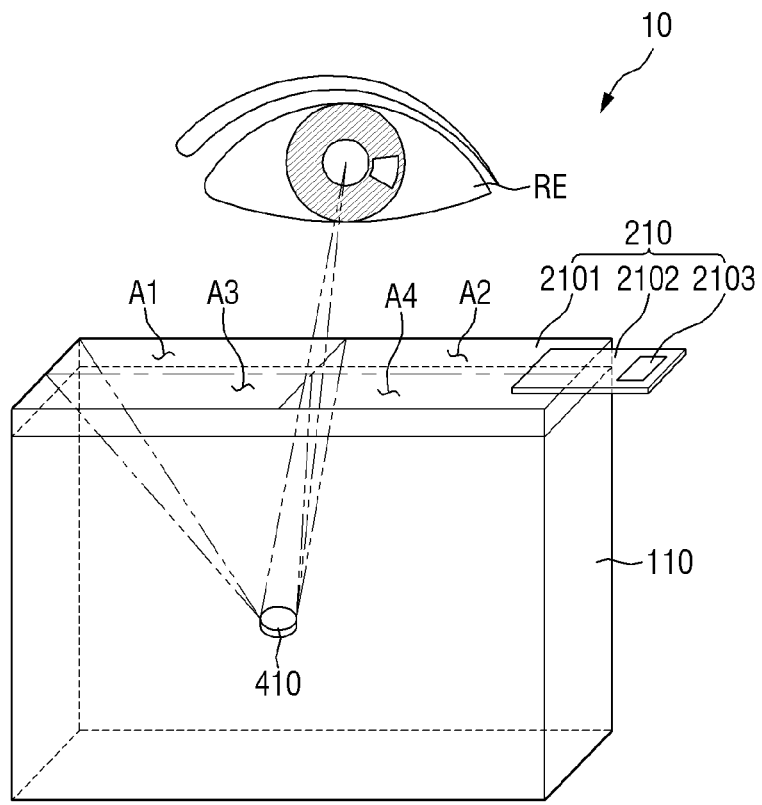
FIGS. 22A, 22B, 22C, and 22D are views illustrating examples for illustrating a method of providing an augmented reality by an optical device according to an exemplary embodiment of the present invention.

In addition, during the first period, a first driving voltage is applied to the first electrode 411 and a second driving voltage is applied to the second electrode 412, the third electrode 414, the fourth electrode 415, and the first active mirror 410, so that the first active mirror 410 can be tilted toward the first electrode 411. In this example, the first electrode 411 is disposed on the upper left side from the mirror support 413, and thus, the first active mirror 410 can be tilted in the upper left direction. The first active mirror 410 may be tilted so that it reflects the first image in the first area A1 of the first display device 210, i.e., the upper left area, to allow the image exits through the exit surface of the first lens 110. As a result, as shown in FIG. 22A, during the first period, the first sub image of the first image in the first area A1 of the first display device 210 may be reflected by the first active mirror 410 and may exit through the exit surface of the first lens 110, to be provided to the user's right eye RE.

During the first period, the second active mirror 420 may also be tilted so that it reflects the first sub image of the second image in the first area of the second display device 220, i.e., the upper left area to allow the image exits through the exit surface of the first lens 110. As a result, during the first period, the first sub image of the second image in the first area of the second display device 220 may be reflected by the second active mirror 420 and may exit through the exit surface of the second lens 120, to be provided to the user's left eye LE. (step S301 of FIG. 21)

Second, during a second period, a second sub image of the first image is displayed in a second area A2 of the first display device 210 while a second sub image of the second image is displayed in a second area of the second display device 220. The second sub image of the first image is provided to a user's right eye RE during the second period, and the second sub image of the second image is provided to the user's left eye LE during the second period. The second sub image of the first image may be substantially identical to the second sub image of the second image.

Figure 22B:
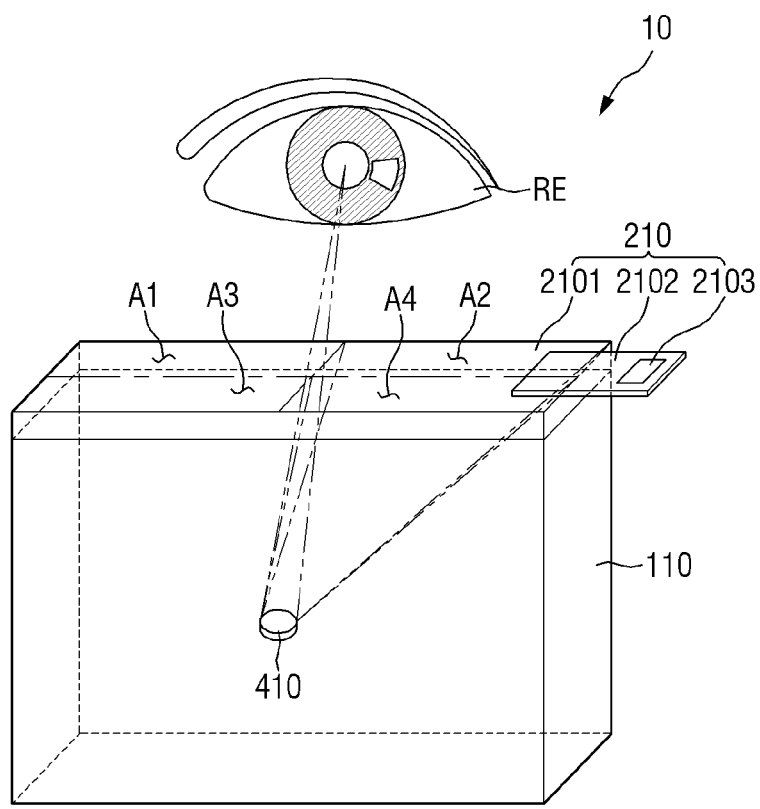

In addition, during the second period, the first driving voltage is applied to the second electrode 412 and the second driving voltage is applied to the first electrode 411, the third electrode 414, the fourth electrode 415, and the first active mirror 410, so that the first active mirror 410 can be tilted toward the second electrode 412. In this example, the second electrode 412 is disposed on the upper right side from the mirror support 413, and thus, the first active mirror 410 can be tilted in the upper right direction. The first active mirror 410 may be tilted so that it reflects the second sub image of the first image in the second area A2 of the first display device 210, i.e., the upper right area to allow the image exits through the exit surface of the first lens 110. As a result, as shown in FIG. 22B, during the second period, the second sub image of the first image in the second area A2 of the first display device 210 may be reflected by the first active mirror 410 and may exit through the exit surface of the first lens 110, to be provided to the user's right eye RE. (step S302 of FIG. 21)

During the second period, the second active mirror 420 may also be tilted so that it reflects the second sub image of the second image in the second area of the second display device 220, i.e., the upper right area to allow the image exits through the exit surface of the second lens 120. As a result, during the second period, the second sub image of the second image in the second area of the second display device 220 may be reflected by the second active mirror 420 and may exit through the exit surface of the second lens 120, to be provided to the user's left eye LE.

Third, during a third period, a third sub image of the first image is displayed in a third area A3 of the first display device 210 while a third sub image of the second image is displayed in a third area of the second display device 220. The third sub image of the first image is provided to a user's right eye RE during the third period, and the third sub image of the second image is provided to the user's left eye LE during the third period. The third sub image of the first image may be substantially identical to the third sub image of the second image.

Figure 22C:
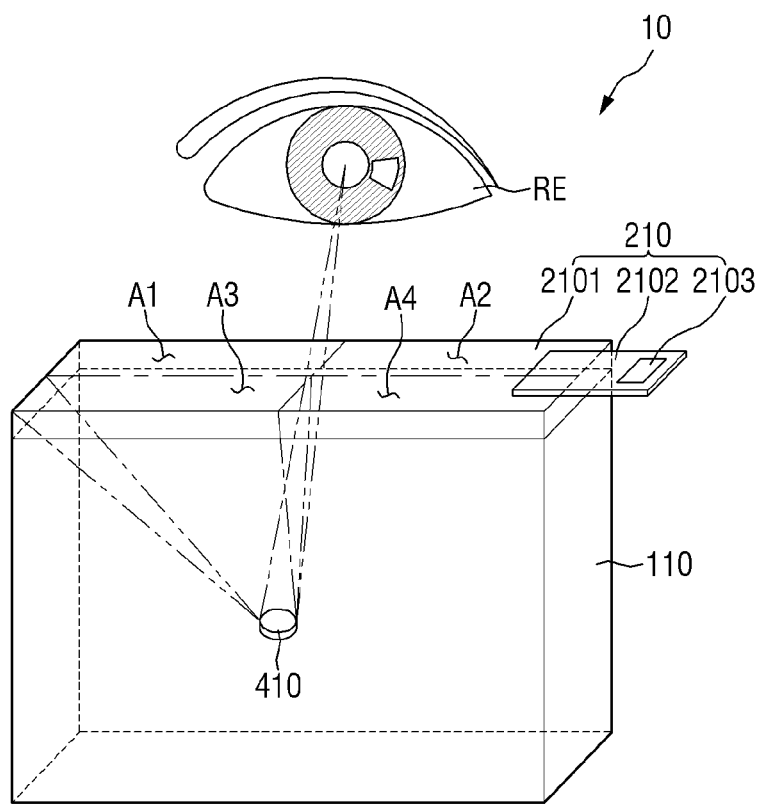

In addition, during the third period, the first driving voltage is applied to the third electrode 414 and the second driving voltage is applied to the first electrode 411, the second electrode 412, the fourth electrode 415 and the first active mirror 410, so that the first active mirror 410 can be tilted toward the third electrode 414. In this example, the third electrode 414 is disposed on the lower left side from the mirror support 413, and thus the first active mirror 410 can be tilted in the lower left direction. The first active mirror 410 may be tilted so that it reflects the third sub image of the first image in the third area A3 of the first display device 210, i.e., the lower left area to allow the image exits through the exit surface of the first lens 110. As a result, as shown in FIG. 22C, during the third period, the third sub image of the first image in the third area A3 of the first display device 210 may be reflected by the first active mirror 410 and may exit through the exit surface of the first lens 110, to be provided to the user's right eye RE. (step S303 of FIG. 21)

During the third period, the second active mirror 420 may also be tilted so that it reflects the third sub image of the second image in the third area of the second display device 220, i.e., the lower left area to allow the image exits through the exit surface of the second lens 120. As a result, during the third period, the third sub image of the second image in the third area of the second display device 220 may be reflected by the second active mirror 420 and may exit through the exit surface of the second lens 120, to be provided to the user's left eye LE.

Fourth, during a fourth period, a fourth sub image of the first image is displayed in a fourth area A4 of the first display device 210 while a fourth sub image of the second image is displayed in a fourth area of the second display device 220. The fourth sub image of the first image is provided to a user's right eye RE during the fourth period, and the fourth sub image of the second image is provided to the user's left eye LE during the fourth period. The fourth sub image of the first image may be substantially identical to the fourth sub image of the second image.

Figure 22D:
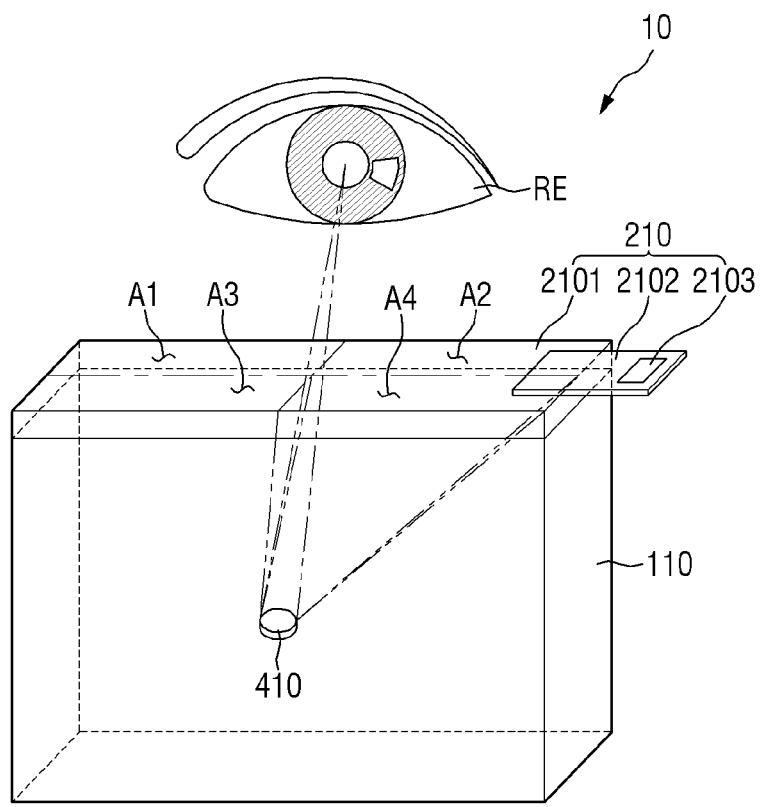

In addition, during the fourth period, the first driving voltage is applied to the fourth electrode 415 and the second driving voltage is applied to the first electrode 411, the second electrode 412, the third electrode 414 and the first active mirror 410, so that the first active mirror 410 can be tilted toward the fourth electrode 415. In this example, the fourth electrode 415 is disposed on the lower right side from the mirror support 413, and thus the first active mirror 410 can be tilted in the lower right direction. The first active mirror 410 may be tilted so that it reflects the fourth sub image of the first image in the fourth area A4 of the first display device 210, i.e., the lower right area to allow the image exits through the exit surface of the first lens 110. As a result, as shown in FIG. 22D, during the fourth period, the fourth sub image of the first image in the fourth area A4 of the first display device 210 may be reflected by the first active mirror 410 and may exit through the exit surface of the first lens 110, to be provided to the user's right eye RE. (step S304 of FIG. 21)

During the fourth period, like the first active mirror 410, the second active mirror 420 may also be tilted so that it reflects the fourth sub image of the second image in the fourth area of the second display device 220, i.e., the lower right area to allow the image exits through the exit surface of the second lens 120. As a result, during the fourth period, the fourth sub image of the second image in the fourth area of the second display device 220 may be reflected by the second active mirror 420 and may exit through the exit surface of the second lens 120, to be provided to the user's left eye LE.

According to the exemplary embodiment shown in FIGS. 21 and 22A to 22D, the image in the first area of the display device is provided to the user's eyes by tilting the active mirror toward the first electrode during the first period, and the image in the second area of the display device is provided to the user's eyes by tilting the active mirror toward the second electrode during the second period. In addition, the image in the third area of the display device is provided to the user's eyes by tilting the active mirror toward the third electrode during the third period, and the image in the fourth area of the display device is provided to the user's eyes by tilting the active mirror toward the fourth electrode during the fourth period. That is to say, the user can see the image displayed in the first area of the display device during the first period as a virtual image, and the image displayed in the second area of the display device during the second period as a virtual image. In addition, the user can see the image displayed in the third area of the display device during the third period as a virtual image, and the image displayed in the fourth area of the display device during the fourth period as a virtual image. Therefore, the part of the display device that is viewed by a user, i.e., the user's field-of-view (FOV), can be expanded without increasing the number of mirrors or even without increasing the area of the display device.

Figure 23:
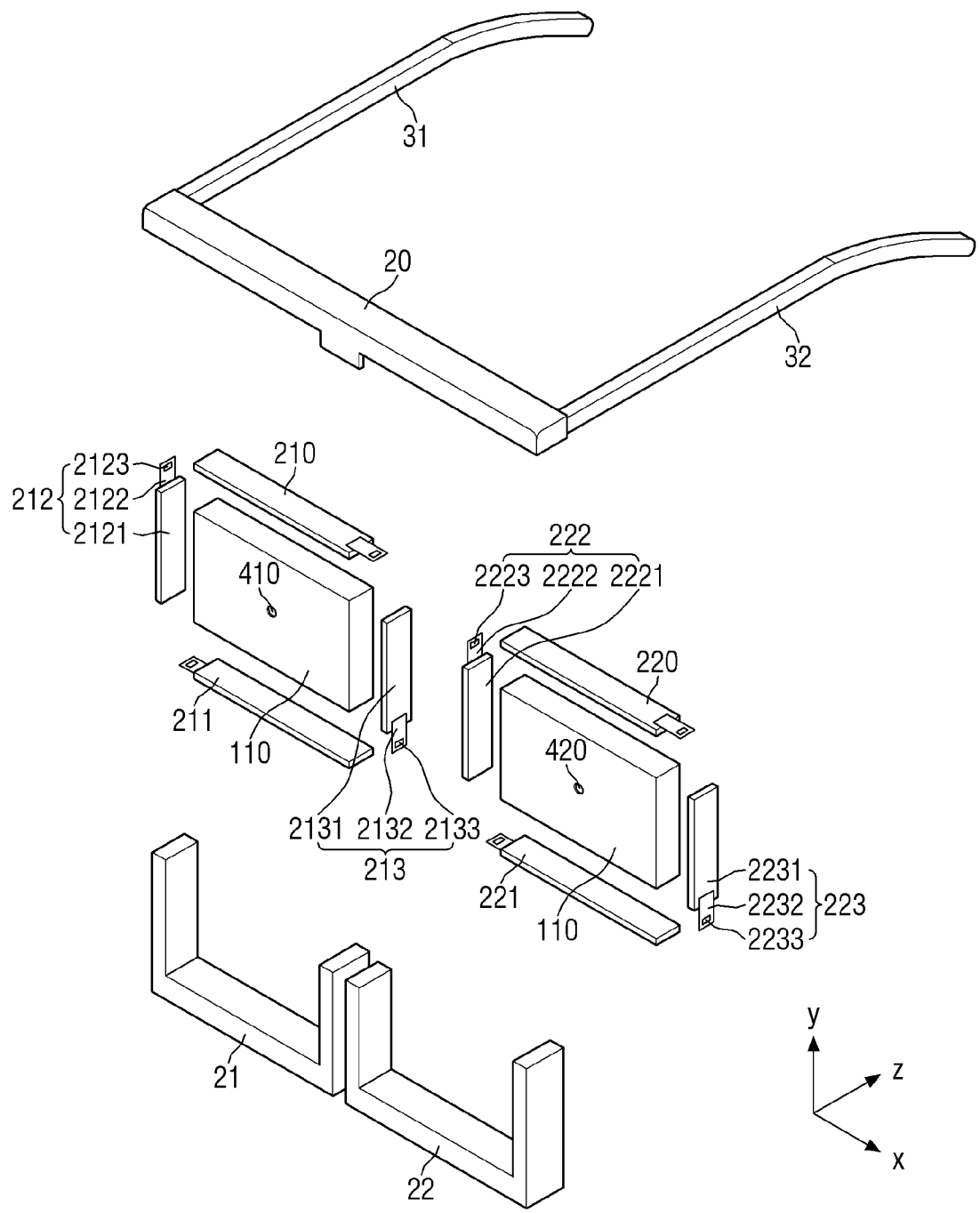
FIG. 23 is an exploded, perspective view showing an optical device according to an exemplary embodiment of the present invention.
Figure 24:
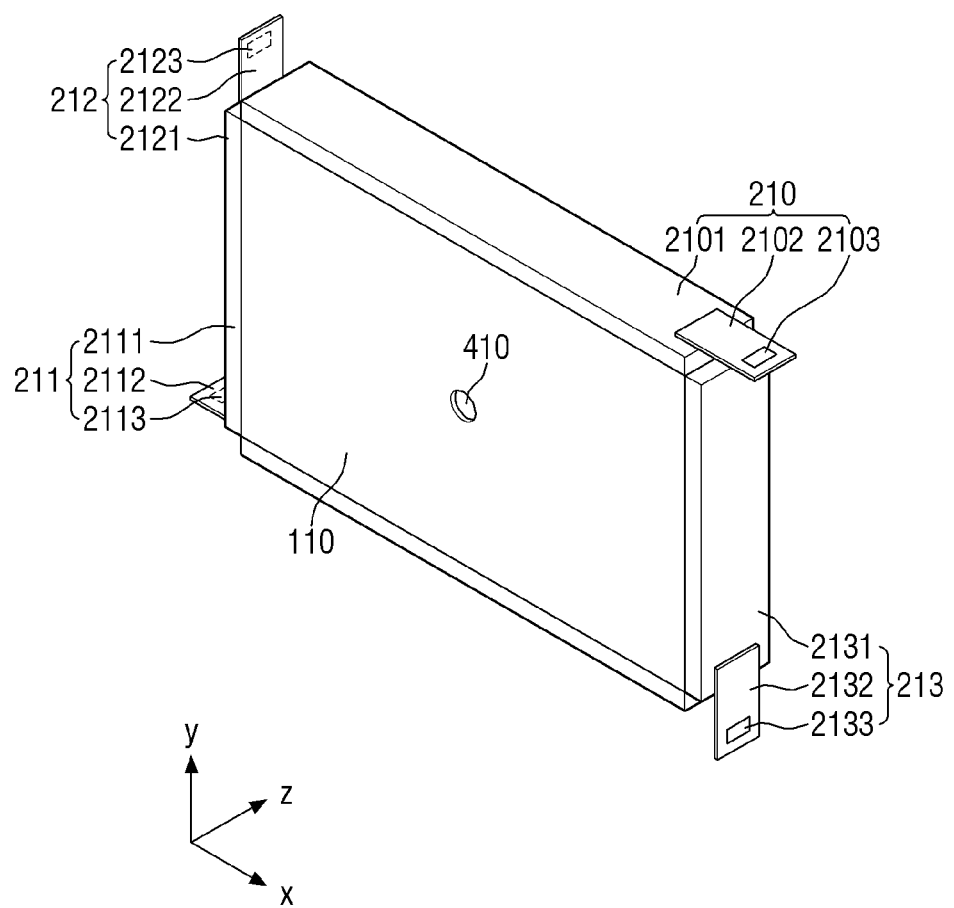
FIG. 24 is a perspective view showing an example of the first lens, a first display device, a third display device, a fifth display device and a seventh display device of FIG. 23.

FIG. 23 is an exploded, perspective view showing an optical device according to an exemplary embodiment of the present disclosure. FIG. 24 is a perspective view showing an example of the first lens, a first display device, a third display device, a fifth display device and a seventh display device of FIG. 23.

The exemplary embodiment shown in FIGS. 23 and 24 is different from the exemplary embodiment shown in FIGS. 10 and 11 in that the fifth display device 212 is disposed on the left surface of the first lens 110, and the seventh display device 213 is disposed on the right surface of the first lens 110. The exemplary embodiment shown in FIGS. 23 and 24 is different from the exemplary embodiment shown in FIGS. 10 and 11 in that the sixth display device 222 is disposed on the left surface of the second lens 120, and the eighth display device 223 is disposed on the right surface of the second lens 120. Description will focus on differences from the exemplary embodiment shown in FIGS. 10 and 11 and any redundant descriptions will be omitted.

Referring to FIGS. 23 and 24, each of the fifth display device 212, the sixth display device 222, the seventh display device 213, and the eighth display device 223 display virtual images for realizing an augmented reality. The fifth display device 212 may display a fifth image as a virtual image, the sixth display device 222 may display a sixth image as a virtual image, the seventh display device 213 may display a seventh image as a virtual image, and the eighth display device 223 may display a eighth image as a virtual image.

The fifth display device 212 may include a fifth display panel 2121, a fifth circuit board 2122, and a fifth driving circuit 2123. The sixth display device 222 may include a sixth display panel 2221, a sixth circuit board 2222, and a sixth driving circuit 2223. The seventh display device 213 may include a seventh display panel 2131, a seventh circuit board 2132, and a seventh driving circuit 2133. The eighth display device 223 may include an eighth display panel 2231, a eighth circuit board 2232, and a eighth driving circuit 2233.

The first display panel 2101, the third display panel 2111, the fifth display panel 2121 and the seventh display panel 2131 may be disposed on the side surfaces of the first lens 110, respectively. For example, the first display panel 2101 may be disposed on the upper surface of the first lens 110, and the third display panel 2111 may be disposed on the lower surface of the first lens 110. The fifth display panel 2121 may be disposed on the left surface of the first lens 110, and the seventh display panel 2131 may be disposed on the right surface of the first lens 110. That is to say, the first display panel 2101 and the third display panel 2111 may face each other, and the fifth display panel 2121 and the seventh display panel 2131 may face each other. The first display panel 2101, the third display panel 2111, the fifth display panel 2121 and the seventh display panel 2131 may be covered by the top bar 20 and the first lens frame 21.

The second display panel 2201, the fourth display panel 2211, the sixth display panel 2221 and the eighth display panel 2231 may be disposed on the side surfaces of the second lens 120, respectively. For example, the second display panel 2201 may be disposed on the upper surface of the second lens 120, and the fourth display panel 2211 may be disposed on the lower surface of the second lens 120. The sixth display panel 2221 may be disposed on the left surface of the second lens 120, and the eighth display panel 2231 may be disposed on the right surface of the second lens 120. That is to say, the second display panel 2201 and the fourth display panel 2211 may face each other, and the sixth display panel 2221, and the eighth display panel 2231 may face each other. The second display panel 2201, the fourth display panel 2211, the sixth display panel 2221 and the eighth display panel 2231 may be covered by the top bar 20 and the second lens frame 22.

Each of the fifth display panel 2121, the sixth display panel 2221, the seventh display panel 2131 and the eighth display panel 2231 may be a flexible display panel, which can be curved, rolled or bent. For example, each of the fifth display panel 2121, the sixth display panel 2221, the seventh display panel 2131 and the eighth display panel 2231 may be an organic light-emitting display panel or an organic light-emitting display panel including quantum dots. Each of the fifth display panel 2121, the sixth display panel 2221, the seventh display panel 2131, and the eighth display panel 2231 may be formed in substantially the same manner as the first display panel 2101 shown in FIG. 4, and therefore, any redundant descriptions will be omitted.

Although FIGS. 23 and 24 illustrate that the first display panel 2101, the third display panel 2111, the fifth display panel 2121 and the seventh display panel 2131 are not connected to one another but are formed separately, the inventive concepts are not limited thereto. That is to say, the first display panel 2101, the third display panel 2111, the fifth display panel 2121, and the seventh display panel 2131 may be connected to one another as a single piece. In addition, although FIGS. 23 and 24 illustrate that the second display panel 2201, the fourth display panel 2211, the sixth display panel 2221 and the eighth display panel 2231 are not connected to one another but are formed separately, the second display panel 2201, the fourth display panel 2211, the sixth display panel 2221, and the eighth display panel 2231 may be connected to one another as a single piece.

Figure 25:
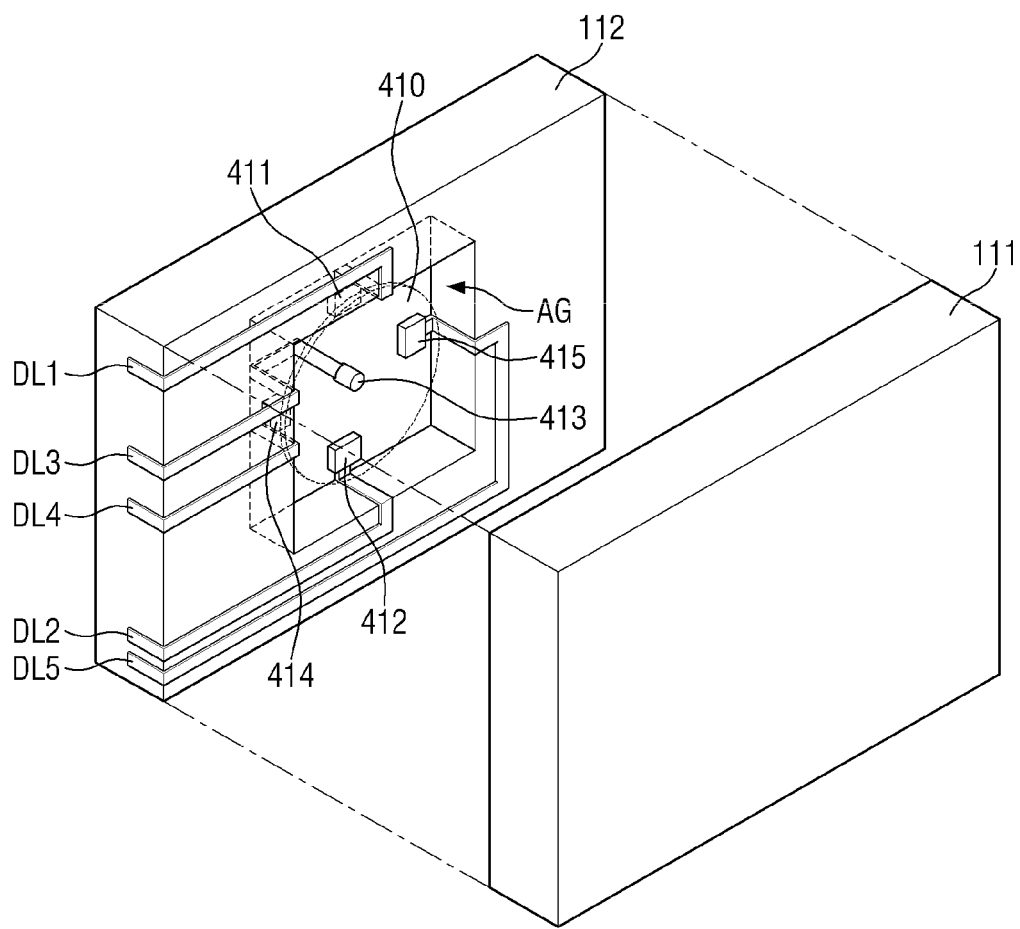
FIG. 25 is an exploded perspective view showing an example of the first lens of FIG. 23.

FIG. 25 is an exploded perspective view showing an example of the first lens of FIG. 24.

The exemplary embodiment shown in FIG. 25 is difference from the exemplary embodiment shown in FIG. 12 in that a fourth driving line DL4 and a fifth driving line DL5 are additionally disposed on a second lens part 112. Description will focus on differences and any redundant descriptions will be omitted.

Referring to FIG. 25, a mirror support 413 connected to a first active mirror 410 for supporting it, a first electrode 411, a second electrode 412, a third electrode 414, and a fourth electrode 415 for driving the first active mirror 410 may be formed on the floor of a groove AG.

The first electrode 411, the second electrode 412, and the mirror support 413 may be arranged in parallel in the second direction (y-axis direction), i.e., the height direction of the first lens 110. The mirror support 413 may be disposed between the first electrode 411 and the second electrode 412 in the second direction (y-axis direction). The third electrode 414, the fourth electrode 415, and the mirror support 413 may be arranged in parallel in the first direction (x-axis direction), i.e., the width direction of the first lens 110. The mirror support 413 may be disposed between the third electrode 414 and the fourth electrode 415 in the first direction (x-axis direction).

A first driving line DL1 connected to the first electrode 411, a second driving line DL2 connected to the second electrode 412, a third driving line DL3 connected to the mirror support 413, a fourth driving line DL4 connected to the third electrode 414, and a fifth driving line DL5 connected to the fourth electrode 415 may be formed on the second lens part 112. A driving voltage may be applied to each of the first driving line DL1, the second driving line DL2, the third driving line DL3, the fourth driving line DL4, and the fifth driving line DL5.

The first driving line DL1 may be connected to the first electrode 411 on the floor of the groove AG and may be disposed on at least one of the sidewalls of the groove AG, the top surface of the second lens part 112, and the left surface of the second lens part 112. The second driving line DL2 may be connected to the second electrode 412 on the floor of the groove AG and may be disposed on at least one of the sidewalls of the groove AG, the top surface of the second lens part 112, and the left surface of the second lens part 112. The third driving line DL3 may be connected to the mirror support 413 on the floor of the groove AG and may be disposed on at least one of the sidewalls of the groove AG, the top surface of the second lens part 112, and the left surface of the second lens part 112. The fourth driving line DL4 may be connected to the third electrode 414 on the floor of the groove AG and may be disposed on at least one of the sidewalls of the groove AG, the top surface of the second lens part 112, and the left surface of the second lens part 112. The fifth driving line DL5 may be connected to the fourth electrode 415 on the floor of the groove AG and may be disposed on at least one of the sidewalls of the groove AG, the top surface of the second lens part 112, and the left surface of the second lens part 112. Alternatively, the first driving line DL1, the second driving line DL2, the third driving line DL3, the fourth driving line DL4, and the fifth driving line DL5 may be disposed on the right surface of the second lens part 112, instead of the left surface of the second lens part 112. Alternatively, some of the first driving line DL1, the second driving line DL2, the third driving line DL3, the fourth driving line DL4, and the fifth driving line DL5 may be disposed on the left surface while the others may be disposed on the right surface.

Each of the first driving line DL1, the second driving line DL2, the third driving line DL3, the fourth driving line DL4, and the fifth driving line DL5 may be connected to a third cable or sheathed lines. The third cable or the sheathed lines may be connected to the power source incorporated in the first temple 31 or the second temple 32 to apply power to the first display device 210 and the second display device 220. Alternatively, the third cable or the sheathed lines may be connected to the first circuit board 2102. The third cable or the sheathed lines may be covered by the top bar 20 and the first lens frame 21.

The first electrode 411, the second electrode 412, the third electrode 414, the fourth electrode 415, the mirror support 413, the first driving line DL1, the second driving line DL2, the third driving line DL3, the fourth driving line DL4, and the fifth driving line DL5 may be made of a transparent conductive material such as a transparent conductive oxide. Accordingly, it is possible to prevent the light from the first display device 210 from being reflected or interfered by the first electrode 411, the second electrode 412, the third electrode 414, the fourth electrode 415, the mirror support 413, the first driving line DL1, the second driving line DL2, the third driving line DL3, the fourth driving line DL4, and the fifth driving line DL5. One of the bottom surfaces of the first active mirror 410 may be connected to the mirror support 413, and a metal having a high reflectance, such as silver (Ag), may be formed on another one of the bottom surfaces of the first active mirror 410.

The exemplary embodiment shown in FIG. 25 is substantially identical to the exemplary embodiment shown in FIG. 20 except that the third electrode 414, the fourth electrode 415, and the mirror support 413 are arranged in parallel in the first direction (x-axis direction), i.e., the width direction of the first lens 110. Therefore, any redundant descriptions will be omitted.

The second active mirror 420 may be implemented substantially in the same manner as that shown in FIG. 25. Therefore, the second active mirror 420 will not be described.

FIG. 26 is a flowchart for illustrating a method of providing an augmented reality by an optical device according to an exemplary embodiment of the present invention. FIGS. 27A to 27D are views for illustrating examples for illustrating a method of providing an augmented reality by an optical device according to an exemplary embodiment of the present invention.

First, during a first period, a first display device 210 displays a first image, and a second display device 220 displays a second image. The first image is provided to a user's right eye RE during the first period, and the second image is provided to the user's left eye LE during the first period. The first image may be substantially identical to the second image.

Figure 27A:
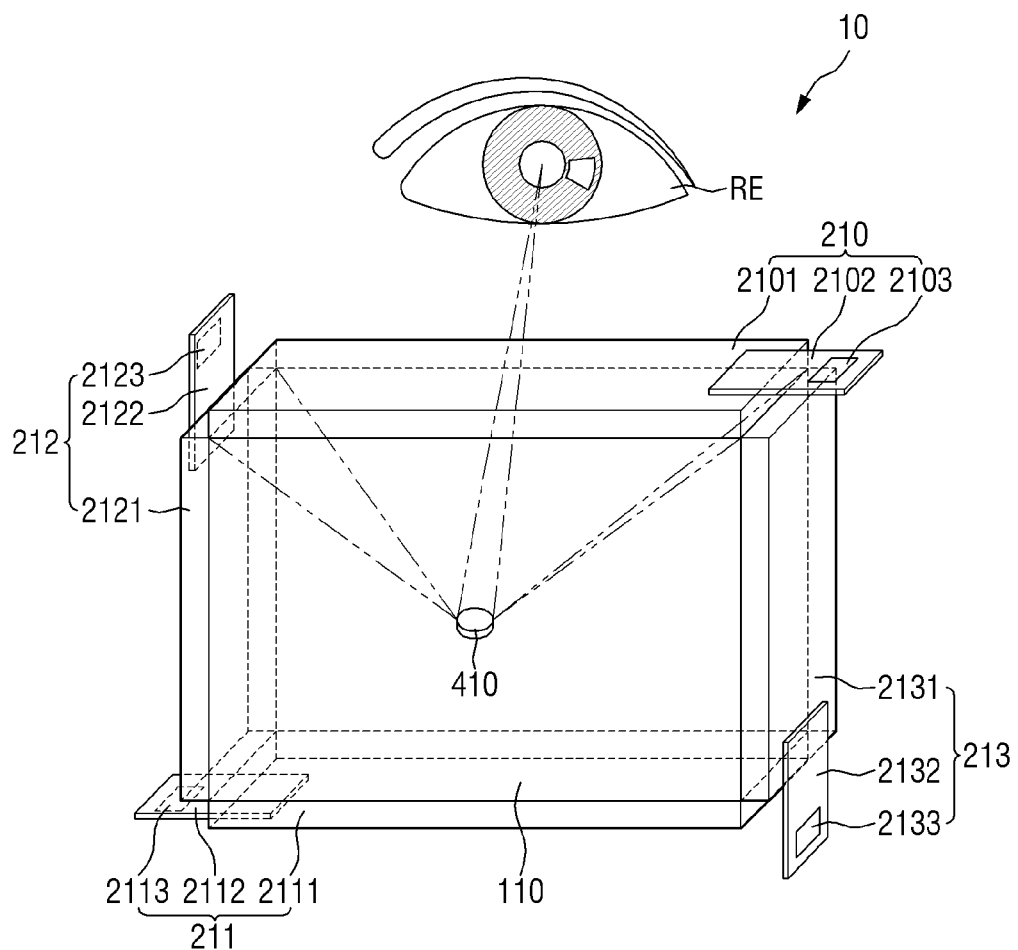
FIGS. 27A, 27B, 27C, and 27D are views for illustrating examples for illustrating a method of providing an augmented reality by an optical device according to an exemplary embodiment of the present disclosure.

In addition, during the first period, a first driving voltage is applied to the first electrode 411 and a second driving voltage is applied to the second electrode 412, the third electrode 414, the fourth electrode 415, and the first active mirror 410, so that the first active mirror 410 can be tilted toward the first electrode 411. In this example, the first electrode 411 is disposed on the upper side from the mirror support 413, and thus, the first active mirror 410 can be tilted in the upper direction. The first active mirror 410 may be tilted so that it reflects the first image of the first display device 210 to allow the image exits through the exit surface of the first lens 110. As a result, as shown in FIG. 27A, during the first period, the first image of the first display device 210 may be reflected by the first active mirror 410 and may exit through the exit surface of the first lens 110, to be provided to the user's right eye RE. (step S401 of FIG. 26)

During the first period, the second active mirror 420 may also be tilted so that it reflects the second image of the second display device 220 to allow the image exits through the exit surface of the second lens 120. As a result, during the first period, the second image of the second display device 220 may be reflected by the second active mirror 420 and may exit through the exit surface of the second lens 120, to be provided to the user's left eye LE.

Second, during a second period, a third display device 211 displays a third image, and a fourth display device 221 displays a fourth image. The third image is provided to a user's right eye RE during the second period, and the fourth image is provided to the user's left eye LE during the second period. The third image may be substantially identical to the fourth image.

Figure 27B:
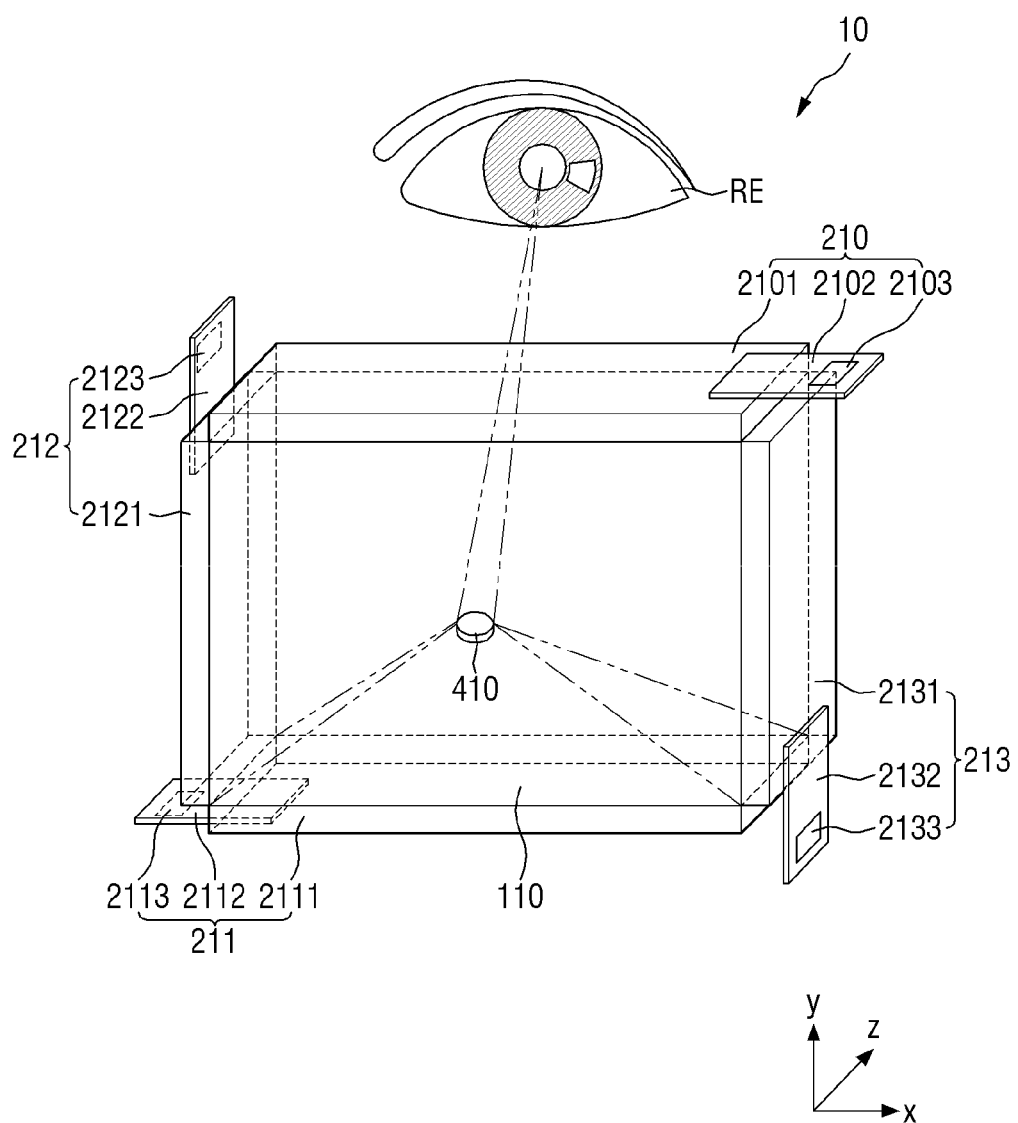

In addition, during the second period, the first driving voltage is applied to the second electrode 412 and the second driving voltage is applied to the first electrode 411, the third electrode 414, the fourth electrode 415 and the first active mirror 410, so that the first active mirror 410 can be tilted toward the second electrode 412. In this example, the second electrode 412 is disposed on the lower side from the mirror support 413, and thus, the first active mirror 410 can be tilted in the lower direction. The first active mirror 410 may be tilted so that it reflects the third image of the third display device 211 to allow the image exits through the exit surface of the first lens 110. As a result, as shown in FIG. 27B, during the second period, the third image of the third display device 211 may be reflected by the first active mirror 410 and may exit through the exit surface of the first lens 110, to be provided to the user's right eye RE. (step S402 of FIG. 26)

During the second period, the second active mirror 420 may also be tilted so that it reflects the fourth image of the fourth display device 221 to allow the image exits through the exit surface of the second lens 120. As a result, during the second period, the fourth image of the fourth display device 221 may be reflected by the second active mirror 420 and may exit through the exit surface of the second lens 120, to be provided to the user's left eye LE.

Third, during a third period, a fifth display device 212 displays a fifth image, and a sixth display device 222 displays a sixth image. The fifth image is provided to a user's right eye RE during the third period, and the sixth image is provided to the user's left eye LE during the third period. The fifth image may be substantially identical to the sixth image.

Figure 27C:
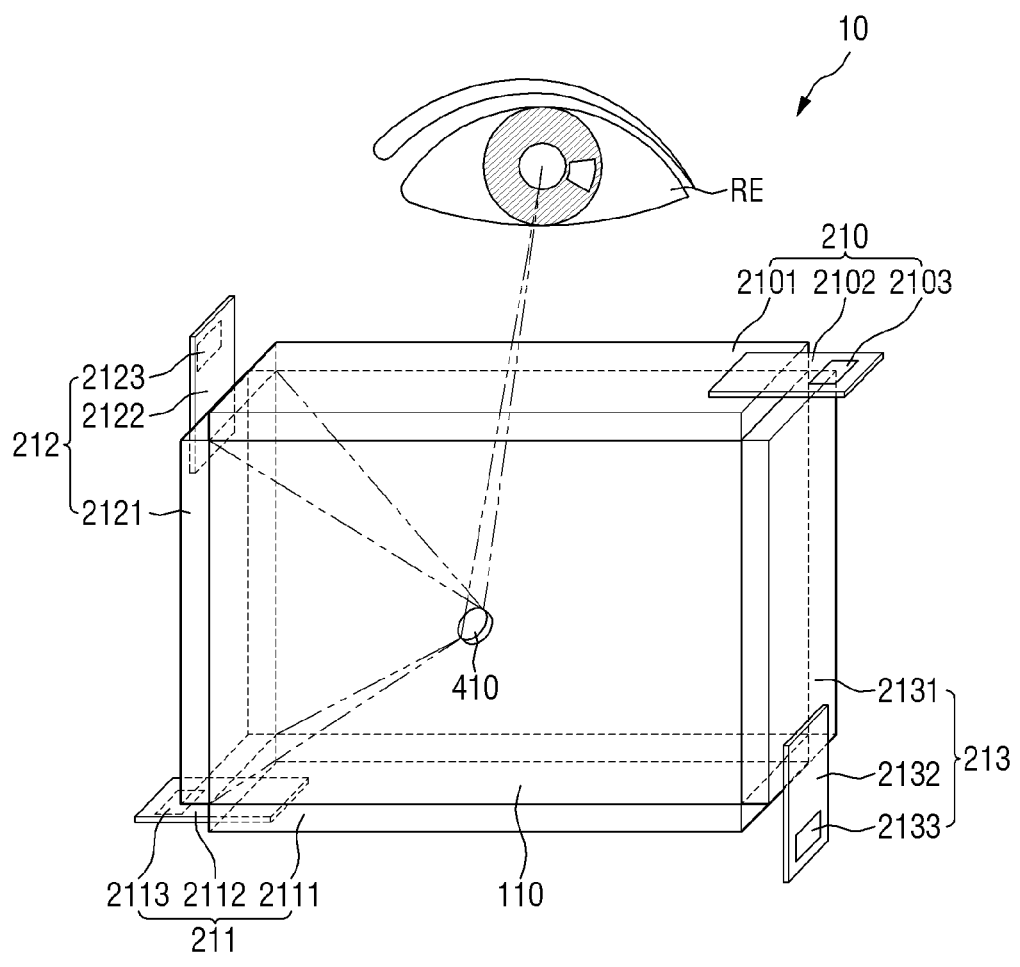

In addition, during the third period, the first driving voltage is applied to the third electrode 414 and the second driving voltage is applied to the first electrode 411, the second electrode 412, the fourth electrode 415, and the first active mirror 410, so that the first active mirror 410 can be tilted toward the third electrode 414. In this example, the third electrode 414 is disposed on the left side from the mirror support 413, and thus, the first active mirror 410 can be tilted in the left direction. The first active mirror 410 may be tilted so that it reflects the fifth image of the fifth display device 212 to allow the image exits through the exit surface of the first lens 110. As a result, as shown in FIG. 27C, during the third period, the fifth image of the fifth display device 212 may be reflected by the first active mirror 410 and may exit through the exit surface of the first lens 110, to be provided to the user's right eye RE. (step S403 of FIG. 26)

During the third period, the second active mirror 420 may also be tilted so that it reflects the sixth image of the sixth display device 222 to allow the image exits through the exit surface of the second lens 120. As a result, during the third period, the sixth image of the sixth display device 222 may be reflected by the second active mirror 420 and may exit through the exit surface of the second lens 120, to be provided to the user's left eye LE.

Fourth, during a fourth period, a seventh display device 213 displays a seventh image, and a eighth display device 223 displays a eighth image. The seventh image is provided to a user's right eye RE during the fourth period, and the eighth image is provided to the user's left eye LE during the fourth period. The seventh image may be substantially identical to the eighth image.

Figure 27D:
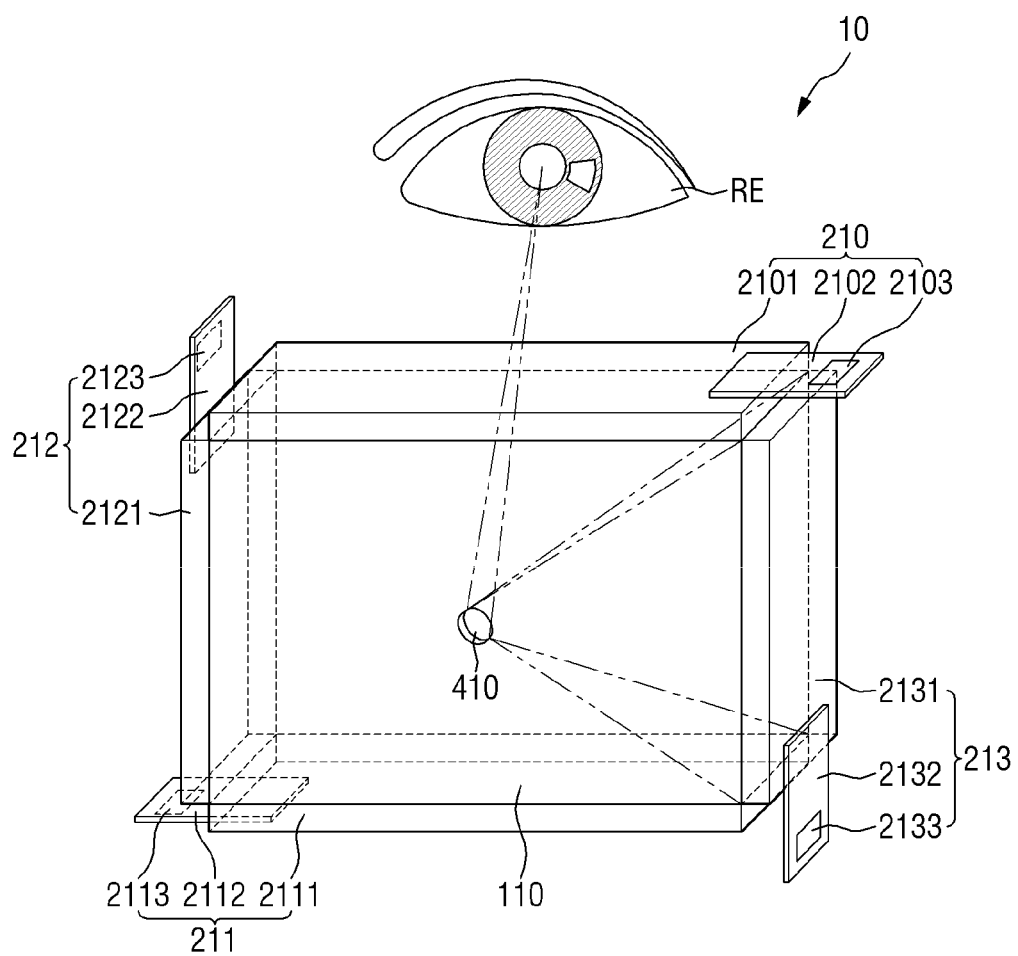

In addition, during the fourth period, the first driving voltage is applied to the fourth electrode 415 and the second driving voltage is applied to the first electrode 411, the second electrode 412, the third electrode 414 and the first active mirror 410, so that the first active mirror 410 can be tilted toward the fourth electrode 415. In this example, the fourth electrode 415 is disposed on the right side from the mirror support 413, and thus, the first active mirror 410 can be tilted in the right direction. The first active mirror 410 may be tilted so that it reflects the seventh image of the seventh display device 213 to allow the image exits through the exit surface of the first lens 110. As a result, as shown in FIG. 27D, during the fourth period, the seventh image of the seventh display device 213 may be reflected by the first active mirror 410 and may exit through the exit surface of the first lens 110, to be provided to the user's right eye RE. (step S404 of FIG. 26)

During the fourth period, like the first active mirror 410, the second active mirror 420 may also be tilted so that it reflects the eighth image of the eighth display device 223 to allow the image exits through the exit surface of the second lens 120. As a result, during the fourth period, the eighth image of the eighth display device 223 may be reflected by the second active mirror 420 and may exit through the exit surface of the second lens 120, to be provided to the user's left eye LE.

According to the exemplary embodiment shown in FIGS. 26 and 27A to 27D, the image of the display device disposed on the upper surface of the lens may be provided to the user's eyes by tilting the active mirror toward the first electrode during the first period, and the image of the display device disposed on the lower surface of the lens may be provided to the user's eyes by tilting the active mirror toward the second electrode during the second period. In addition, the image of the display device disposed on the left surface of the lens may be provided to the user's eyes by tilting the active mirror toward the third electrode during the third period, and the image of the display device disposed on the right surface of the lens may be provided to the user's eyes by tilting the active mirror toward the fourth electrode during the fourth period. That is to say, the user can see the image displayed on the display device disposed on the upper surface of the lens during the first period as a virtual image, and the image displayed on the display device disposed on the lower surface of the lens during the second period as a virtual image. In addition, the user can see the image displayed on the display device disposed on the left surface of the lens during the third period as a virtual image, and the image displayed on the display device disposed on the right surface of the lens during the fourth period as a virtual image. Therefore, the part of the display device that is viewed by a user, i.e., the user's field-of-view (FOV), can be expanded without increasing the number of mirrors or even without increasing the area of the display device.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An optical device comprising:
   a first lens having a first surface and a plurality of side surfaces;
   a first display device disposed on a first side surface of the plurality side surfaces of the first lens; and
   a first active mirror disposed in the first lens,
   wherein:
   the first active mirror is tilted at a first angle during a first period and is tilted at a second angle during a second period; and
   each of the first angle and the second angle is measured from a thickness direction of the first lens toward a height direction of the first lens.

2. The optical device of claim 1, wherein the first active mirror reflects an image displayed on a first area of the first display device toward the first surface during the first period and reflects an image displayed on a second area of the first display device toward the first surface during the second period.

3. The optical device of claim 2, wherein the first active mirror reflects an image displayed on a third area of the first display device toward the first surface during a third period and reflects an image displayed on a fourth area of the first display device toward the first surface during a fourth period.

4. The optical device of claim 3, wherein the first lens comprises:
   a first lens part; and
   a second lens part having a groove formed in a side surface thereof that faces a side surface of the first lens part,
   wherein the first active mirror is accommodated in the groove.

5. The optical device of claim 4, further comprising:
   a first electrode, a second electrode, a third electrode, and a fourth electrode disposed on a floor of the groove; and
   a mirror support disposed on the floor of the groove to support the first active mirror.

6. The optical device of claim 5, wherein a first driving voltage is applied to the first electrode and a second driving voltage is applied to the second electrode, the third electrode, the fourth electrode, and the first active mirror during the first period, such that the first active mirror is tilted toward the first electrode.

7. The optical device of claim 6, wherein the first driving voltage is applied to the second electrode and the second driving voltage is applied to the first electrode, the third electrode, the fourth electrode, and the first active mirror during the second period, such that the first active mirror is tilted toward the second electrode.

8. The optical device of claim 7, wherein the first driving voltage is applied to the third electrode and the second driving voltage is applied to the first electrode, the second electrode, the fourth electrode, and the first active mirror during a third period, such that the first active mirror is tilted toward the third electrode.

9. The optical device of claim 8, wherein the first driving voltage is applied to the fourth electrode and the second driving voltage is applied to the first electrode, the second electrode, the third electrode and the first active mirror during a fourth period, such that the first active mirror is tilted toward the fourth electrode.

10. An optical device comprising:
    a first lens having a first surface and a plurality of side surfaces;
    a first display device disposed on a first side surface of the plurality side surfaces of the first lens; and
    a first active mirror disposed in the first lens,
    wherein:
    the first active mirror is tilted at a first angle during a first period and is tilted at a second angle during a second period;
    the first lens comprises:
       a first lens part; and
       a second lens part having a groove formed in a side surface thereof that faces a side surface of the first lens part; and
    the first active mirror is accommodated in the groove.

11. The optical device of claim 10, wherein the groove is filled with a fluid.

12. The optical device of claim 10, further comprising:
    a first electrode and a second electrode disposed on a floor of the groove; and
    a mirror support disposed on the floor of the groove to support the first active mirror.

13. The optical device of claim 12, wherein:
    the floor of the groove is inclined by a third angle; and
    the third angle is measured from a thickness direction of the first lens toward a height direction of the first lens.

14. The optical device of claim 12, wherein the first electrode, the second electrode, and the mirror support are made of a transparent conductive material.

15. The optical device of claim 12, wherein a first driving voltage is applied to the first electrode and a second driving voltage is applied to the second electrode and the first active mirror during the first period, such that the first active mirror is tilted toward the first electrode.

16. The optical device of claim 15, wherein the first driving voltage is applied to the second electrode and the second driving voltage is applied to the first electrode and the first active mirror during the second period, such that the first active mirror is tilted toward the second electrode.

17. The optical device of claim 16, wherein the first display device displays a first image during the first period and displays a second image during the second period.

18. An optical device comprising:
    a first lens having a first surface and a plurality of side surfaces;
    a first display device disposed on a first side surface of the side surfaces of the first lens;
    a second display device disposed on a second side surface of the side surfaces of the first lens; and
    a first active mirror disposed in the first lens,
    wherein the first active mirror is configured to reflect a first image displayed by the first display device through the first surface during a first period and to reflect a second image displayed by the second display device through the first surface during a second period.

19. The optical device of claim 18, wherein the first side surface and the second side surface of the first lens face each other.

20. The optical device of claim 19, wherein:
    the first active mirror is tilted at a first angle during the first period and tilted at a second angle during the second period; and
    each of the first and second angles is measured from a height direction of the first lens toward a thickness direction of the first lens.

21. The optical device of claim 19, wherein:
    the first active mirror is tilted at a first angle during the first period and tilted at a second angle during the second period; and each of the first and second angles is measured from a width direction of the first lens toward a height direction of the first lens.

22. The optical device of claim 19, further comprising:

a third display device disposed on a third side surface of the plurality of side surfaces of the first lens; and a fourth display device disposed on a fourth side surface of the plurality of side surfaces of the first lens.

23. The optical device of claim 22, wherein the first active mirror reflects a third image displayed by the third display device toward the first surface during the third period and reflects a fourth image displayed by the fourth display device toward the first surface during the fourth period.

24. The optical device of claim 23, wherein the third side surface and the fourth side surface of the first lens face each other.

25. A method of driving an optical device, the method comprising:

displaying a first image on a first display device during a first period;

applying a first driving voltage to a first electrode and applying a second driving voltage to a second electrode and to the first active mirror during the first period so that a first active mirror is tilted at a first angle;

displaying a second image on the first display device during a second period; and applying the first driving voltage to the second electrode and applying the second driving voltage to the first electrode and the first active mirror during a second period so that the first active mirror is tilted at a second angle.

26. A method of driving an optical device, the method comprising:

displaying a first image on a first display device disposed on a first side surface of a first lens during a first period;

reflecting the first image on the first display device by a first active mirror so that it exits through a first surface during the first period;

displaying a second image on a second display device disposed on a second side surface of the first lens during a second period; and reflecting the second image of the second display device by the first active mirror during the second period so that it exits through the first surface of the first lens.

27. The method of claim 26, further comprising:

displaying a third image on a third display device disposed on a third side surface of a first lens during a third period;

reflecting the third image on the third display device by the first active mirror so that it exits through the first surface during the third period;

displaying a fourth image on a fourth display device disposed on a fourth side surface of the first lens during a fourth period; and reflecting the fourth image on the fourth display device by the first active mirror during the fourth period so that it exits through the first surface of the first lens.

28. The method of claim 25, further comprising:

displaying a third image on the first display device during a third period;

reflecting the third image by tilting the first active mirror at a third angle during the third period;

displaying a fourth image on the first display device during a fourth period; and reflecting the fourth image by tilting the first active mirror at a fourth angle during the fourth period.

\* \* \* \* \*